United States Patent
Yang et al.

(10) Patent No.: US 11,361,016 B2
(45) Date of Patent: Jun. 14, 2022

(54) SYSTEM FOR PROVIDING LIFE LOG SERVICE AND METHOD OF PROVIDING THE SERVICE

(71) Applicant: SAMSUNG ELECTRONICS CO., LTD., Suwon-si (KR)

(72) Inventors: Ji-won Yang, Seoul (KR); Du-seok Kim, Yongin-si (KR); Hyun-cheol Park, Suwon-si (KR); Seung-chur Oh, Daejeon (KR); Ho-sik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/117,743

(22) Filed: Dec. 10, 2020

(65) Prior Publication Data

US 2021/0097100 A1    Apr. 1, 2021

Related U.S. Application Data

(63) Continuation of application No. 16/235,802, filed on Dec. 28, 2018, now Pat. No. 10,891,328, which is a (Continued)

(30) Foreign Application Priority Data

Sep. 23, 2014   (KR) .......................... 10-2014-0127128

(51) Int. Cl.
*G06F 16/44* (2019.01)
*H04L 67/50* (2022.01)
(Continued)

(52) U.S. Cl.
CPC .......... *G06F 16/444* (2019.01); *G06F 3/0481* (2013.01); *G06F 3/0482* (2013.01);
(Continued)

(58) Field of Classification Search
CPC .. G06F 16/444; G06F 16/9537; G06F 3/0481; G06F 3/0482; G06F 3/0484;
(Continued)

(56) References Cited

U.S. PATENT DOCUMENTS

| | | | |
|---|---|---|---|
| 8,649,972 B2* | 2/2014 | Ishibashi ............ | G01C 21/3682 701/426 |
| 8,793,606 B2* | 7/2014 | Kim .................... | G06F 3/04817 715/769 |

(Continued)

FOREIGN PATENT DOCUMENTS

| | | |
|---|---|---|
| CN | 1898530 A | 1/2007 |
| CN | 102628949 A | 8/2012 |

(Continued)

OTHER PUBLICATIONS

Communication dated Apr. 16, 2021, issued by the Korean Intellectual Property Office in Korean Patent Application No. 10-2014-0127128.

(Continued)

*Primary Examiner* — Nghi H Ly
(74) *Attorney, Agent, or Firm* — Sughrue Mion, PLLC

(57) ABSTRACT

A system for providing a life log service and a method of providing the life log service. The computing device for providing the life log service includes: a display which displays a map in a first display area and which displays like content in a second display area; and a processor including a content generator which generates the life content of a user based on a current position of the computing device, and a controller, which, in response to the generated live content, updates the second display area in real time to display the generated life content and updates the map in the first display area to display a path synchronized with the generated life content.

13 Claims, 46 Drawing Sheets

Related U.S. Application Data continuation of application No. 14/686,882, filed on Apr. 15, 2015, now Pat. No. 10,185,719.

(60) Provisional application No. 61/979,659, filed on Apr. 15, 2014.

(51) Int. Cl.

| | | |
|---|---|---|
| *H04L 67/52* | (2022.01) | |
| *G06F 3/0484* | (2022.01) | |
| *G06F 16/9537* | (2019.01) | |
| *H04W 4/029* | (2018.01) | |
| *G06F 3/0481* | (2022.01) | |
| *G06F 3/0482* | (2013.01) | |
| *G06F 3/04883* | (2022.01) | |

(52) U.S. Cl.
CPC ........ *G06F 3/0484* (2013.01); *G06F 3/04883* (2013.01); *G06F 16/9537* (2019.01); *H04L 67/18* (2013.01); *H04L 67/22* (2013.01); *H04W 4/029* (2018.02); *G06F 2203/04803* (2013.01)

(58) Field of Classification Search
CPC ...... G06F 3/04883; G06F 2203/04803; H04W 4/29; H04L 67/18; H04L 67/22
USPC .................. 455/457, 456.1, 432.1, 435.1
See application file for complete search history.

(56) References Cited

U.S. PATENT DOCUMENTS

| | | | |
|---|---|---|---|
| 9,454,519 | B1 | 9/2016 | Keysers et al. |
| 10,185,719 | B2 | 1/2019 | Yang et al. |
| 2004/0194114 | A1 | 9/2004 | Spiegel |
| 2006/0212531 | A1 | 9/2006 | Kikkawa et al. |
| 2007/0130338 | A1* | 6/2007 | Malik ................. G06F 21/62 709/225 |
| 2007/0279438 | A1 | 12/2007 | Takakura et al. |
| 2009/0216435 | A1 | 8/2009 | Zheng et al. |
| 2011/0071881 | A1 | 3/2011 | Zheng et al. |
| 2011/0130953 | A1 | 6/2011 | Ohishi et al. |
| 2012/0110172 | A1 | 5/2012 | Oh et al. |
| 2013/0031119 | A1 | 1/2013 | Kang et al. |
| 2013/0108239 | A1 | 5/2013 | Ryer et al. |
| 2013/0135323 | A1 | 5/2013 | Cheon et al. |
| 2014/0039784 | A1 | 2/2014 | Millspaugh |
| 2014/0067761 | A1 | 3/2014 | Chakrabarti et al. |
| 2014/0115525 | A1* | 4/2014 | Farmer ............... G06F 16/3322 715/780 |
| 2014/0181681 | A1 | 6/2014 | Keinanen et al. |

FOREIGN PATENT DOCUMENTS

| | | |
|---|---|---|
| CN | 102654848 A | 9/2012 |
| CN | 103544159 A | 1/2014 |
| EP | 2 284 776 A1 | 2/2011 |
| KR | 10-1068888 B1 | 10/2011 |
| KR | 10-2012-0107670 A | 10/2012 |
| KR | 10-2013-0060917 A | 6/2013 |
| KR | 10-2013-0096358 A | 8/2013 |

OTHER PUBLICATIONS

Communication dated Feb. 22, 2021, issued by the Korean Intellectual Property Office in Korean Patent Application No. 10-2014-0127128.
Communication dated Sep. 17, 2021 by the Korean Intellectual Property Office in counterpart English Korean Patent Application No. 10-2021-0063715.
Communication dated Aug. 4, 2020, issued by the Korean Intellectual Property Office in corresponding Korean Application No. 10-2014-0127128.
Communication dated Jun. 30, 2015, issued by the International Searching Authority in counterpart International Application No. PCT/KR2015/003775.
Communication dated Sep. 29, 2020, from the State Intellectual Property Office of People's Republic of China in counterpart Application No. 201580031970.0.
Office Action dated Aug. 5, 2019 by the State Intellectual Property Office in P.R. China in counterpart Chinese Patent Application No. 201580031970.0.
Communication dated May 6, 2020 issued by the State Intellectual Property Office of P.R. China in counterpart Chinese Application No. 201580031970.0.
Breadtrip—Leave those precious bread crumbs, Zuimeia, Jun. 19, 2013, http://zuimeia.com/app/50/. (7 pages total).
Communication dated Mar. 11, 2022 by the Korean Intellectual Property Office in Korean Patent Application No. 10-2021-0063715.

* cited by examiner

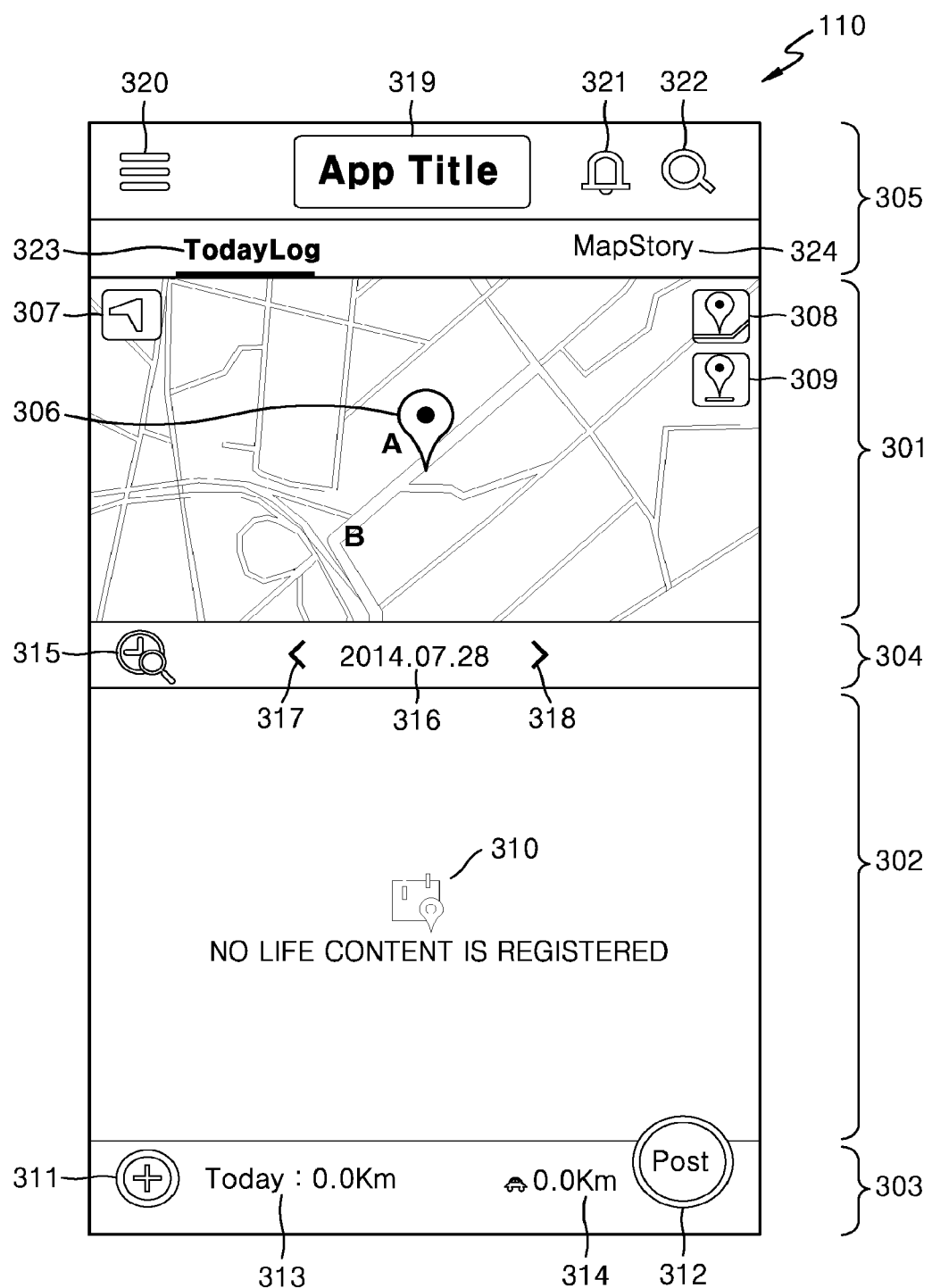

FIG. 20
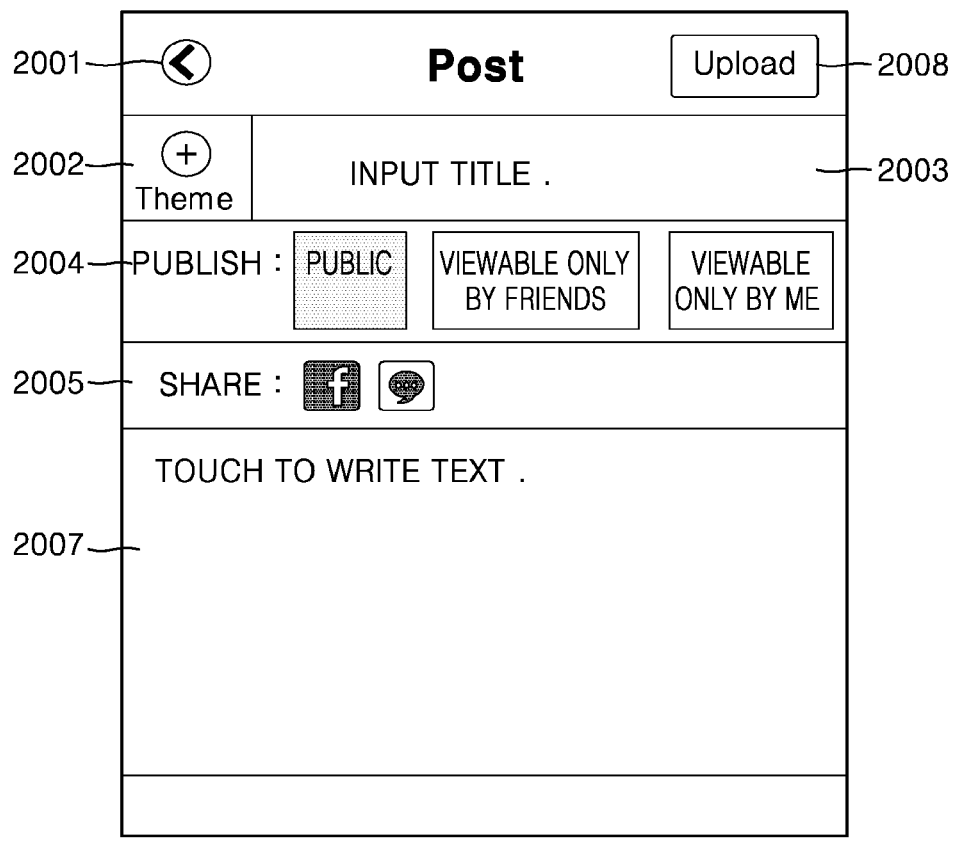
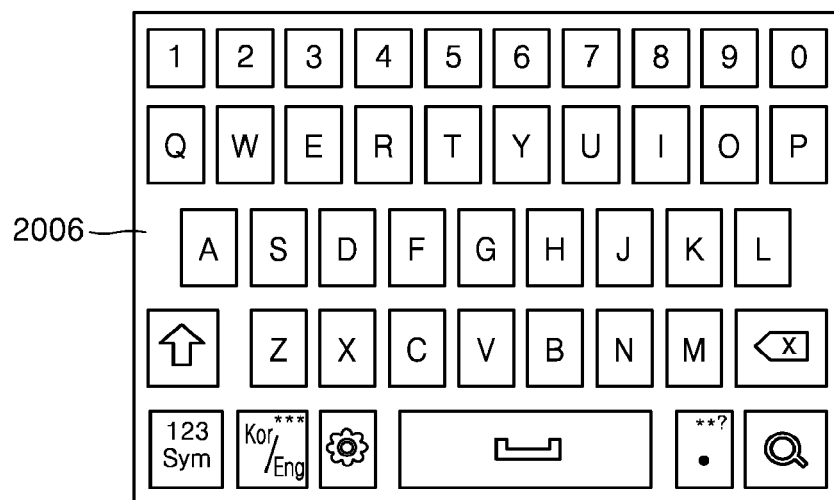

SYSTEM FOR PROVIDING LIFE LOG SERVICE AND METHOD OF PROVIDING THE SERVICE

CROSS-REFERENCE TO RELATED APPLICATIONS

This application is a continuation application of U.S. patent application Ser. No. 16/235,802, filed Dec. 28, 2018, which is a continuation application of U.S. patent application Ser. No. 14/686,882, filed on Apr. 15, 2015, which issued as U.S. Pat. No. 10,185,719, which claims priority from U.S. Provisional Application No. 61/979,659, filed on Apr. 15, 2014 in the United States Patent and Trademark Office, and Korean Patent Application No. 10-2014-0127128, filed on Sep. 23, 2014 in the Korean Intellectual Property Office, the disclosures of which are hereby incorporated by reference in their entireties.

BACKGROUND

1. Field

Systems and methods consistent with exemplary embodiments relate to providing a life log service by using a computing device.

2. Description of Related Art

A life log service is a service for automatically recording and managing personal daily routines. With the development of communication techniques based on a portable computing device such as smartphones, various types of life log services by using the portable computing device are suggested.

SUMMARY

One or more exemplary embodiments provide a system for providing a life log service synchronized with a map by using a computing device and a method of providing the life log service.

Additional aspects will be set forth in part in the description which follows and, in part, will be apparent from the description, or may be learned by practice of exemplary embodiments.

According to an aspect of an exemplary embodiment, there is provided a computing device includes: a display which displays a map in a first display area and which displays the life content in the second display area; and a processor including a content generator which generate the life content of a user based on a position obtained by the computing device, a display controller, which in response to the content generator generating the life content, updates in real time, the second display area to display the generated life content and the map in the first display area to display a path synchronized with the generated life content.

The computing device may further include a user inputter which receives input from the user. In response to the input being a selection of a marker on the map, the controller may be configured to activate the selected marker and to control the display to display life content corresponding to the selected marker as activated in the second display area, and in response to the input being a selection of one item in the life content displayed in the second display area, the controller may be configured to focus on the path corresponding to the selected item in the first display, as a single path view.

The map displayed in the first display area may be one of a full path view based on registered life content registered being displayed in the second display area and a single path view based on the synchronized life content being activated in the second display area, wherein the full path view and the single path view are provided in one of a path view and a path-and-marker view on the map in the first display area.

The controller may be configured to generate theme content based on at least one item of life content selected from the second display area and post the theme content to a server.

Based on a user input indicating movement on a page displayed on the display, the controller may be configured to switch between a page providing the life content and a page providing the theme content.

According to a search filter set by the user, the controller may be configured to search for at least one theme content from among the theme content posted to the server based on the current position of the computing device or another position and based on the set search filter, and provide found theme content for display.

The life content may include information about a user activity item and information about a user movement item, and the marker may include information about at least one of the user activity item and the user movement item.

Based on a search request input by the user for searching for the life content, the controller may be configured to search for at least one life content in the computing device, based on a user activity item specified in the search request, and provide found at least one life content for display.

The controller may be configured to share the life content and the map including the path displayed on the map, with another computing device requesting to join.

The display may further include a third display area configured to display a total travelled distance based on registered life content and an individual travelled distance according to each movement type of the user, and the controller may be configured to control the computing device such that the total travelled distance and the individual travelled distance are displayed on the third display area.

According to yet another aspect of one or more exemplary embodiments, a method of providing a life log service, includes: displaying a map in a first display area displayed on a display of the computing device, the map is based on a current position of a computing device; displaying life content of a user in a second display area displayed on the display in a time series such that each time the life content is generated based on a position of the computing device, the second display area is updated in real-time to display the generated life content with the displayed life content, and the map is updated in the first display area to display a path synchronized with the generated life content.

The method may further include: in response to receiving a selection of a marker displayed on the map, activating the life content corresponding to the selected marker and displaying the activated life contents in an activated state in the second display area; and in response to receiving a selection of one piece of life content displayed in the second display area, focusing the map on a path synchronized with the selected life content, as a single path view.

The method may further include, in response to receiving input indicating a full path view, focusing on the map the full path view based on registered life content displayed in the second display area; in response to a receiving input indicating a single path view, focusing on the map a path synchronized with a life content that is activated in the second display area; and switching between a path view and a path-and-marker view in the full path view and the single path view according to a user input.

The method may further include: generating theme content based on at least one life content selected in the second display area, and posting the theme content to a server.

The method may further include, based input indicating movement on a page displayed on the display, switching between a page providing the life content and a page providing the theme content.

The method may further include searching for, according to a search filter set by the user, at least one theme content from among the theme content posted to the server based on the current position of the computing device or another position, and providing found theme content for display.

The life content may include information about a user activity item and information about a user movement item, and the marker may include information about at least one of the user activity item and the user movement item.

The method may further include: based on a search request including a user activity item which is input by the user for searching for the life content, searching for at least one life content in the computing device; and providing found life content for display.

The method may further include sharing the life content and the map including the path synchronized with the life content, with another computing device requesting to join.

According to one or more exemplary embodiments, a non-transitory computer readable recording medium having embodied thereon a program for executing the life log service method described above is included.

BRIEF DESCRIPTION OF THE DRAWINGS

These and/or other aspects will become more apparent and more readily appreciated from the following description of exemplary embodiments, taken in conjunction with the accompanying drawings in which:

FIG. 3 is a view illustrating a page displaying a map based on a current position of a computing device according to an exemplary embodiment;

FIG. 20 is a view illustrating a page for inputting contents of theme content that are to be posted, according to an exemplary embodiment.

FIGS. 28A and 28B are views illustrating a detailed page of a theme content search filter according to an exemplary embodiment;

DETAILED DESCRIPTION OF EXEMPLARY EMBODIMENTS

Figure 1A:
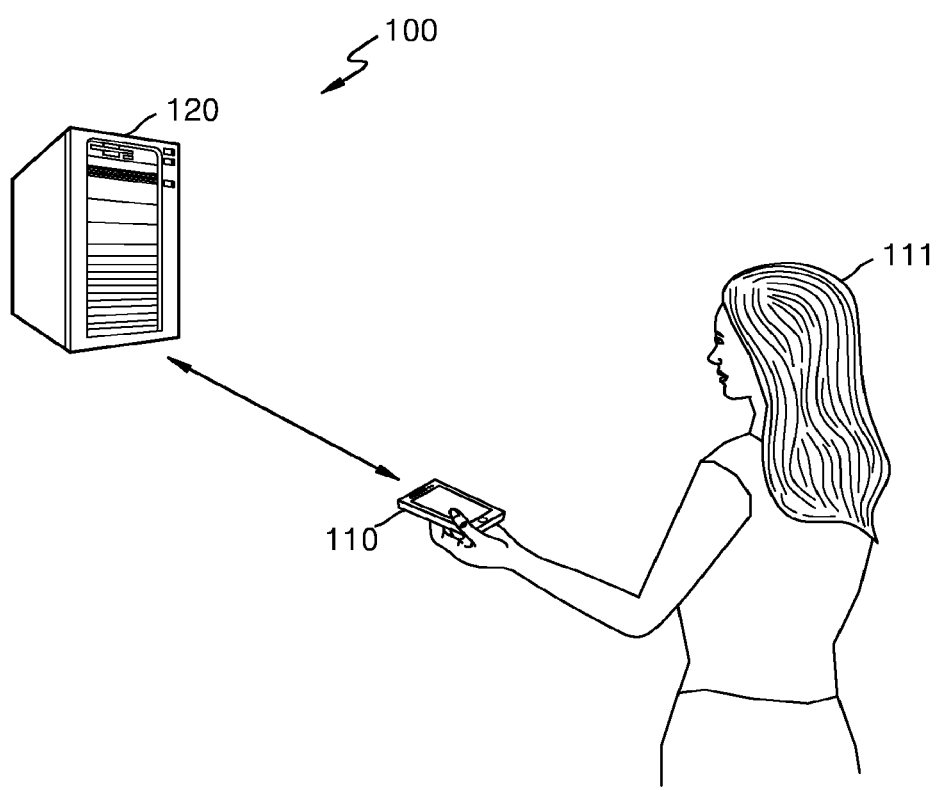
FIGS. 1A and 1B are diagrams explaining a life log service system according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

However, this is not intended to limit exemplary embodiments to particular modes of practice, and it is to be appreciated that all changes, equivalents, and substitutes that do not depart from the spirit and technical scope of an inventive concept are encompassed in the inventive concept. In the description of the inventive concept, certain detailed explanations of related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in this specification are those general terms currently widely used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of exemplary embodiments. Thus, the terms used in the specification should be understood not as simple names but based on the meaning of the terms and the overall description of the inventive concept.

An expression used in the singular encompasses the expression of the plural, unless it has a clearly different meaning in the context. In exemplary embodiments, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Life-based content of a user described throughout the detailed disclosure (hereinafter referred to as life content) refers to content generated based on a user activity item and a user movement item.

A user activity refers to a predetermined activity of a user that executes a life log service according to exemplary embodiments, by using a computing device. For example, the user activity may include, by way of an example without limitation, at least one of strolling, running, cooking, cleaning, sleeping, meeting friends, eating, going to work, and getting off work.

The user activity item includes information capable of identifying a user activity. The user activity item may be expressed in the form of at least one of an icon, text, an image, and multimedia. For example, the user activity item may be expressed as an icon or a combination of an icon and text. A user may intuitively recognize an activity based on the user activity item.

The user activity item may be classified based on category items. A category item may be expressed as information capable of covering all user activity items included in the category item. For example, the category item may include, by way of an example and without limitation, life, eat, drink, enjoy, sports, and work. The category item may be referred to as a group item of life content.

A user activity item included in "Life" may include, for example, without limitation, at least one of cooking, cleaning, rest, stroll, gathering, talking, shopping, beauty, date, driving, pet, birthday, wedding, and event.

A user activity item included in Eat may include, for example, without limitation, at least one of Korean food, western food, Chinese food, Japanese food, snack, fastfood, bread, fruit, and vegetables.

A user activity item included in "Drink" may include, for example, without limitation, at least one of water, dairy drink, coffee, tea, juice, soda, alcohol, hot drink, cold drink, and functional drink.

A user activity item included in "Enjoy" may include, for example, without limitation, at least one of reading, writing (or memo), game, watching a movie, listening to music, singing, dancing, TV, exhibition, show, festival, picnic, camping, photography, gardening, fishing, meditation, and volunteering.

A user activity item included in "Sports" may include, for example, without limitation, at least one of run, bike, hiking, ball games, martial arts, extreme sports, yoga, fitness, leisure, swimming, scuba diving, ski, snowboard, and skating.

A user activity item included in "Work" may include, for example, without limitation, at least one of meeting, presentation, seminar, education, workshop, conference, promotion, business trip, and work outside.

Movement of a user may be indicated whether a user who is using a life log service executed by a computer according to exemplary embodiments is moving and a movement state of the user. The user movement item may be expressed as information capable of identifying whether a user is moving and a movement state of the user. The user movement item may be expressed in the form of at least one of an icon, text, an image, and multimedia. A user may intuitively recognize whether a user has moved and a movement type of the user, based on a user movement item.

For example, the user movement item may include a stay item and a movement type item. The stay item indicates that a user stays in a place. The movement type item is used to identify types of movement. For example, the movement type item may include, by way of an exemplary and without limitation, at least one of walk, car, bike, motorcycle, train, and bus. A user may intuitively recognize types of movement of a user based on the movement type item.

Life content based on a user movement item may be automatically generated by using a computing device according to an exemplary embodiment. That is, a computing device may automatically check-in at a place where a user is, thereby automatically generating life content based on a user movement item.

A life content described throughout the detailed disclosure may include, by way of an example and without limitation, at least one of an icon indicating contents (e.g., a user activity icon or a user movement icon), a location where a content item is generated (e.g., point A, near point A, or from point A to point B), the date when the content item is generated, the time when the content item is generated, travelled distance, and content of the content item. Content may include, by way of an example and without limitation, at least one of a picture, a memo, an audio, a document, and a video.

For example, when life content is generated, life content may further include information received from an external device connected to a computing device. The received information may include, for example, without limitation, at least one of surrounding environment information, information about a user, and information about a program played by an external device.

Surrounding environment information may include, by way of an example and without limitation, at least one of illuminance (or illumination, outside light level), current temperature, humidity, pollen and/or dust level, altitude, and the like.

Information about a user may include, by way of an example and without limitation, at least one of health information (e.g., heart rate, blood flow, respiration speed, and skin temperature) emotion information (e.g., emotional state information such as joy, sadness, fear, anger, surprise, excited, greeting, and hate), and the like.

Information about a program played by an external device may include, for example, without limitation, at least one of broadcast program information, music file information, video information, and the like.

An external device connected to a computing device may include, for example, without limitation, at least one of a wearable device, an Internet of Thing (IoT)-based device, and the like.

A wearable device may include, by way of an example and without limitation, at least one of a smart watch, a smart waist band, a smart necklace, a smart bag, smart glasses, smart accessories (e.g., smart earrings, smart hair pin, smart clips, etc.), and the like.

An IoT-based device may include, for example, without limitation, at least one of Internet-enabled household appliance (e.g., smart TV, smart refrigerator, smart air-conditioner, and smart oven, etc.), Internet-enabled automobiles, and the like.

Also, a life content described throughout the detailed disclosure may further include information about an application executed by a computing device. The information about the application may include, for example, without limitation, information about the generated previous life content to information about the generated current life content, information related to an application executed by a computing device. For example, if the application executed by the computing device is an application for transmitting and receiving a voice call, the information related to the application may include at least one of the number of voice calls and information about a transmitter or receiver of voice calls. If the application executed by the computing device is an application for transmitting and receiving a text message, the information related to the application may include at least one of the number of transmission and reception of text messages, and information about a transmitter or receiver of text messages. The information about the application may be provided in the form of additional information according to an exemplary embodiment. The information about the application may be collected by monitoring an operation of a computing device, but is not limited thereto and is provided by way of an example only.

A marker on a map described throughout the specification refers to a position where life content is generated. When life content is based on a user activity item, the marker may be expressed as a user activity icon, but is provided by way of an example and is not limited thereto.

When life content is based on a user movement item, a marker on the map may be expressed as a stay icon of a user or a movement type icon of the user, but this is provided by way of an example only and is not by way of a limitation. For example, when life content is based on a user movement item, a marker on the map may be expressed as an icon indicating a position where the life content is generated.

A theme-based path content (hereinafter referred to as theme content) described throughout the detailed disclosure refers to content or a set of contents generated based on life content registered with a computing device. The theme content refers to content that is sharable with others and is posted to a server. The theme content may include a theme content posted by others.

The theme content may be generated based on a theme item. A theme item is information used to identify a representative activity of a user regarding contents included in theme content. For example, if user activity items corresponding to a plurality of contents included in theme content are a date, walking, and coffee, and a representative user activity is a date, a date may be set as a theme item. A theme item may be selected by a user, but is provided by way of an example and is not limited thereto.

A theme item may include, for example, without limitation, a coffee, biking, a meeting, a date, a movie, driving, sports, shopping, a hospital visit, reading, study, beauty care, eat, a game, a gathering, hiking, an all-nighter, killing time, tasting event, talking, well-being activity, travel, self-development activity, cooking, rest, cleaning, a stroll, a pet related activity, a birthday, a show, and a business trip.

The theme item may be set using information similar to that used for setting a user activity item. The theme item may be provided in the form of at least one of an icon, text, an image, and multimedia, but is provided by way of an example and is not limited thereto. For example, the theme item may be expressed as an icon or as a combination of an icon and text. A user may intuitively recognize a representative user activity based on a theme item.

The theme item, the user activity item, and the user movement item may be set when creating a life log service application according to an exemplary embodiment, by way of an example and is not limited thereto. For example, the theme item, the user activity item, and the user movement item may be updated by a life log service server.

A search filter about a theme content described throughout the specification refers to as a condition or a parameter for searching for theme content. For example, a search filter includes, without limitation, at least one of a search distance, a search period, and a theme item to be searched for.

The search distance may be set within a radius with respect to current position of a computing device. For example, the search distance may be set as 5 km or 3 miles. The search period may be set based on the number of days included in theme content. For example, the search period may be set as a theme content including life content accumulated over a three day period. If the search period is set to three days, a computing device may search for theme content from theme contents generated for the three days. A theme item to be searched for may include at least one piece of theme item described above, by way of an example and is not limited thereto. The number of theme items to be searched for may be limited to five, but this is an example and not a limitation.

The search distance may be set as a distance based on a position input by a user, regardless of the current position of the computing device. For example, if the actual/current position of a computing device is Seoul, and a user wishes to search theme content posted in Manhattan, N.Y., a reference position for determining a search distance may be set or input by the user. A result of searching for theme content regarding positions different from the current position of the computing device may be used as information for the user to make future plans.

A search filter about life content described throughout the detailed disclosure refers to a condition for searching the life content registered with a computing device. The search filter about life content may include, for example, a user activity item to be searched for, but is not limited thereto. For example, the search filter about the life content may further include a search period, but is not limited thereto. A search period may be set in the same manner as a search period included in a search filter about theme content described above, provided by way of an example but is not limited thereto.

The search filter about life content described throughout the detailed disclosure may be set in a similar manner as the search filter about theme content. A search result about life content may be used as information to analyze past activities of a user.

The search filter about life content may be updated by a life log service server.

A touch-based tap input described throughout the detailed disclosure may refer to a selection input of a user.

Hereinafter, exemplary embodiments will be described below in more detail with reference to the accompanying drawings. Those components that are the same or are in correspondence are rendered the same reference numeral, and redundant explanations are omitted.

Figure 1B:
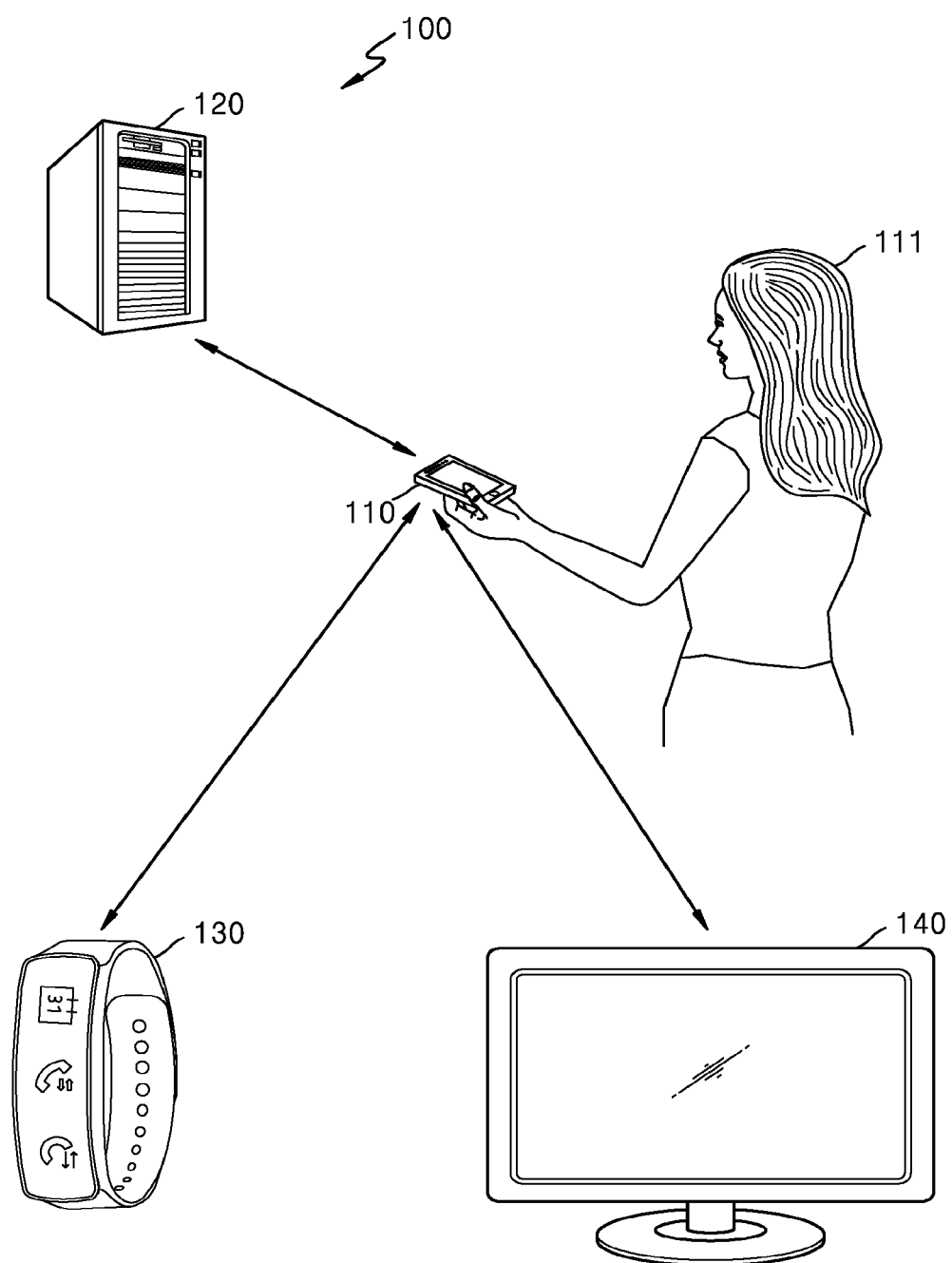

FIG. 1A is a diagram for explaining a life log service system 100 according to an exemplary embodiment. The life log service system 100 may include a computing device 110 and a server 120, provided by way of an example but is not limited thereto. For example, the life log service system 100 according to an exemplary embodiment may include at least one of a computing device 110, a wearable device 130, and an IoT-based device 140, as shown in FIG. 1B.

The computing device 110 may include at least one of a portable device and a mobile device, by way of an example and is not limited thereto.

An example of the portable device include at least one of a smartphone, a notebook, a smart board, a tablet PC, a handheld device, a handheld computer, a media player, an electronic book terminal, and a personal digital assistant (PDA), but are not limited thereto.

Examples of the mobile device may include a car that forms a machine to machine (M2M) network or an Internet of Things (IoT) network.

The computing device 110 may generate life content based on position and time. The computing device 110 may simultaneously display the life content and a map via different display areas. The map is synchronized with the life content.

The computing device 110 may display generated life contents in time series and automatically modify the displayed map to a map synchronized with a life content that is newly generated. The map synchronized with the generated life contents may include one of a map in which a path synchronized with the generated life content is focused and a map in which a path and a marker synchronized with the generated life content are focused, but is provided by way of an example and is not limited thereto.

The computing device 110 may post a life content selected by a user or a set of life contents from among the generated life contents to the server 120.

The server 120 may manage a theme content posted by the computing device 110 or other computing device (not shown) and provide the theme content to the computing device 110 or the other computing device according to a publication range of the posted theme content. The publication range may be set to public, viewable only by friends, or viewable only by me, by way of an example but is not limited thereto.

The wearable device 130 illustrated in FIG. 1B may include at least one of smart glasses, a smart watch, a smart band (e.g., smart waist band or smart hair band), various smart accessories (e.g., smart ring, smart bracelet, smart anklet, smart hair pin, smart necklace, smart clip), various smart body protection pads (e.g., smart knee pads and smart elbow pads), a smart shoe, a smart glove, smart clothing, a smart hat, a smart artificial leg for disabled persons, and a smart artificial hand for disabled persons, by way of an example but is not limited thereto.

The wearable device 130 may provide the computing device 110 with at least one of surrounding environment information, information about a user, and information about a program played by the wearable device 130 described above, by way of an example but is not limited thereto.

The IoT-based device 140 may include a home Internet appliance. The home Internet appliance may include a household appliance device that forms part of an M2M network. For example, the home Internet appliance may include at least one of a smart TV, a PC, a desktop PC, smart refrigerator, a smart washing machine, and a smart light, but is not limited thereto.

The IoT-based device 140 may provide the computing device 110 with at least one of surrounding environment information, information about a user, and information about a program played by the wearable device 130 described above, but information provided by the IoT-based device 140 is not limited thereto.

When life content is generated by using the computing device 110, and information described above is received from at least one of the wearable device 130 and the IoT-based device 140, the computing device 110 may display the received information and the generated life content together. The computing device 110 may display the generated life content and the received information so that the generated life content includes the received information.

The server 120, the wearable device 130, and the IoT-based device 140 illustrated in FIG. 1B may be referred to as external devices of the computing device 110. The external device of the computing device 110 is provided by way of an example and is not limited thereto. For example, an external device may include another computing device. Another computing device may include at least one of a portable device and a mobile device as the computing device 110 described above, but is not limited thereto. The server 120 may be remote or local to the computing device 110 and may include at least a processor and a memory.

Figure 2:
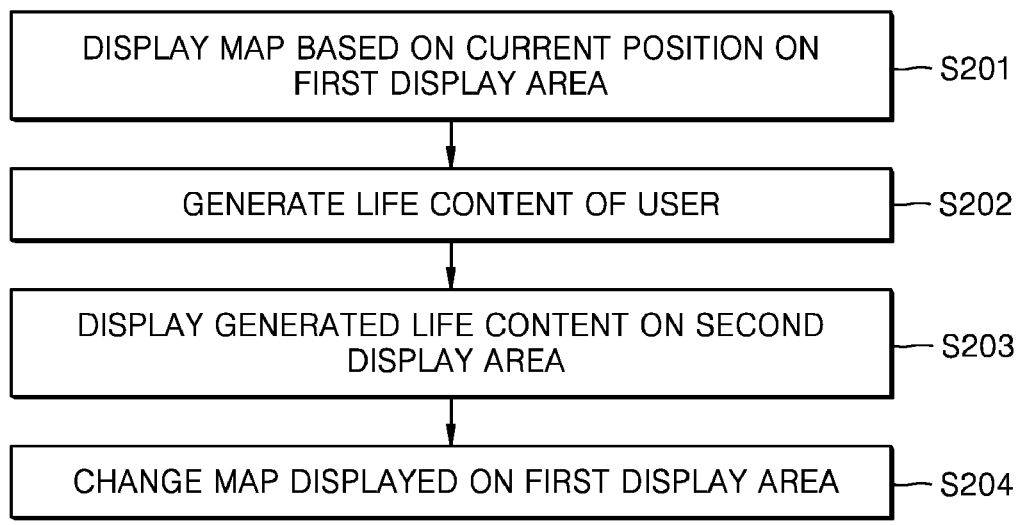
FIG. 2 is a flowchart of a life log service method according to an exemplary embodiment.

FIG. 2 is a flowchart of a life log service method according to an exemplary embodiment.

Referring to FIG. 2, when a life log service according to an exemplary embodiment is executed based on a request from a user 111 of the computing device 110 (shown in FIG. 1B), the computing device 110 displays a map based on the current position of the computing device 110 as illustrated in FIG. 3, in operation S201.

FIG. 3 is a view illustrating a page displaying a map based on the current position of the computing device 110, according to an exemplary embodiment. The page may be referred to as a screen. FIG. 3 illustrates a page based on a life content providing mode, which is a page before life content is generated by the computing device 110. Some of items described with reference to FIGS. 3 and 5A through 5K, which will be described later, may be touch-based buttons. For example, a menu item 320 may be provided as menu buttons. The computing device 110 may receive a touch-based input (e.g., a tap) via a touch-based button.

Referring to FIG. 3, the computing device 110 displays a page including a first display area 301, a second display area 302, a third display area 303, a fourth display area 304, and a fifth display area 305. A page displayed by the computing device 110 is provided by way of an example and is not limited thereto.

For example, the computing device 110 may display a page including the first display area 301 and the second display area 302 while hiding the third through fifth display areas 303 through 305, and then, according to a user's request, the computing device 110 may display a page including the first through fifth display areas 301 through 305.

When the third through fifth display areas 303 through 305 of FIG. 3 are hidden, a request for showing the third through fifth display areas 303 through 305 may be made according to user input touching an outline or an edge of the first display area 301 or the second display area 302 and dragging the outline or the edge to the inside of the screen or downward or upward (touch & drag), but is not limited thereto.

The hidden state of the third through fifth display areas 303 through 305 may be displayed by displaying the outlines of the first display area 301 and the second display area 302 with a dotted line, but a method of showing the hidden state of the third through fifth display areas 303 through 305 is not limited thereto but is provided by way of an example.

The computing device 110 may move a map being displayed within the first display area 301 of FIG. 3 according to a user's input. Accordingly, the first display area 301 may be defined as an area that is movable according to a user input. The computing device 110 may display a map according to exemplary embodiments on the first display area 301. The computing device 110 may display a marker 306 indicating a present position thereof, an item 307 for requesting to set a current position thereof, an item 308 for setting a full path view mode or a single path view mode, and an item 309 for setting a path view mode or a path-and-marker view mode, on a map that is being displayed on the first display area 301. An item that may be displayed on the first display area 301 is not limited thereto. The items 307, 308, and 309 may be used to set a view mode of a map displayed on the first display area 301 in various manners.

The computing device 110 may switch a map view mode according to a touch-based tap input corresponding to the items 307, 308, and 309. For example, based on a touch-based tap input which selects the item 307, the computing device 110 may switch between a current position setting mode and a current position non-setting mode with respect to a map displayed on the first display area 301. Based on the touch-based tap input selecting the item 308, the computing device 110 may switch between a full path view mode and a single path view mode with respect to a map displayed on the first display area 301. Based on a touch-based tap input selecting the item 309, the computing device 110 may switch between a path view mode and a path-and-marker view mode with respect to a map displayed on the first display area 301. An input selecting the items 307, 308, and 309 for mode switching is not limited to the touch-based tap input described above but is provided by way of an example only.

Based on a touch-based input toward an edge of the computing device 110 during a multi-touch input with respect to the first display area 301, the computing device 110 may expand a size of a map displayed on the first display area 301 of FIG. 3. Based on a touch-based input which may be a dragging motion toward the inside of the computing device 110 during a multi-touch input with respect to the first display area 301, the computing device 110 may reduce the size of the map displayed on the first display area 301.

Expansion and reduction of a size of a map displayed on the first display area 301 are not limited to the touch-based input described above and are provided by way of an example only. For example, the computing device 110 displays a map extension item and a map reduction item on a map displayed on the first display area 301. As a touch-based tap input selecting the map extension item or the map reduction item that are being displayed is received, the computing device 110 may extend or reduce the size of the map displayed on the first display area 301.

The computing device 110 may also provide scroll up and down of contents in the second display area 302 of FIG. 3 based on a user input. Accordingly, the second display area 302 may be defined as a scrollable area. The computing device 110 may display the generated life content on the second display area 302. FIG. 3 illustrates a page before life content is generated by the computing device 110, and thus the computing device 110 does not display the life content on the second display area 302. The computing device 110 may display a notification message 310 indicating that there is no life content on the second display area 302 (for example, "no life content is registered"). Life content is a log of a user's life events and thus may be referred to as a life log. Thus, the computing device 110 may display a notification message 310 saying "no life log is registered."

Contrary to the second display area 302, which is scrollable, the third display area 303 may be defined as an unscrollable area, according to an exemplary embodiment. The computing device 110 may display a life content generating item 311, a theme content posting item 312, a fully travelled distance item 313, and a travelled distance item 314 for each movement type item of a user, on the third display area 303, but items that are displayable on the third display area 303 are provided by way of an example and are not limited thereto.

When a touch-based tap input selecting the life content generating item 311 is received, the computing device 110 may generate life content according to a user activity item selected by a user.

When a touch-based tap input selecting the theme content posting item 312 is received, the computing device 110 may post a theme content based on a life content generated by using the computing device 110, to the server 120.

A user may check a fully travelled distance based on the generated life content via the fully travelled distance item 313 provided by the computing device 110. By referring to the traveled distance item 314 for each movement type of the user provided by the computing device 110, the user may check a travelled distance for each movement type.

Contrary to the second display area 302, which is scrollable, the fourth display area 304 may be defined as an unscrollable area also. The computing device 110 displays a life content search item 315, a date item 316, and clamp items 317 and 318 on the fourth display area 304. Items that are displayable on the fourth display area 304 by the computing device 110 are provided by way of an example and are not limited thereto.

As a touch-based user input selecting the life content search item 315 is received, the computing device 110 may request a search for life content stored in the computing device 110. The computing device 110 may display a date on which life content is generated, via the date item 316. When a touch-based tap input selecting the clamp item 317 is received, the computing device 110 changes a date displayed on the date item 316 to a previous date from the current date. When a touch-based tap input selecting the clamp item 318 is received, the computing device 110 changes a date displayed on the date item 316 to a next date from the current date.

If no life content is registered on a date before the date displayed on the date item 316, the computing device 110 may omit displaying the clamp item 317 or may display the clamp item 317 in a greyed out manner indicating that the option or function is not available, but an exemplary embodiment is not limited thereto. For example, also when no life content is registered before the date displayed on the date item 316, the computing device 110 may display the clamp item 317. The registering life content is based on generating life content by the computing device 110.

If no life content is registered on a date after the date displayed on the date item 316, the computing device 110 may omit displaying the clamp item 318 which is movable to the next date or may display the clamp item 318 in a greyed out manner indicating that this option or function is not available, but an exemplary embodiment is not limited thereto. For example, if no life content is registered on a date next to the date corresponding to the date item 316, the computing device 110 may display the clamp item 318.

The computing device 110 may display a date on which a life log service according to an exemplary embodiment is executed, on the date item 316, but also may change the date displayed on the date item 316 based on a touch-based tap input related to the date item 316. For example, when a touch-based tap input selecting one of the clamp items 317 and 318 is received, the computing device 110 changes the date displayed on the date item 316. However, change of the date displayed on the date item 316 is not limited thereto but is provided by way of an example.

For example, the computing device 110 may provide a calendar as a popup window according to a touch-based tap input of a user with respect to the date item 316. When a date selected based on the provided calendar is received, the computing device 110 may display the received date in the date item field 316.

Figure 4A:
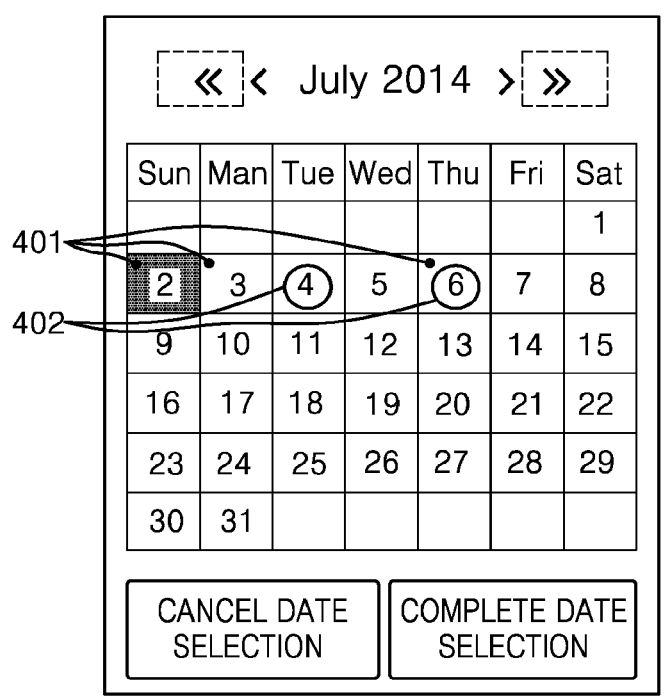
FIG. 4A is a view illustrating a calendar provided by using a computing device according to an exemplary embodiment.

FIG. 4A is a view illustrating a calendar provided by using the computing device 110 according to an exemplary embodiment. Referring to FIG. 4A, the calendar may include a marker 401 on a date which has a generated life content and a marker 402 on a date which has a generated theme content. The markers 401 and 402 are not limited as illustrated in FIG. 4A but are provided by way of an example only. The user may select a date which has the generated life content or a date which has generated theme content, based on the markers 401 and 402 displayed in the calendar. FIG. 4A illustrates an example where Jul. 2, 2014 is selected.

A date which has the generated life content and a date which has the generated theme content may be the same date. For example, Jul. 6, 2014 illustrated in FIG. 4A is the date which has both contents, the generated life content and the generated theme content.

The computing device 110 may display several days (for example, 25 to 28 Jul. 2014) via the date item 316.

The computing device 110 does not receive a scroll input of a user with respect to the fifth display area 305 of FIG. 3. Accordingly, the fifth display area 305 may be defined as an unscrollable area according to an exemplary embodiment.

The computing device 110 may display a life log service title 319, a menu item 320, a notification item 321, a theme content search item 322, a life content providing mode item 323, and a theme content providing mode item 324 in the fifth display area 305, but the items displayed in the fifth display area 305 are not limited thereto and are provided by way of an example only.

Figure 4B:
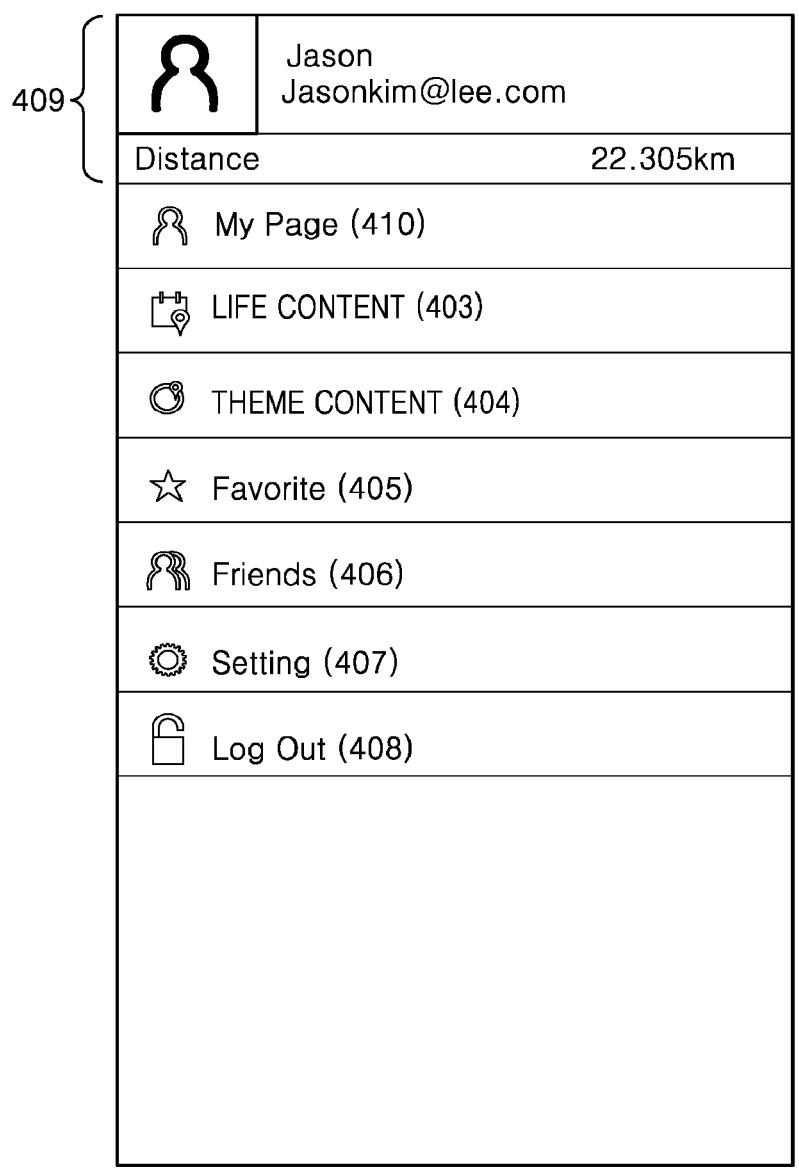
FIG. 4B is a view illustrating a menu page provided by using a computing device according to an exemplary embodiment.

When a touch-based tap input selecting the menu item 320 is received, the computing device 110 may provide a menu page. FIG. 4B is a view illustrating a menu page provided by the computing device 110 according to an exemplary embodiment.

As illustrated in FIG. 4B, the computing device 110 may provide via the menu page, user profile information 409, a my page item 410, a life content providing item 403, a theme content providing item 404, a favorite content providing item 405, a friends item 406, a setting item 407, and a logout item 408, but information included in the menu page is not limited thereto but is provided by way of an example only.

The computing device 110 may provide the user profile information 409 which includes at least one of a picture of a user, a name of a user, an email address of a user, and fully travelled distance information, but is provided by way of an example and is not limited thereto. The fully travelled distance refers to fully travelled distance information after a life log service is executed, according to an exemplary embodiment.

When a touch-based tap input selecting my page item 410 illustrated in FIG. 4B is received, according to an exemplary embodiment, the computing device 110 may provide a theme content posted by the user to the server 120.

When a touch-based tap input selecting the life content providing item 403 illustrated in FIG. 4B is received, the computing device 110 moves from the menu page illustrated in FIG. 4B to the page providing life content illustrated in FIG. 3. The life content providing item 403 is used to provide a life content that is generated today and may be referred to as a today log item.

When a touch-based tap input selecting the theme content providing item 404 illustrated in FIG. 4B is received, the computing device 110 moves from the menu page of FIG. 4B to a page providing theme content illustrated in FIG. 22, which will be described later. The theme content providing item 404 illustrated in FIG. 4B provides a path content having a story based on a theme, and thus may be referred to as a map story item.

When a touch-based tap input selecting the favorite content item 405 illustrated in FIG. 4B is received, the computing device 110 moves from the menu page of FIG. 4B to a page that provides a theme content or a life content registered as a favorite content by the user. The computing device 110 may provide information about the number of pieces of registered favorite contents via the menu page of FIG. 4B. For example, the computing device 110 may display information about the number of pieces of registered favorite contents at a position near the favorite content item 405. Analogous information may be provided next to the life content providing item 403 and theme content providing item 404, and other items shown in FIG. 4B.

When a touch-based tap input selecting the friends item 406 illustrated in FIG. 4B is received, the computing device 110 may provide friends information registered in a life log service according to exemplary embodiments. The computing device 110 may provide information about the number of registered friends, via the menu page of FIG. 4B. For example, the computing device 110 may display information about the number of friends at a location near the friends item 406. This is provided by way of an example and not by way of a limitation.

Based on a touch-based tap input selecting the setting item 407 illustrated in FIG. 4B, the computing device 110 may display a page providing various settings (e.g., user information setting, account information setting, real-time tracking setting, camera pictures automatic importing setting, map range setting, life content backup and importing setting, notifications setting, settings for a main screen during execution of a life log service according to an exemplary embodiment), notifications, and version information, but an exemplary embodiment is not limited thereto.

Based on a touch-based tap input selecting the logout item 408 illustrated in FIG. 4B, the computing device 110 may display a message that inquires whether to end execution of a life log service according to an exemplary embodiment, in the form of a popup window by way of an example. Based on a request to end execution of a service in response to the message inquiring whether to end execution of the service, the computing device 110 may end execution of the life log service according to an exemplary embodiment. When a request for canceling this action is received, the computing device 110 may continue providing the menu page of FIG. 4B, by way of an example.

Meanwhile, when a map based on the current position of the computing device 110 is displayed as illustrated in FIG. 3 via the first display area 301 in operation S201 of FIG. 2, the computing device 110 may generate a life content based on movement of a user by using an automatic check-in function or generate a life content based on a user activity according to a user input in operation S202.

FIGS. 5A through 5K are views illustrating generating a life content based on a user activity by using the computing device 110 according to an exemplary embodiment. FIGS. 5A through 5K are views illustrating illustrate an example of generating a content obtained by using a camera mounted in the computing device 110 as a life content.

Figure 5A:
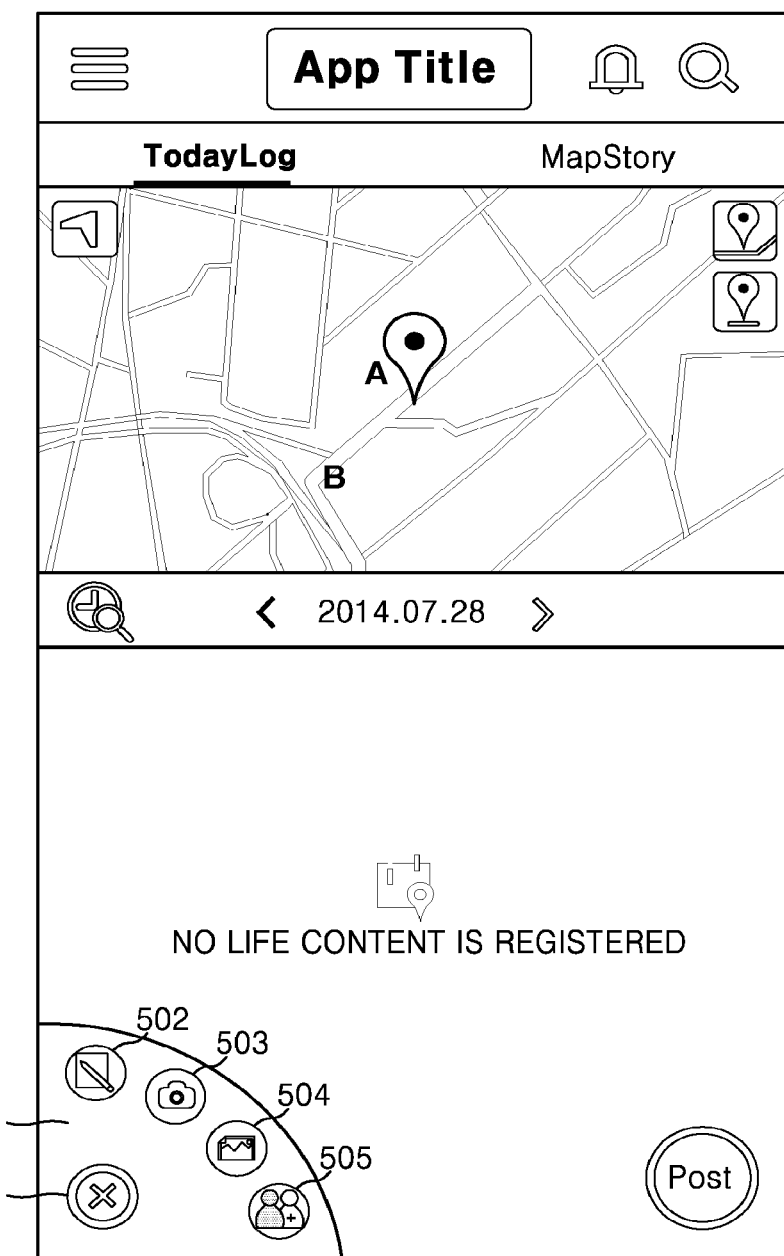
FIGS. 5A through 5K are views illustrating generating a life content based on a user activity by using a computing device according to an exemplary embodiment.

When a touch-based input selecting the life content generating item 311 illustrated in FIG. 3 is received, by way of an example, the computing device 110 opens a content obtaining method selection window 501 illustrated in FIG. 5A. While the content obtaining method selection window 501 is opened, when a touch-based input selecting the life content generating item 311 is received, the computing device 110 closes the content obtaining method selection window 501. Opening of the content obtaining method selection window 501 denotes that the content obtaining method selection window 501 is displayed on a display of the computing device 110. Closing of the content obtaining method selection window 501 denotes that the content obtaining method selection window 501 displayed on the display of the computing device 110 disappears. A user input selecting the life content generating item 311 is not limited to the touch-based tap input described above. The computing device 110 may provide the content obtaining method selection window 501 in the form of a popup window.

The computing device 110 may provide the content obtaining method selection window 501 including items such as a memo icon 502, a camera icon 503, an album search icon 504, and a joining icon 505, but items provided via the content obtaining method selection window 501 are not limited thereto but are provided by way of an example.

For example, the computing device 110 may provide the content obtaining method selection window 501 which further includes a sound recording icon and a video recording icon. If more items are included in the content obtaining method selection window 501 than those illustrated in FIG. 5A, the computing device 110 may provide selectable items while rotating the content obtaining method selection window 501 according to a user input.

When a touch-based tap input selecting the memo icon 502 is received, the computing device 110 may provide a memo page. When a touch-based tap input selecting the camera icon 503 is received, the computing device 110 may provide a camera execution page. When a touch-based tap input selecting the album search icon 504 is received, the computing device 110 may provide an album page via which an image may be selected. When a touch-based tap input selecting the joining icon 505 is received, the computing device 110 may provide a friend list page.

The joining icon 505 is a function of sharing life content that is generated in real time with at least one friend selected based on a friend list page provided by using the computing device 110. Friends provided via the friend list page may include at least one of friends registered via a social network service channel (e.g., friends registered on Facebook) and at least one person who is within a predetermined distance (e.g., within 50 m) among persons registered to a phonebook of the computing device 110, provided by way of an example but are not limited thereto. For example, friends provided via the friend list page may be set in advance by using the computing device 110.

Items included in the content obtaining method selection window 501 may be referred to as life content input tool icons, and the content obtaining method selection window 501 may be referred to as a life content input tool window. Items included in the content obtaining method selection window 501 may be provided in the form of identification information with respect to a life content input tool.

FIGS. 5B through 5K are views illustrating generating life content by using the computing device 110 such as the camera icon 503 selected via the content obtaining method selection window 501 illustrated in FIG. 5A, according to an exemplary embodiment.

Figure 5B:

When the camera icon 503 is selected in FIG. 5A, the computing device 110 may provide a camera execution page as illustrated in FIG. 5B. When an image capture button 506 is selected based on the camera execution page illustrated in FIG. 5B, the computing device 110 may provide a page for selecting whether to store a photographed image, as illustrated in FIG. 5C.

Figure 5C:
Figure 5D:
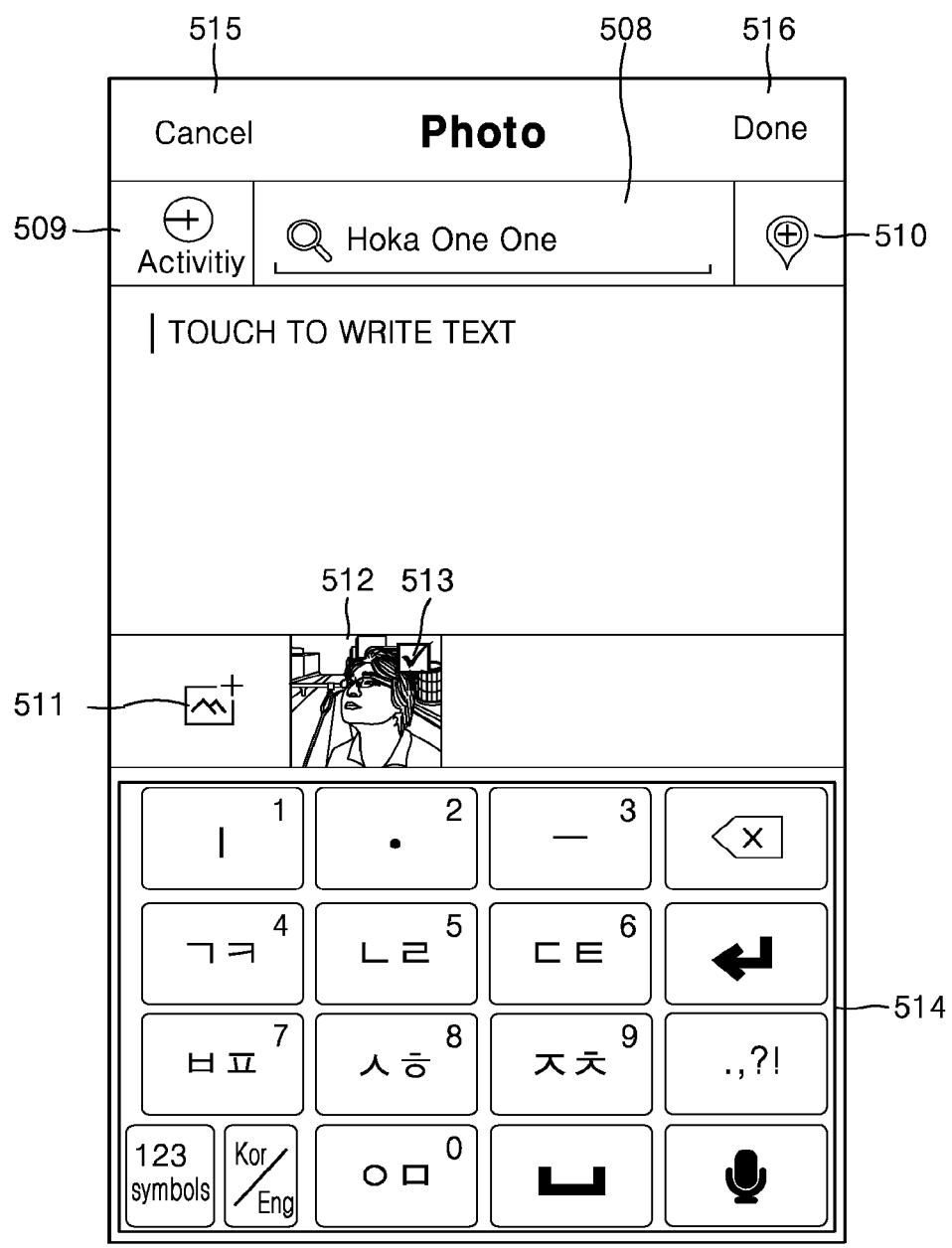

When a storage button 507 is selected in FIG. 5C, the computing device 110 may provide a page where information to be included in the life content based on the obtained image may be input, as illustrated in FIG. 5D. When a cancel button 508 is selected in FIG. 5C, the computing device 110 may return from the page illustrated in FIG. 5C to the page illustrated in FIG. 3 or FIG. 5A, according to an exemplary embodiment.

The computing device 110 may provide life content generating position information via the item 508 included in a page illustrated in FIG. 5D. The life content generating position information may be position information searched by the automatic check-in function of the computing device 110, but is provided by way of an example and is not limited thereto. For example, when there is no automatic check-in value by the computing device 110 at a position where life content is generated, and a touch-based tap input selecting the item 508 is received, the computing device 110 may provide a check-in list under the item 508 or open a check-in list window. The information about the position where the life content is generated may be referred to as a check-in value.

Figure 5E:
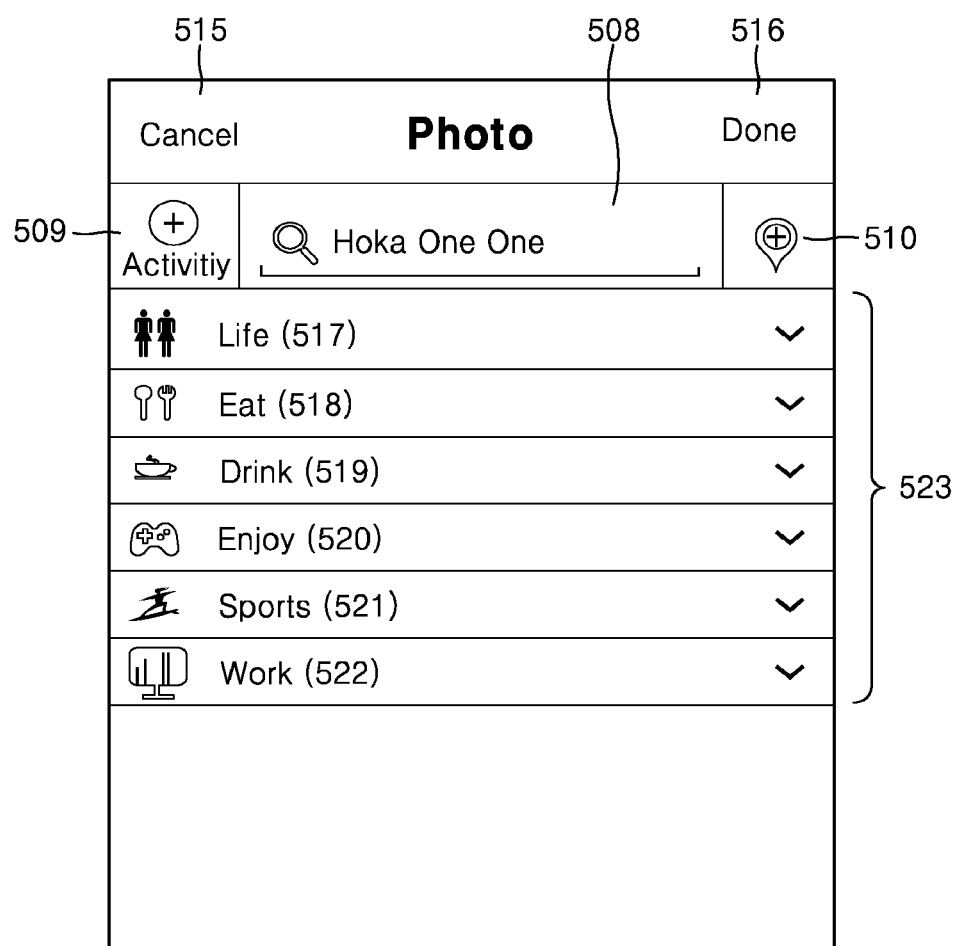

When a touch-based tap input selecting the item 509 illustrated in FIG. 5D is received, the computing device 110 may provide a page where a user activity item may be selected. That is, when a touch-based tap input selecting the item 509 is received, the computing device 110 may provide a page 523 where category items 517 through 522 may be selected, as illustrated in FIG. 5E, according to an exemplary embodiment. The computing device 110 may provide a page 523 where the category items 517 through 522 may be selected, in the form of a popup window.

Figure 5F:
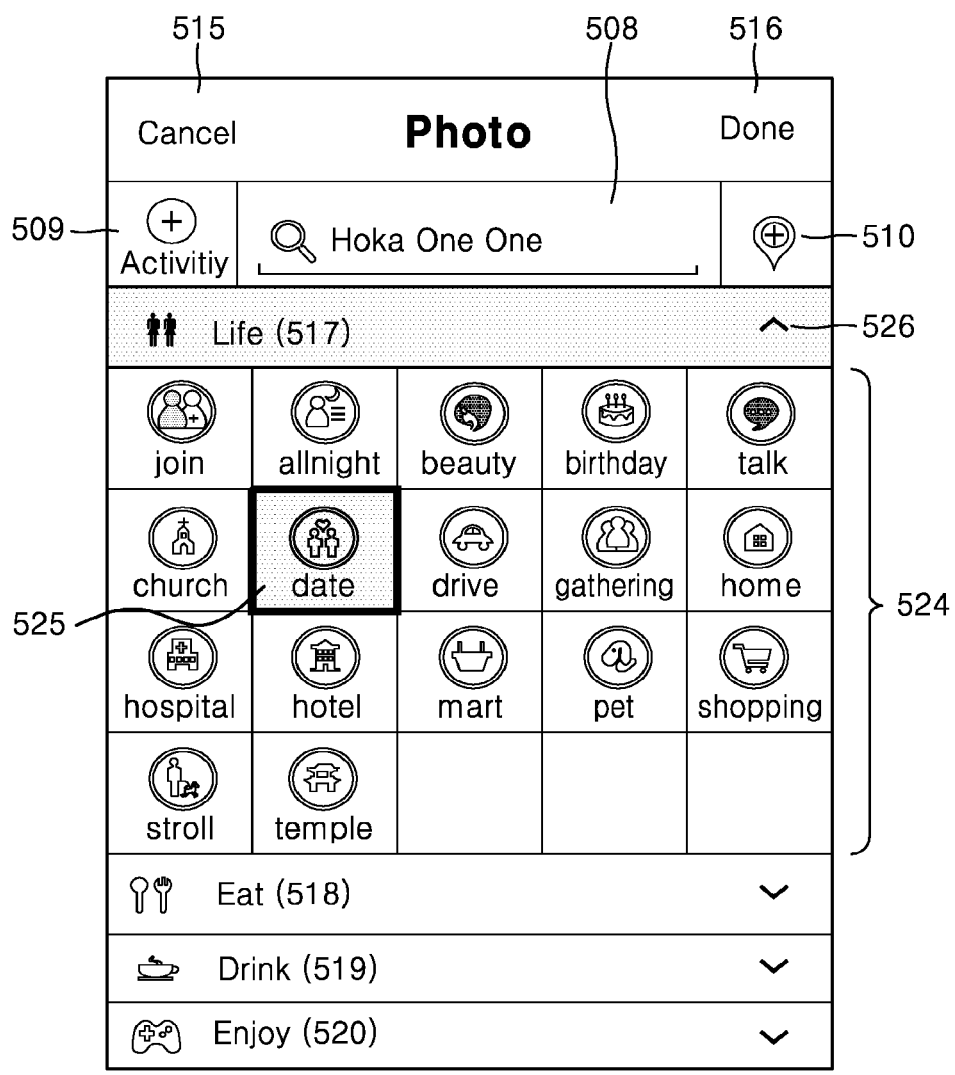

When a touch-based tap input selecting Life 517 from among the category items 517 through 522 illustrated in FIG. 5E is received, the computing device 110 may provide a user activity item selection window 524 related to Life 517 as illustrated in FIG. 5F, according to an exemplary embodiment.

Figure 5G:
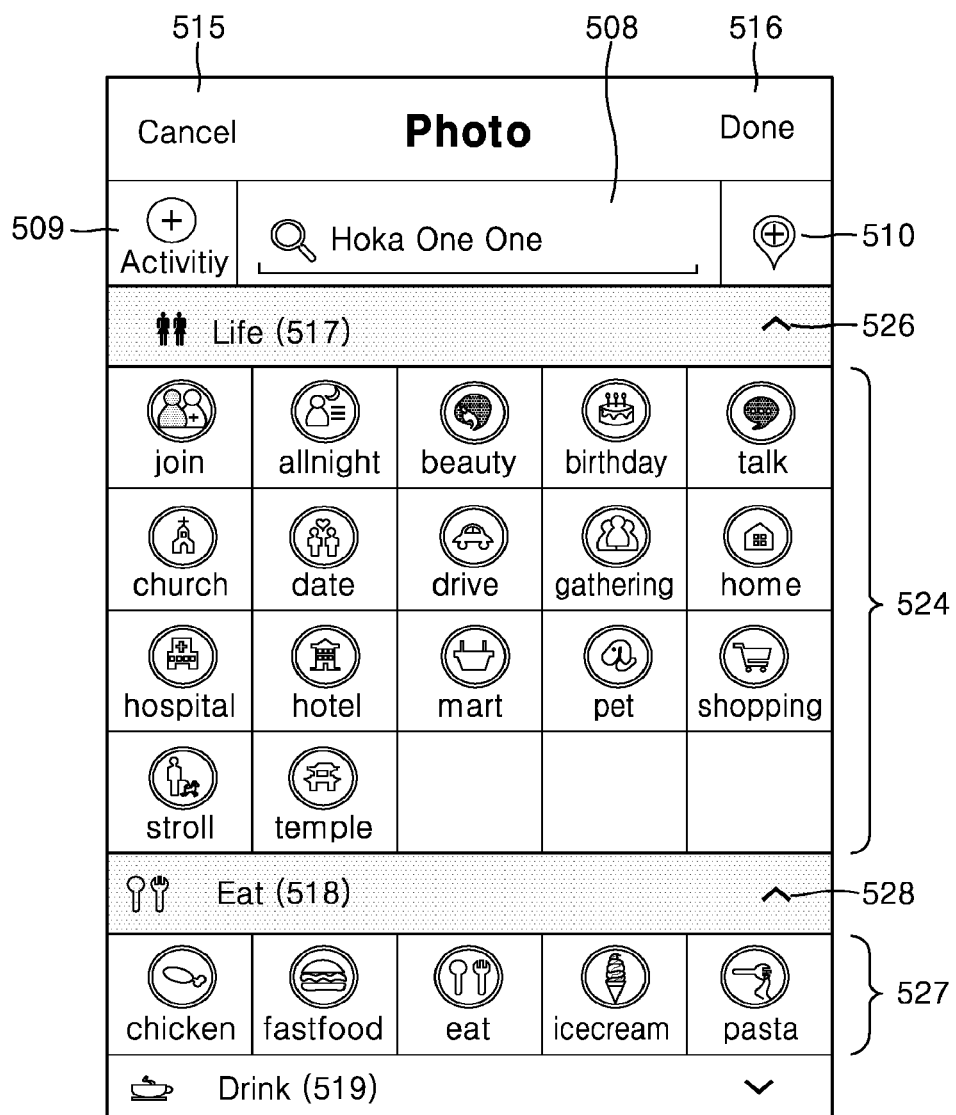
Figure 5H:
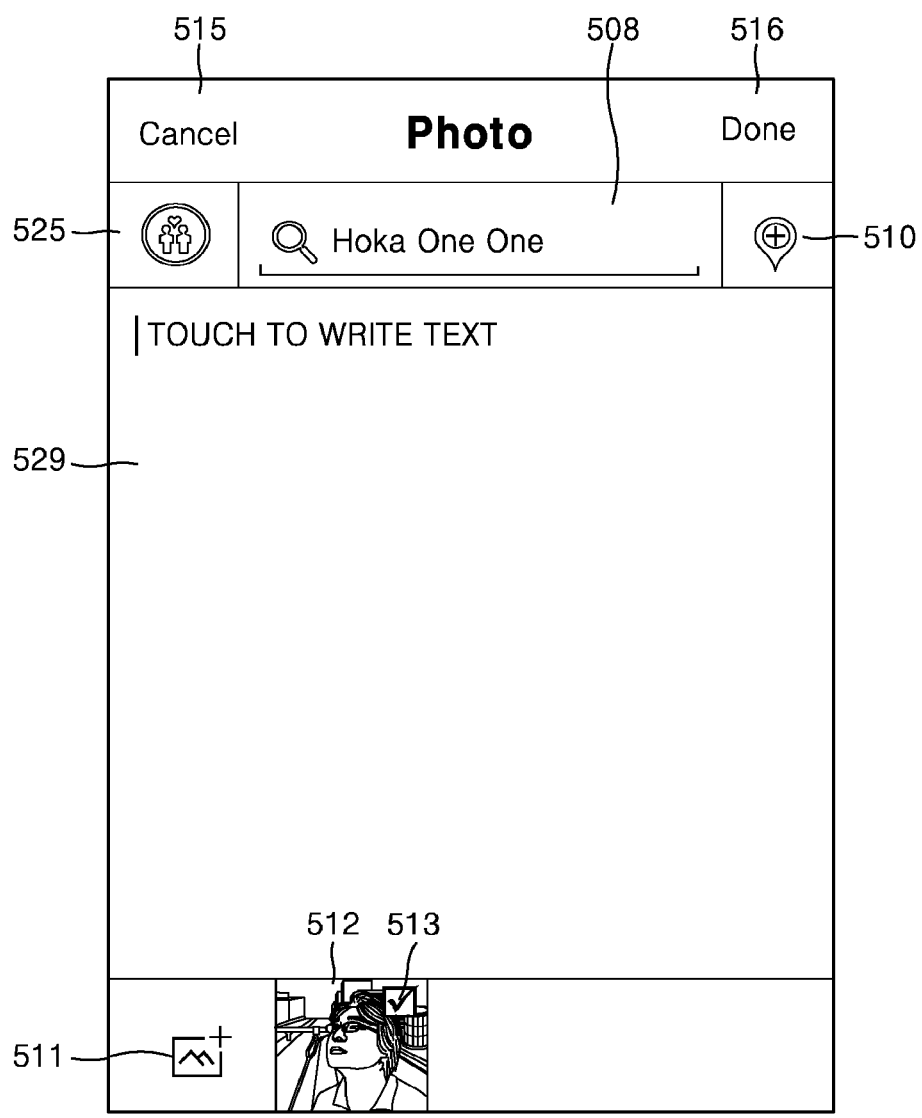

When a touch-based tap input selecting a user activity item (e.g., Date 525) is received via the user activity item selection window 524 illustrated in FIG. 5F, the computing device 110 reflects the selected user activity item 525 as illustrated in FIG. 5H, according to an exemplary embodiment, and closes the user activity item selection window 524 and the page 523 where the category items 517 through 522 may be selected.

In FIG. 5F, when a touch-based tap input selecting a clamp item 526 is received, the computing device 110 closes the user activity item selection window 524 that is opened under Life 517, according to an exemplary embodiment.

While the user activity item selection window 524 is not closed in FIG. 5F, when a touch-based tap input selecting Eat 518 is received, the computing device 110 opens a user activity item selection window 527 related to Eat 518 under Eat 518 as illustrated in FIG. 5G.

When a touch-based tap input selecting a clamp item 528 is received in FIG. 5G, the computing device 110 closes the user activity item selection window 527 opened under Eat 518.

As described above, when a touch-based tap input selecting Drink 519 is received in FIG. 5F, according to an exemplary embodiment, the computing device 110 may open a user activity item selection window (not shown) related to Drink 519 under Drink 519. When Enjoy 520 is selected in FIG. 5F, the computing device 110 may open a user activity item selection window related to Enjoy 520 under Enjoy 520.

When a user input selecting each of the category items 517 through 522 is received, the computing device 110 may open all of the user activity item selection windows respectively under the related category items 517 through 522. If opened user activity item selection windows may not be provided via one page, the computing device 110 may provide the opened user activity item selection windows according to a screen scroll input.

When a user activity item 525 is selected on the user activity item selection window 524 as illustrated in FIG. 5F, according to an exemplary embodiment, the computing device 110 changes the item 509 of FIG. 5D to the user activity icon 525 selected in FIG. 5F, as illustrated in FIG. 5H.

Figure 5I:
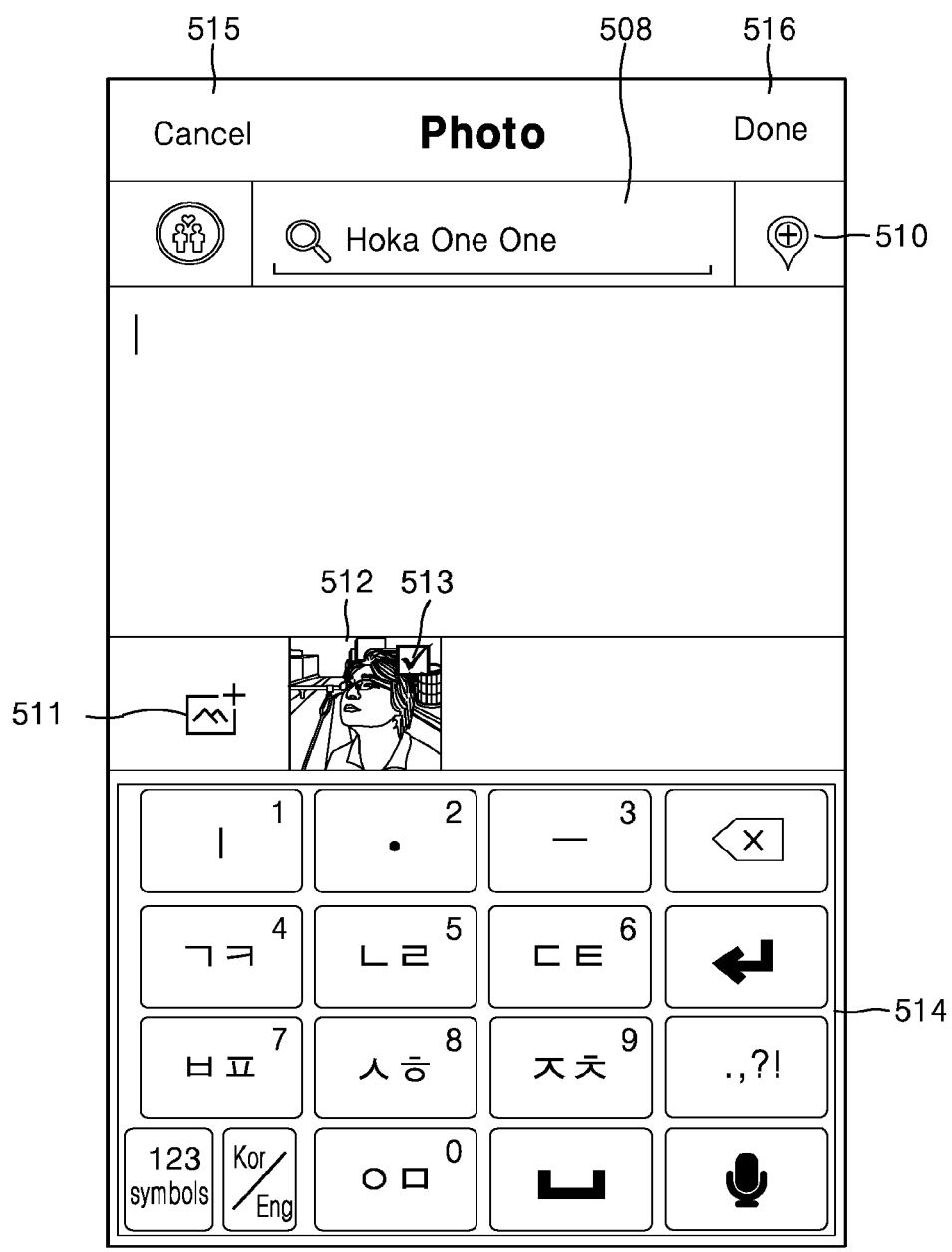

When a page illustrated in FIG. 5H is provided, and a touch-based tap input related to an area 529 where text may be input is received, the computing device 110 opens a virtual keyboard window 514 as illustrated in FIG. 5I. The virtual keyboard window 514 is not limited as illustrated in FIG. 5I but is provided by way of an example.

Figure 5J:
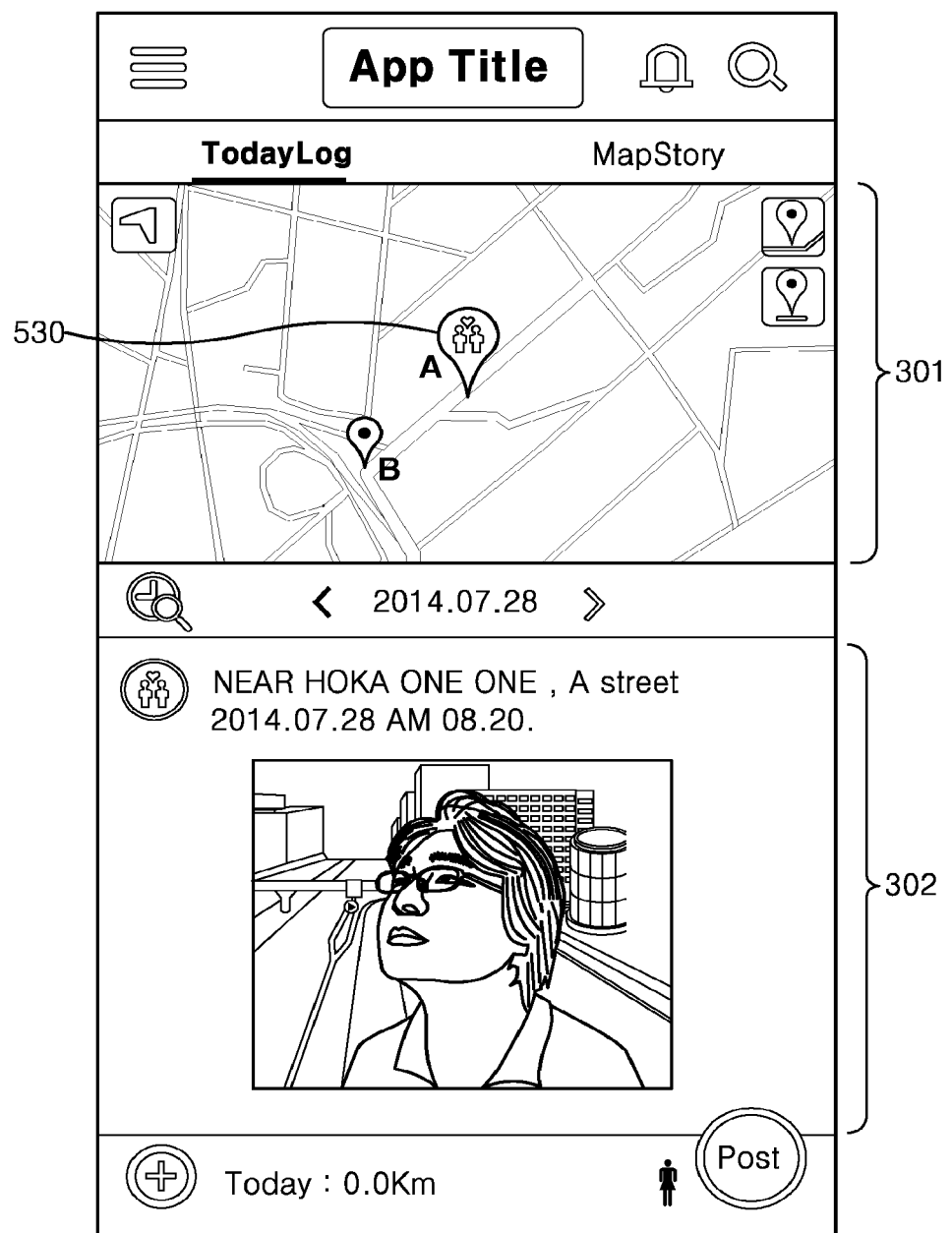

After text is input by a user via the virtual keyboard window 514, when a Done item 516 is selected, the computing device 110 generates a life content and displays the life content in the second display area 302 as illustrated in FIG. 5J, according to an exemplary embodiment, and automatically changes a map displayed on the first display area 301 to a map including a marker 530 synchronized with the generated life content.

In the pages illustrated in FIGS. 5D, 5E, 5F, 5G, 5H, and 5I, when a touch-based tap input selecting the Done item 516 is received, the computing device 110 may generate life content based on information of pages obtained so far. For example, when the Done item 516 on the page illustrated in FIG. 5D is selected, the computing device 110 may generate life content that the user activity icon (camera icon) selected via the content obtaining method selection window 501 is set as a default activity icon. The generated life content may include a user activity icon (camera icon) set as the default activity icon, a picture, position information, time, and date.

When the Done item 516 is selected on the page illustrated in FIG. 5H, a life content generated by using the computing device 110 may include a user activity icon (Date 525) selected by a user, a picture, position information, and time and date information. When the Done item 516 is selected on the page illustrated in FIG. 5I, a life content generated by using the computing device 110 may include a user activity icon (Date 525) selected by a user, a picture, position information, time information, date information, and an input text.

When a Cancel item 515 is selected on the pages illustrated in FIGS. 5D, 5E, 5F, 5G, 5H, and 5I, the computing device 110 may return to the page illustrated in FIG. 3 or FIG. 5A, according to an exemplary embodiment.

When an item 510 is selected on the pages illustrated in FIGS. 5D, 5E, 5F, 5G, 5H, and 5I, the computing device 110 may provide map-based additional position information. The item 510 may be used to add another position information besides the position information displayed in the item 508.

Figure 5K:
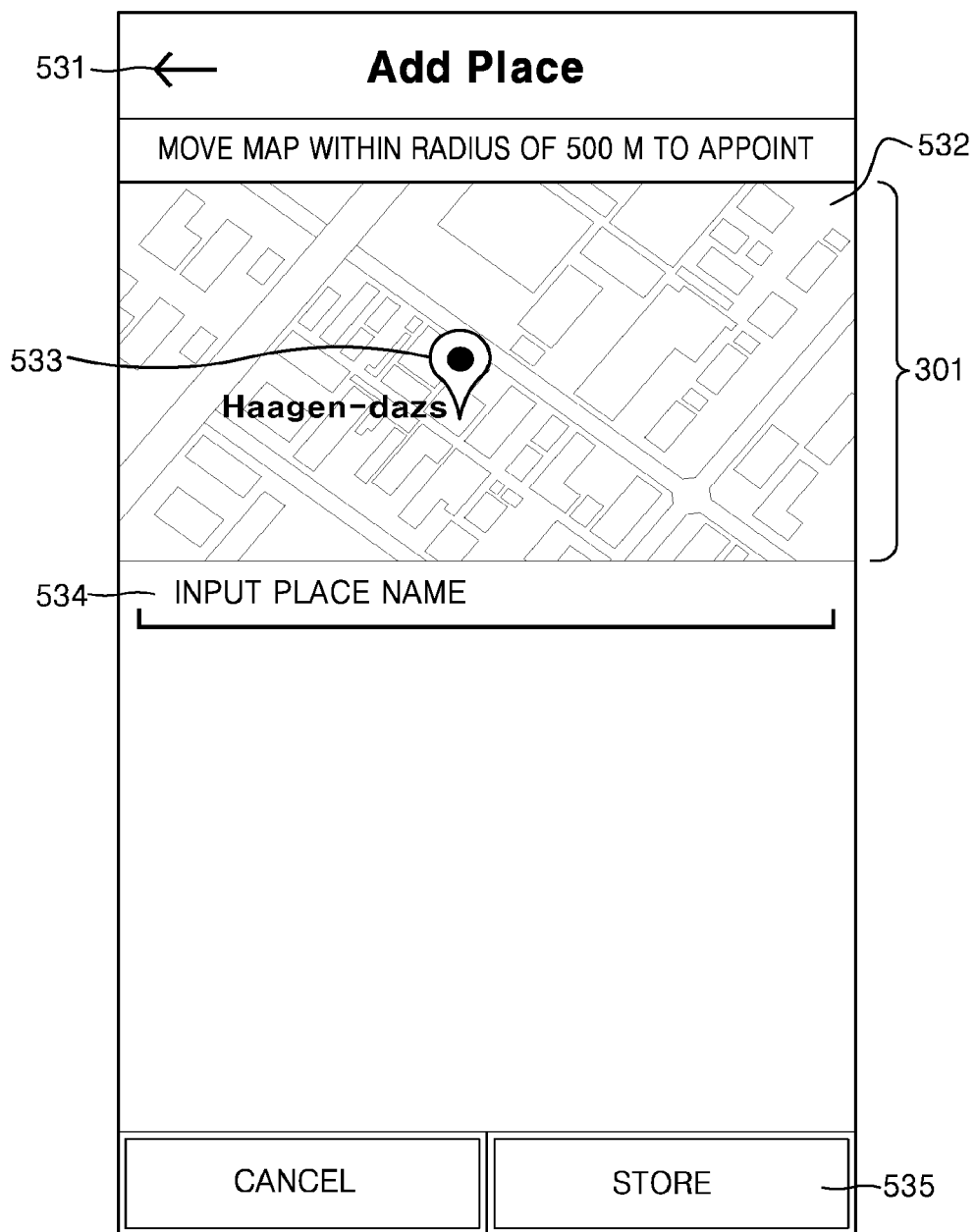

When the item 510 is selected on the pages illustrated in FIGS. 5D, 5E, 5F, 5G, 5H, and 5I, the computing device 110 may provide a screen such as the one shown in FIG. 5K. FIG. 5K is a view illustrating a page where map-based additional position information provided by the computing device 110 may be selected, according to an exemplary embodiment. In FIG. 5K, an item 531 denotes a back button.

A position 533 of a place is appointed by scrolling a map 532 illustrated in FIG. 5K, according to an exemplary embodiment, and a check-in name about the appointed position 533 is input into a window 534, and a Confirm item (store) 535 is selected, the computing device 110 may provide the check-in name, input via the item 508 while moving to the page illustrated in FIG. 5D, according to an exemplary embodiment.

When an item 511 is selected in FIGS. 5D, 5H, and 5I, the computing device 110 moves to the camera execution page illustrated in FIG. 5B to allow photographing or capturing a new image. The computing device 110 displays a newly photographed image at a position where a previously photographed image 512 is displayed and shifts the previously photographed image 512 to the right, by way of an example and not by way of a limitation.

The computing device 110 maintains a display position of the item 511. The user may capture a plurality of images that may be included in one piece of life content by using the item 511. The computing device 110 may select an image to be included in a life content to be generated, according to whether a check box 513 (see FIGS. 5H and 5I) included in each of photographed images is checked or not.

When a user input selecting one of the memo icon 502, the album search icon 504, and the joining icon 505 is received, the computing device 110 may obtain content in a similar manner as the camera icon 503 described above and generate a life content including the obtained content according to an exemplary embodiment.

A life content based on a user movement item may be generated via an automatic check-in function by using a global positioning system (GPS) satellite signal of the computing device 110, but a method of generating a life content based on a user movement item is not limited thereto. For example, a life content based on a user movement item may be generated via an automatic check-in function by using a beacon.

Every time when a life content of a user is generated according to the methods described above with reference to FIGS. 5A through 5K, according to exemplary embodiments, the computing device 110 displays generated contents on the second display area 302 in time series in operation S203 of FIG. 2. The operation of the computing device 110 in operation S203 may be that, every time when a life content is generated, the computing device 110 updates the second display area 302 with the generated life content. In operation S204, the computing device 110 changes a map displayed on the first display area 301 to a map including a marker synchronized with life content that is newly displayed on the second display area 302. The operation of the computing device 110 in operation S204 may be that the computing device 110 displays on the map the marker synchronized with the life content that is newly displayed on the second display area 302. The computing device 110 may perform operations S203 and S204 almost simultaneously, by way of an example and not by way of a limitation. In operation S204, the computing device 110 may focus on the map a path synchronized with the life content that is newly displayed on the second display area 302.

Figure 6:
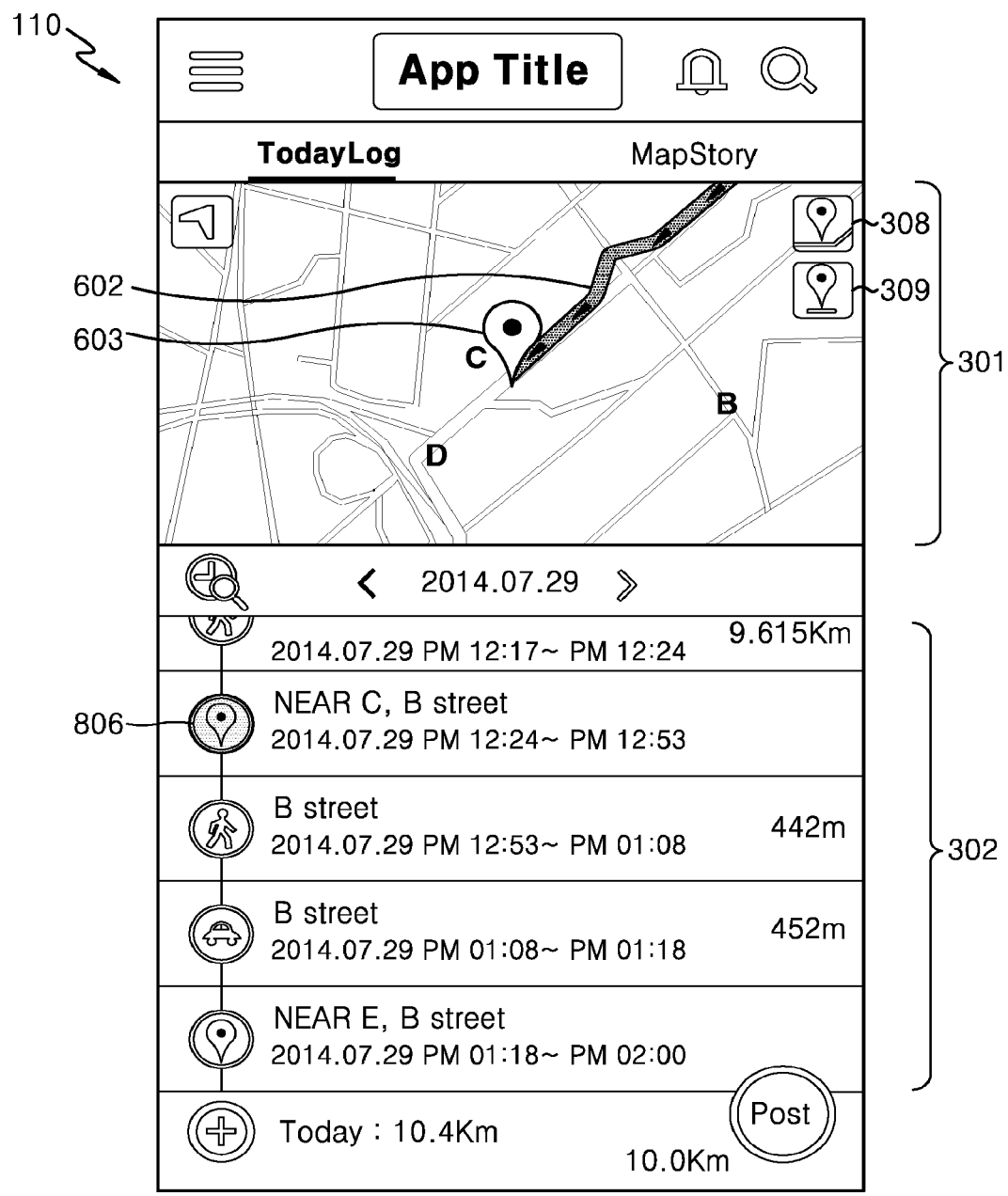
FIG. 6 is a view illustrating a life content providing mode according to an exemplary embodiment, in which a map view is a single path view and also a path-and-marker view.

When a plurality of pieces of life contents are generated by the computing device 110 based on operations S202 through S204 of FIG. 2, the computing device 110 may provide a screen as illustrated in FIG. 6, according to an exemplary embodiment. FIG. 6 is a view illustrating a life content providing mode according to an exemplary embodiment, in which a map view mode is a single path view mode and also a path-and-marker view mode.

Referring to FIG. 6, the computing device 110 displays a plurality of pieces of life content generated on Jul. 29, 2014 on the second display area 302 in time series, and displays a map focused on a path 602 synchronized with content 601 that is activated on the second display area 302 and a marker 603, on the first display area 301.

The computing device 110 may display the content 601 activated on the second display area 302 and content inactivated on the second display area 302 such that a user may intuitively recognize the same. For example, the computing device 110 may display an icon corresponding to the activated content 601 in blue and icons corresponding to the inactivated content in gray, this is provided by way of an example only. Alternatively, the computing device 110 may highlight an area where the activated content 601 is displayed. The computing device 110 may activate a content displayed on the second display area 302 according to a user input selecting the content displayed on the second display area 302.

Figure 7:
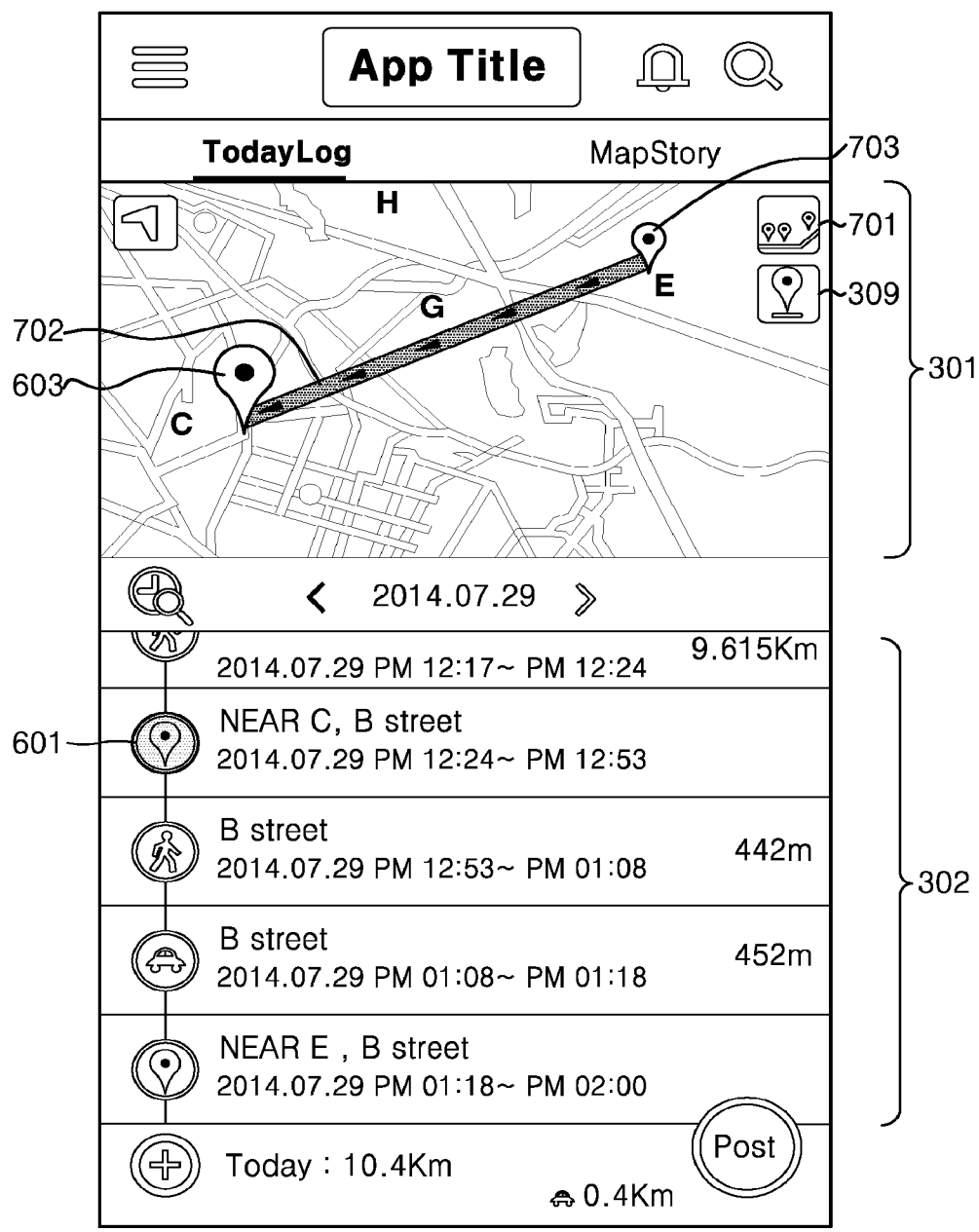
FIG. 7 is a view illustrating a life content providing mode according to an exemplary embodiment, in which a map view is a full path view and also a path-and-marker view.

When a touch-based tap input selecting the item 308, for example, included in the first display area 301 of FIG. 6 is received, the computing device 110 may change a map view mode from the single path view mode to a full path view mode. Accordingly, the computing device 110 may change a map displayed on the first display area 301 illustrated in FIG. 6 to a map displayed on the first display area 301 illustrated in FIG. 7. FIG. 7 is a view illustrating a life content providing mode according to an exemplary embodiment, in which a map view mode is a full path view mode and also a path-and-marker view mode.

When a touch-based tap input selecting the item 308 illustrated in FIG. 6 is received, the computing device 110 changes the item 308 indicating a single path view mode to an item 701 indicating a full path view mode illustrated in FIG. 7. The map displayed on the first display area 301 of FIG. 7 includes a path 702 that is synchronized with all contents included in the second display area 302 and markers 603 and 703 synchronized with life contents included in the second display area 302.

The map displayed on the first display area 301 of FIG. 7 includes the two markers 603 and 703 as an actual distance corresponding to the path 702 is a long distance (e.g., more than 5 km). However, if an actual distance corresponding to the path 702 is a short distance (e.g., less than 5 km), the computing device 110 may display a marker synchronized with each piece of life contents.

If a plurality of markers is included in the map displayed on the first display area 301, the computing device 110 may display the markers such that a marker synchronized with a life content activated on the second display area 302 is distinguished from other markers. For example, the computing device 110 may display a marker synchronized with a life content activated on the second display area 302 in blue, and other markers in gray, provided by way of an example only and not by way of a limitation.

Figure 8:
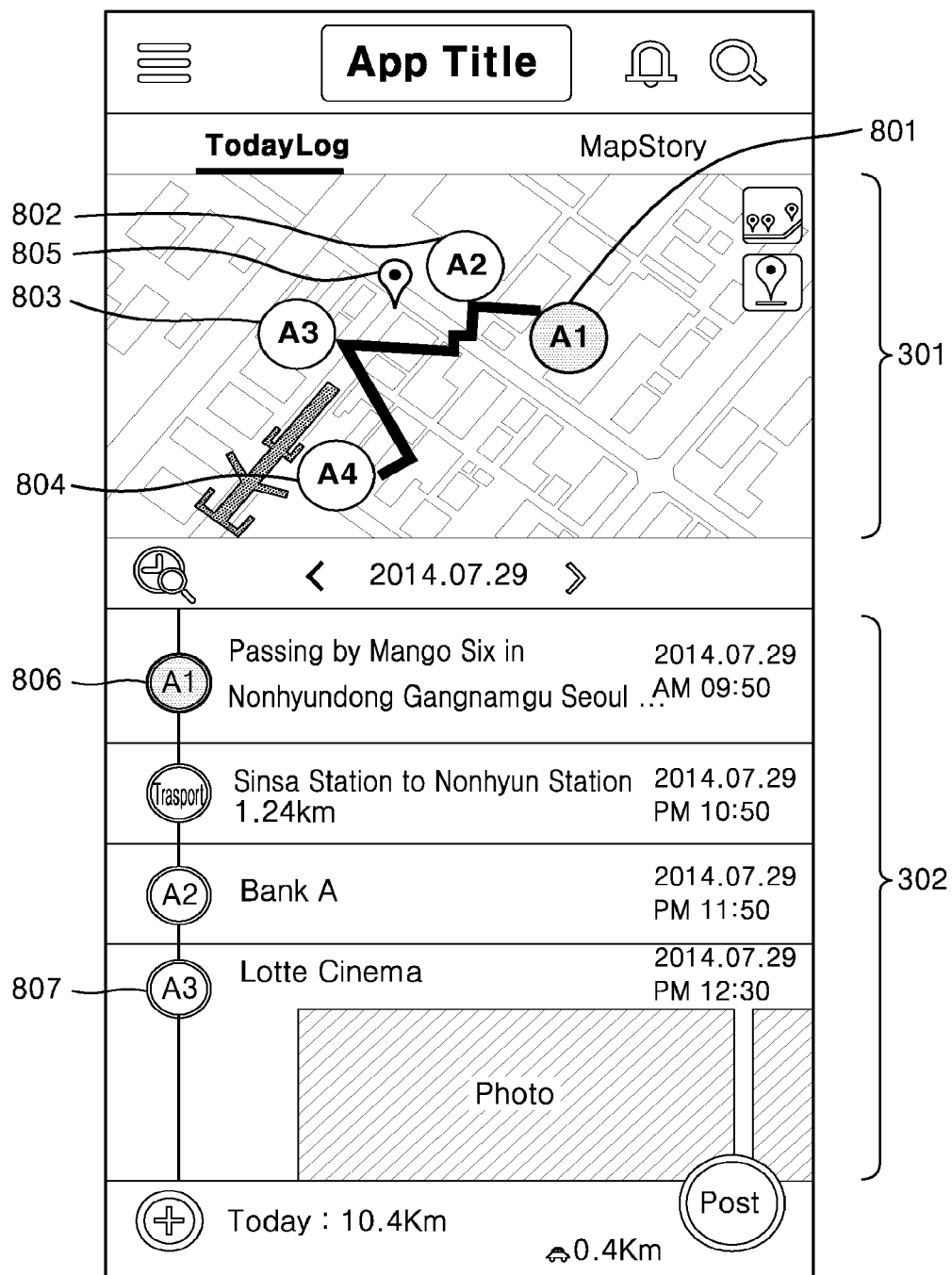
FIG. 8 is a view illustrating a map including markers synchronized with life content and a current position display icon displayed on a first display area, according to an exemplary embodiment.

FIG. 8 is a view illustrating, on the first display area 301, a map including markers 801, 802, 803, and 804 synchronized with all life contents included in the second display area 302 and a current position indication icon 805, according to an exemplary embodiment. Referring to FIG. 8, the computing device 110 displays life content 806 that is activated on the second display area 302 and the marker 801 synchronized with the life content 806, differently from other life contents and other markers such that a user may intuitively identify the life content 806 and the marker 801.

Life contents included in the second display area 302 illustrated in FIG. 8 are arranged in time series. Thus, an axis along which icons included in the second display area 302 are displayed may be referred to as a time line. The computing device 110 may provide a menu window (not shown) via which Edit/Delete/Share may be selected for each piece of life contents included in the second display area 302.

For example, when a long touch input on each piece of life contents is received, the computing device 110 may provide a popup window via which Edit/Delete/Share may be selected, and if one item is selected based on the provided popup window, the computing device 110 may provide a page corresponding to a selected item (e.g., an edit page or a share page) or provide a corresponding message (e.g., a delete confirm message).

Figure 9:
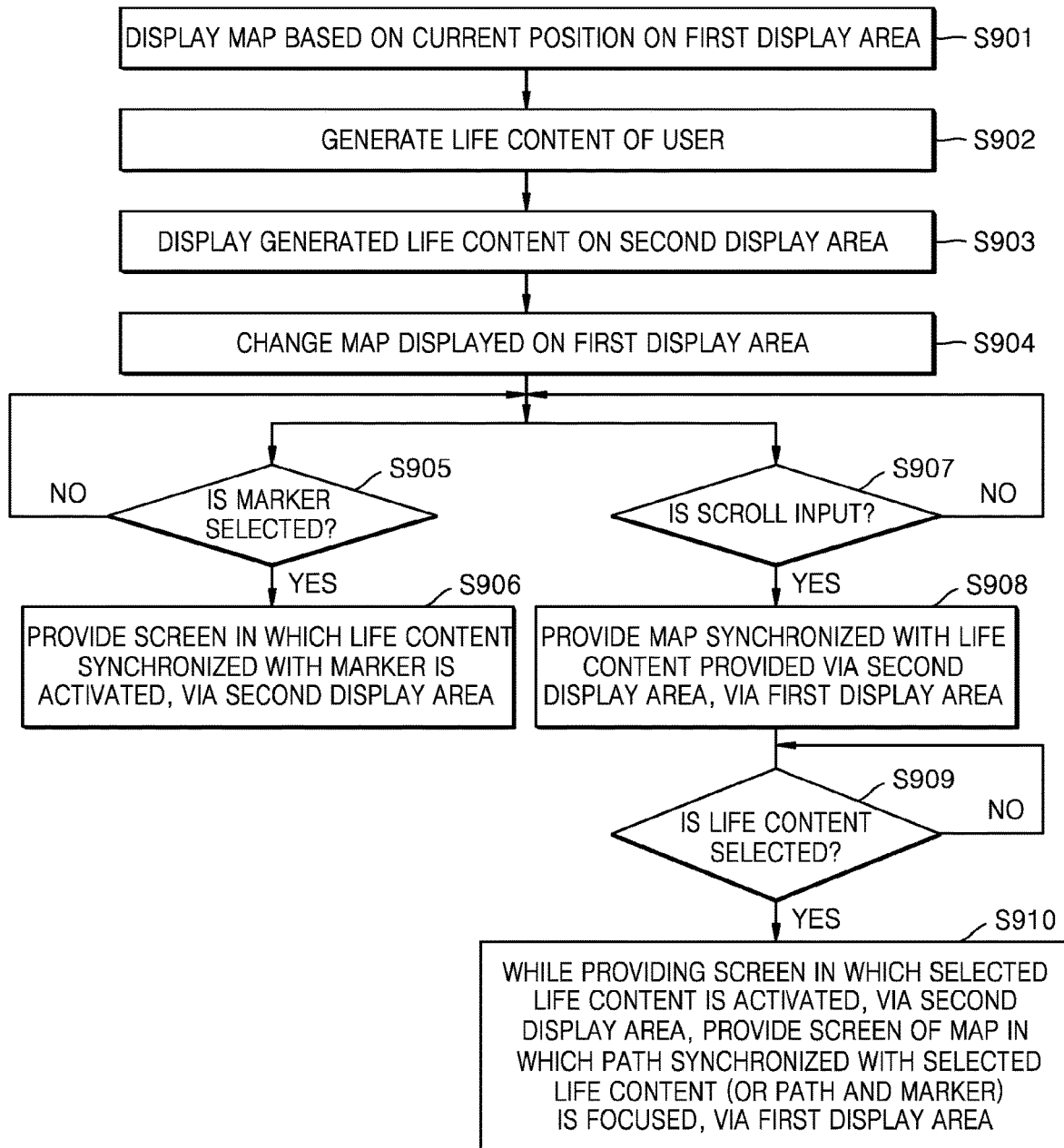
FIG. 9 is a flowchart of a life log service method according to yet another exemplary embodiment.

FIG. 9 is a flowchart of a life log service method according to yet another exemplary embodiment. The flowchart of FIG. 9 shows that a synchronization function between a map displayed on the first display area 301 and a life content displayed on the second display area 302 is added to a life log service method such as the one described above with reference to FIG. 2. Operations S901 through S904 of FIG. 9 respectively correspond to operations S201 through S204 of FIG. 2, and thus description thereof will be omitted.

Figure 10:
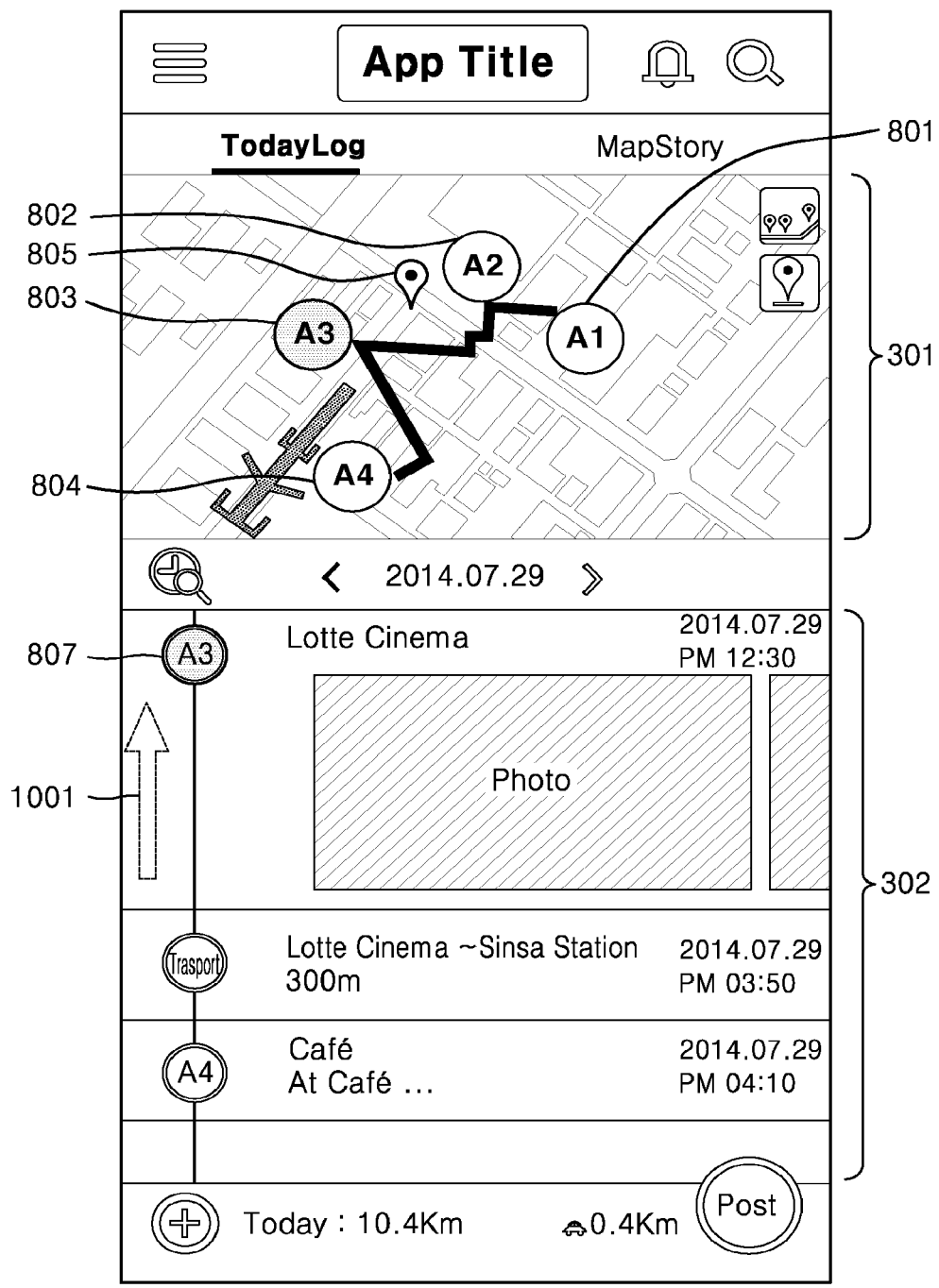
FIG. 10 is a view illustrating a screen provided by using a computing device, such as the one described with reference to FIG. 9, in which a life content corresponding to a selected marker is activated, via a second display area, according to an exemplary embodiment.

In operation S904 of FIG. 9, when the page illustrated in FIG. 8 is provided by the computing device 110, and a user input selecting the marker 803 A3 is received in operation S905, the computing device 110 provides a screen on which a life content 807 corresponding to the selected marker 803 is activated, via the second display area 302, in operation S906. FIG. 10 is a view illustrating a screen provided by using the computing device 110 in operation S906, according to an exemplary embodiment.

In operation S906, the computing device 110 scrolls a screen of the second display area 302 until the life content 807 corresponding to the marker 803 A3 is moved to an uppermost end of the second display area 302. When the life content 902 is moved to the uppermost end of the second display area 302, as illustrated in FIG. 10, the computing device 110 provides a screen where the life content 807 is activated.

In operation S905, before selecting the marker 803, the computing device 110 may perform, according to a map movement input of a user, one of changing a map provided via the first display area 301, extending a map provided via the first display area 301 according to a map extension input of a user, and reducing a map provided via the first display area 301 according to a map reduction input of a user. A map movement input of a user may be a touch-based input such as a swipe, but is provided by way of an example and is not limited thereto. A map extension input or a map reduction input of a user may be a multi-tap input, but is provided by way of an example and not limited thereto.

Also, if the number of pieces of life contents provided via the second display area 302 is small or display positions of life content 806 corresponding to a previously selected marker 801 and life content 807 corresponding to a currently selected marker 803 are close to each other, the user may not sense an operation of a scroll 1001 of FIG. 10 with respect to the second display area 302 performed by the computing device 110.

Figure 11:
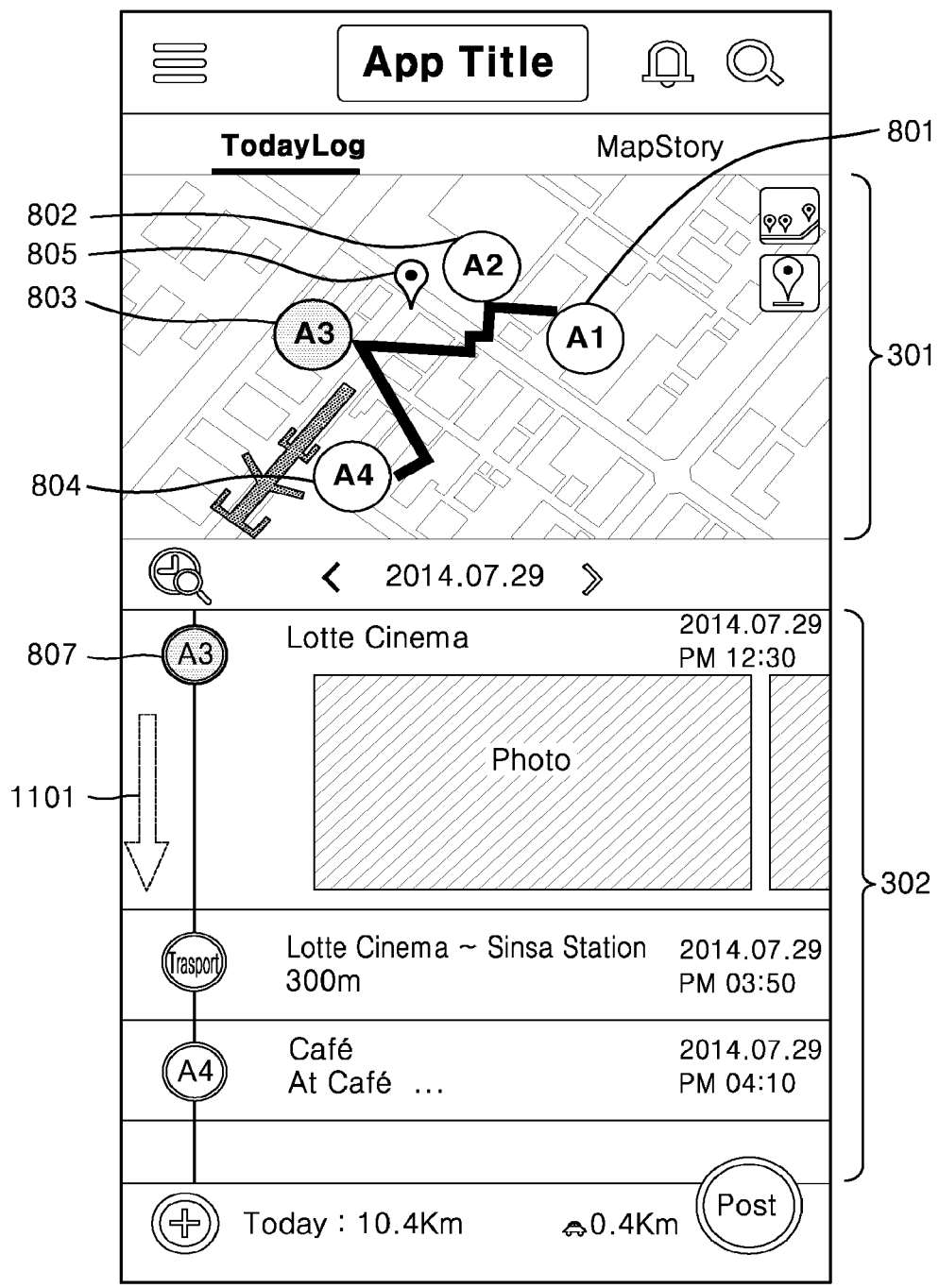
FIG. 11 is a view illustrating a second display area which is being scrolled on, according to an exemplary embodiment.

In operation S904 of FIG. 9, if a screen illustrated in FIG. 10 is provided by the computing device 110, and a touch-based scroll input 1101 of a user with respect to the second display area 302 is received in operation S907 as illustrated in FIG. 11, according to an exemplary embodiment, the computing device 110 may change life content provided via the second display area 302 and provide a map synchronized with the changed life content via the first display area 301 in operation S908. The computing device 110 may change the map displayed on the first display area 301 while automatically zooming in or out. FIG. 11 is a view illustrating the second display area 302 that is scrolled according to an exemplary embodiment.

Figure 12:
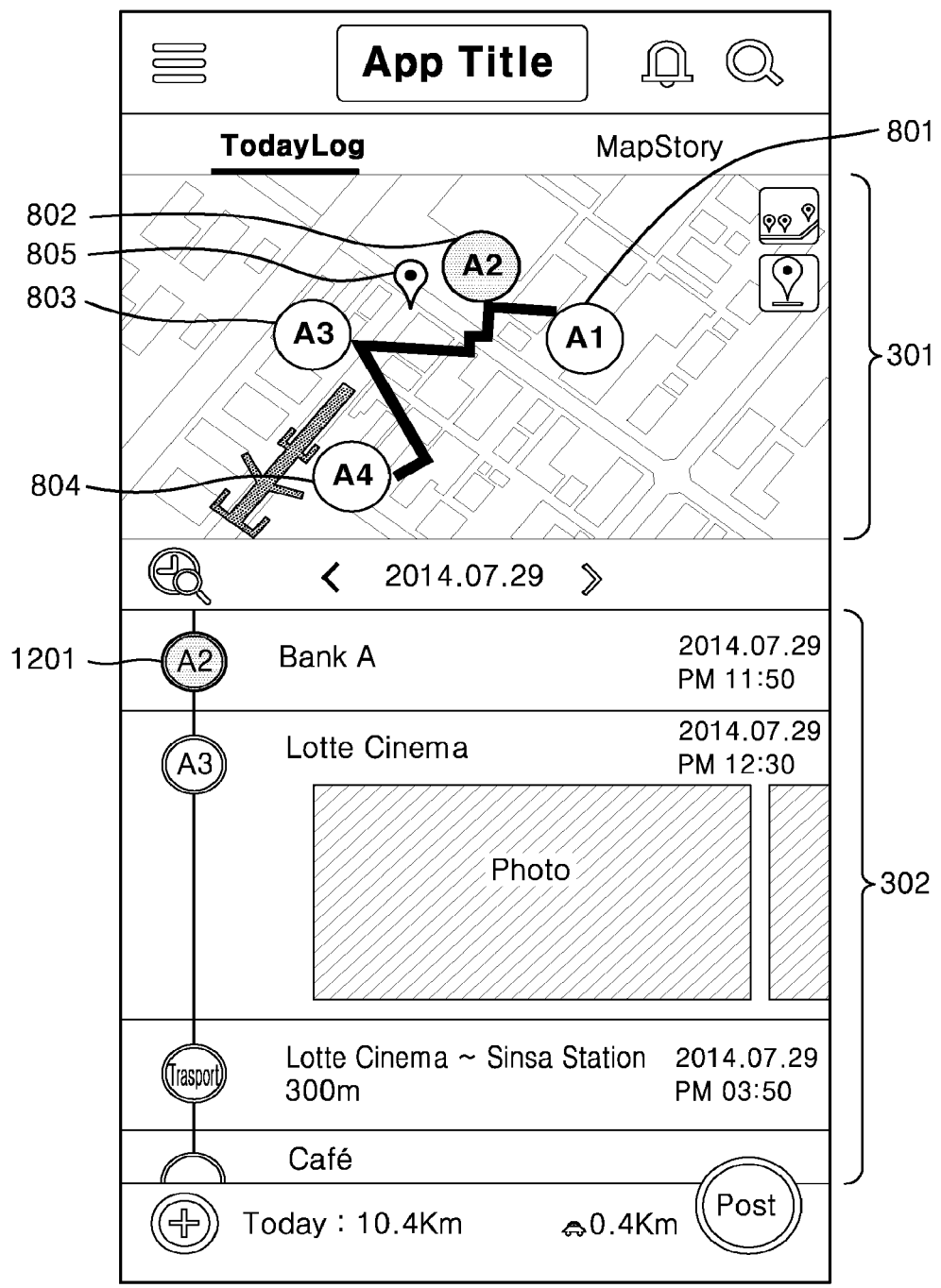
FIG. 12 is a view illustrating a map synchronized with a life content selected by a user, according to an exemplary embodiment.

While operations S907 and S908 described above are performed by the computing device 110, if a touch-based tap input selecting one piece of a life content 1201 (FIG. 12) displayed on the second display area 302 is received in operation S909, the computing device 110 provides a screen in which the selected life content 1201 is activated on the second display area 302 as illustrated in FIG. 12, according to an exemplary embodiment, and also provides a map in which a path and the marker 802 synchronized with the selected life content 1201 are focused, via the first display area 301. FIG. 12 illustrates a map synchronized with a life content selected by a user, according to an exemplary embodiment.

A view mode of the first display area 301 of FIGS. 8, 10, 11, and 12 is a full path view mode, according to an exemplary embodiment. Thus, the computing device 110 provides not only a path synchronized with the life content activated on the second display area 302 but also a path synchronized with all life contents registered to be displayed on the second display area 302, via the first display area 301.

Figure 13:
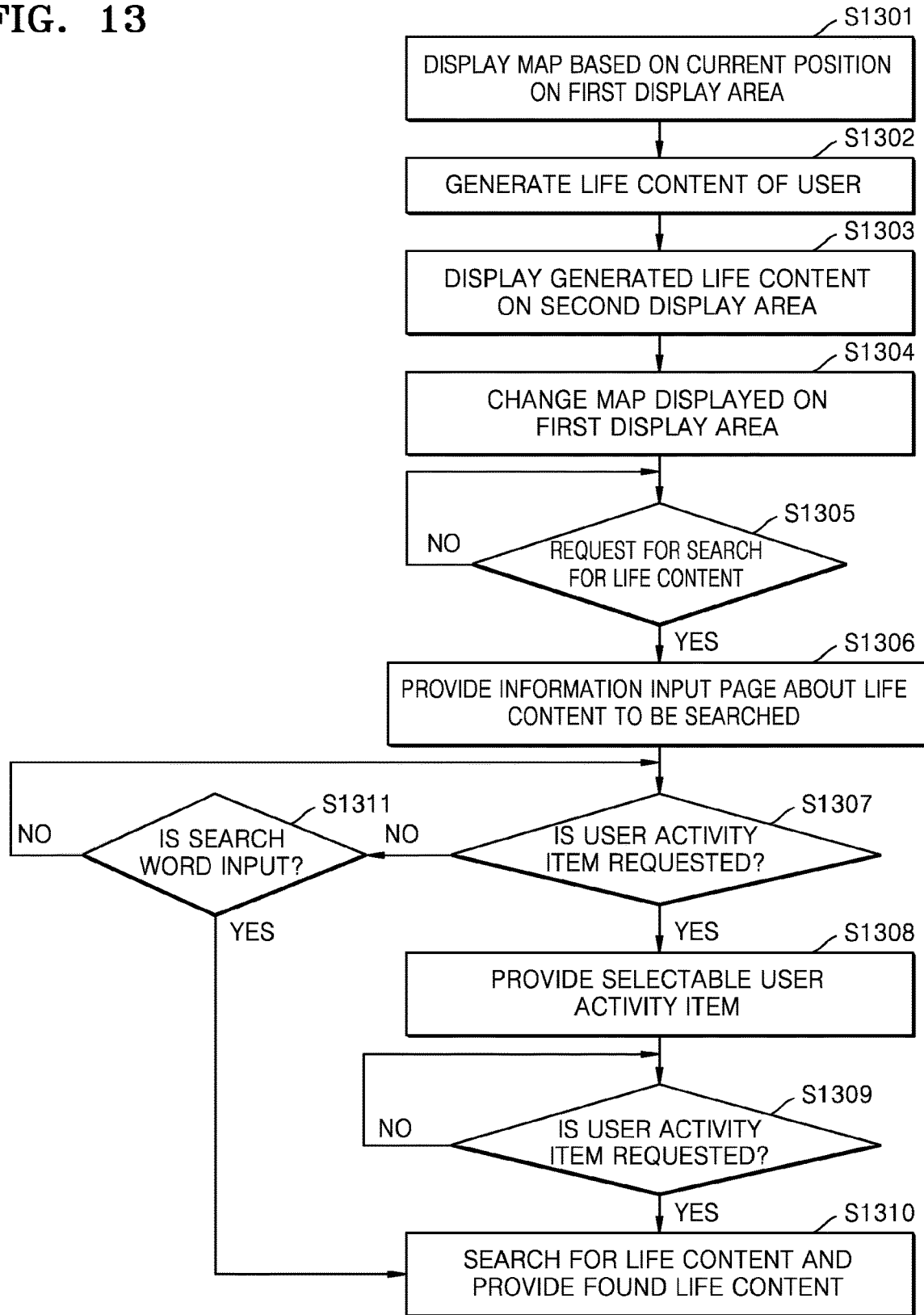
FIG. 13 is a flowchart of a life log service method according to yet another exemplary embodiment.

FIG. 13 is a flowchart of a life log service method according to yet another exemplary embodiment. The flowchart of FIG. 13 shows that a function of searching for life content is added to the operational flowchart such as the one described above with reference to FIG. 2. Operations S1301 through S1304 of FIG. 13 are performed similarly to operations S201 through S204 of FIG. 2, and thus description thereof will be omitted.

Figure 14:
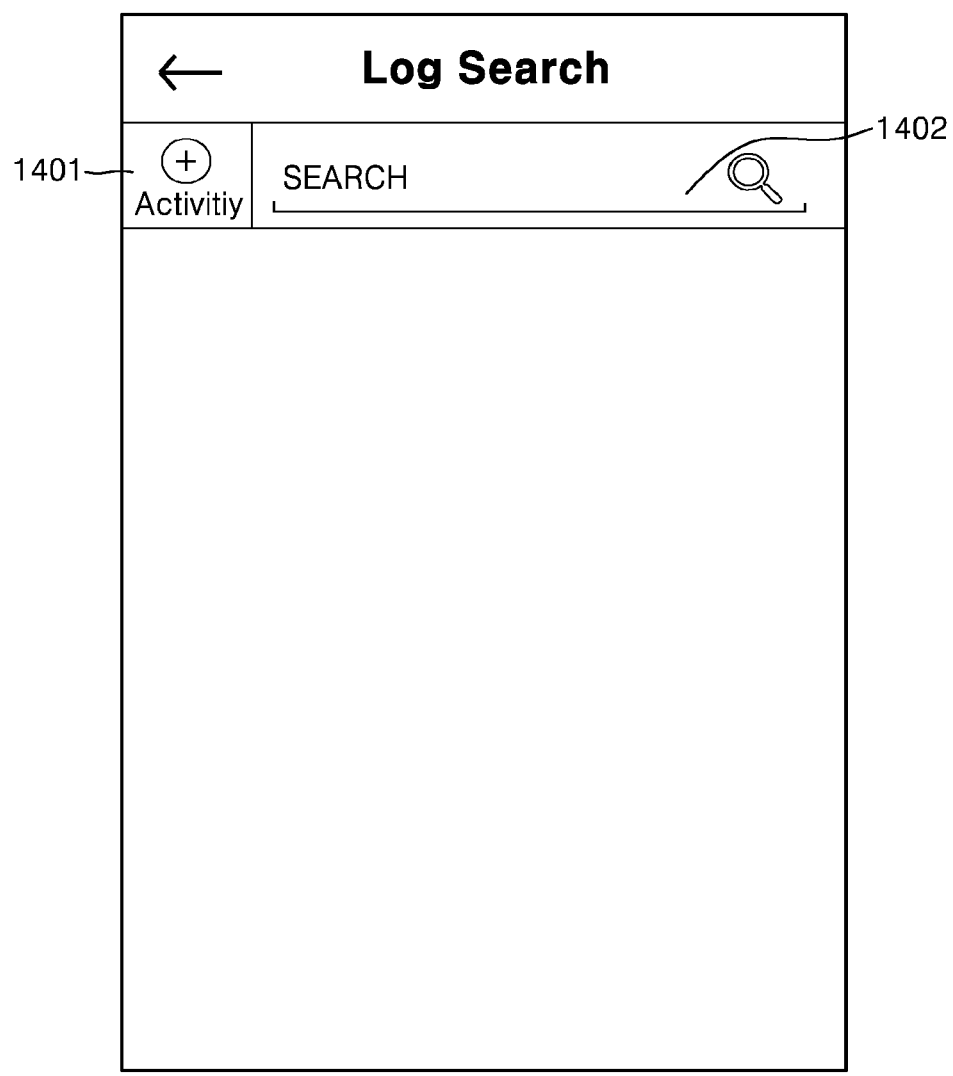
FIG. 14 is a view illustrating a page for inputting information about life content to be searched for, according to an exemplary embodiment.

In operation S1305, if a request for searching for life content is received, the computing device 110 provides a page where information about a life content to be searched for may be input as illustrated in FIG. 14 in operation S1306. FIG. 14 is a view illustrating a page on which information about a life content to be searched is input, according to an exemplary embodiment. The computing device 110 may receive a touch-based tap input selecting the item 315 of FIG. 3 as a request for searching for life content, but an input selecting the item 315 is not limited to a touch-based tap input. A log search illustrated in FIG. 14 refers to a life content search, according to an exemplary embodiment.

Figure 15:
FIG. 15 is a view illustrating a category item list page provided in response to searching for life content, according to an exemplary embodiment.

When a request for a user activity item that is selectable based on an item 1401 illustrated in FIG. 14 is received in operation S1307, the computing device 110 provides category items 1501 through 1506 as illustrated in FIG. 15, according to an exemplary embodiment. FIG. 15 is a view illustrating a category item list page provided when searching for life content, according to an exemplary embodiment. The computing device 110 provides selectable user activity items based on the category items 1501 through 1506 in operation S1308. Selectable user activity items provided based on the category items 1501 through 1506 may be the same as the selectable user activity items provided via the category items 517 through 522 illustrated in FIG. 5E described above, by way of an example and not by way of a limitation.

When one of the category items 1501 through 1506 illustrated in FIG. 15 is selected, the computing device 110 may provide the user activity item selection windows such as the user activity item selection windows 524 and 527 as described above with reference to FIGS. 5E through 5G, according to an exemplary embodiment.

Figure 16:
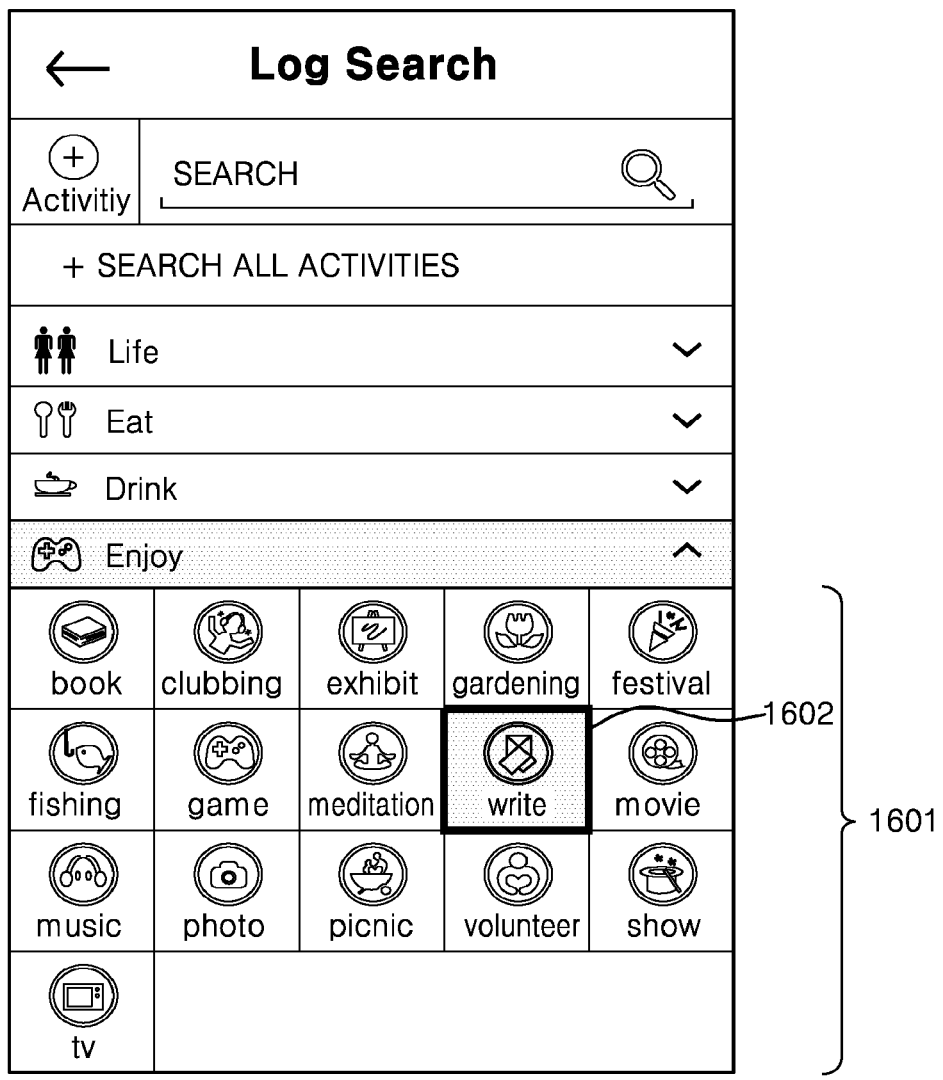
FIG. 16 is a view illustrating an open activity item selection window, according to an exemplary embodiment.
Figure 17:
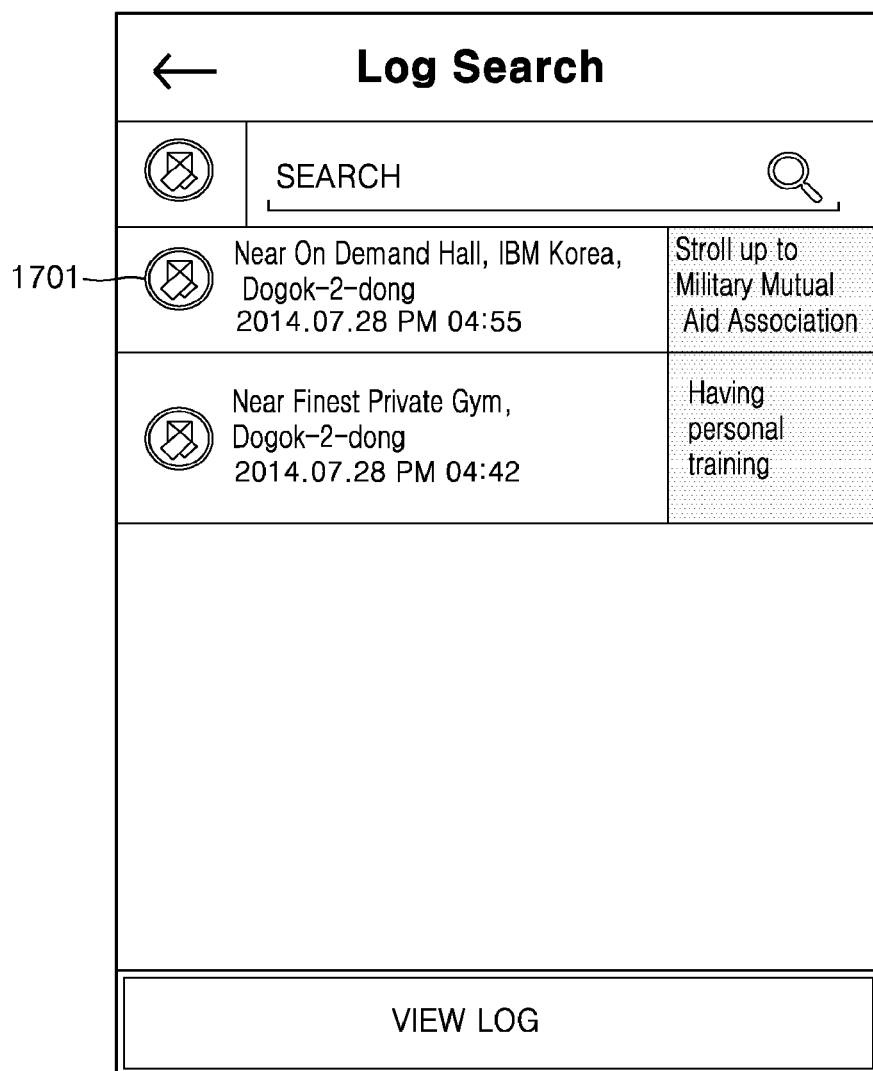
FIG. 17 is a view illustrating providing life content found by a computing device according to an exemplary embodiment.

FIG. 16 is a view illustrating a user activity item selection window that is opened (slide down) by using the computing device 110, according to an exemplary embodiment. FIG. 17 is a view illustrating providing life content searched by the computing device 110 according to an exemplary embodiment. FIG. 17 illustrates an example of searching for memo-based life content.

For example, when Enjoy 1504 is selected in FIG. 15, the computing device 110 opens a user activity item selection window 1601 related to Enjoy 1504 as illustrated in FIG. 16, according to an exemplary embodiment. When a user activity item 1602 is selected via the opened user activity item selection window 1601 in operation S1309, the computing device 110 searches for a life content stored as the selected user activity item 1602 among the stored life contents, and may provide a search result as a list such as the one illustrated in FIG. 17 in operation S1310. In the above example, a search filter with respect to the life content is the user activity item 1602.

A search result provided as a list may include life content icons, a check-in value (an address if there is no check-in value), the date and time when the life content was generated, and joining information (omitted if there is no joining information), provided by way of an example and not limited thereto.

If life content is a picture-based content, a search result provided by the computing device 110 may include a picture. If life content is a memo-based content, a search result provided by the computing device 110 may include contents in a form of a note. If life content is based on a user movement state, a search result provided by the computing device 110 may include a basic image. The basic image may be the same as a life content icon used to indicate whether a user has moved or not and a type of movement of the user, provided by way of an example but is not limited thereto.

When an item 1701 is selected based on the search result illustrated in FIG. 17, the computing device 110 provides a page providing life content such as the one illustrated in FIG. 8, in which the selected item 1701 is activated on the second display area 302, according to an exemplary embodiment.

Meanwhile, when a search word is input via a search word input window 1402 on the screen of FIG. 14 in operation S1311, the computing device 110 searches for life content based on the input search word, and provides found life content in operation S1310. Search words that may be input via the search word input window 1402 may be a check-in value, an address, names of persons, or a memo, provided by way of an example but is not limited thereto.

Figure 18:
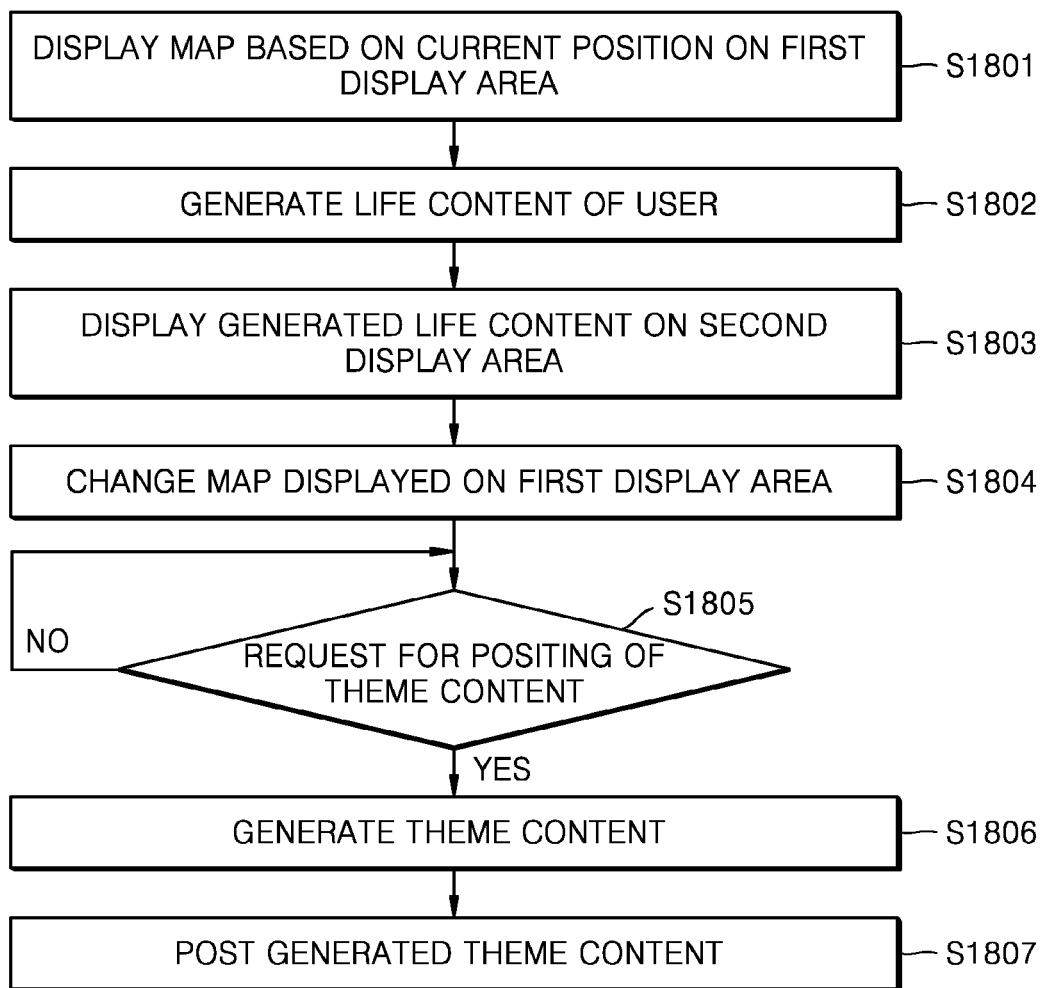
FIG. 18 is a flowchart of a life log service method according to yet another exemplary embodiment.

FIG. 18 is a flowchart of a life log service method according to yet another exemplary embodiment. The flowchart of FIG. 18 shows that a function of posting theme content is added to the operational flowchart such as the one described above with reference to FIG. 2. Operations S1801 through S1804 of FIG. 18 are analogous to operations S201 through S204 of FIG. 2, and thus description thereof will be omitted.

In operation S1805, when a request for posting a theme content is received, the computing device 110 generates theme content in operation S1806. The request for posting a theme content may be received via a touch-based tap input selecting the theme content posting item 312 of FIG. 3, but a touch-based input selecting the item 312 is provided by way of an example and is not limited to the touch-based tap input.

Figure 19:
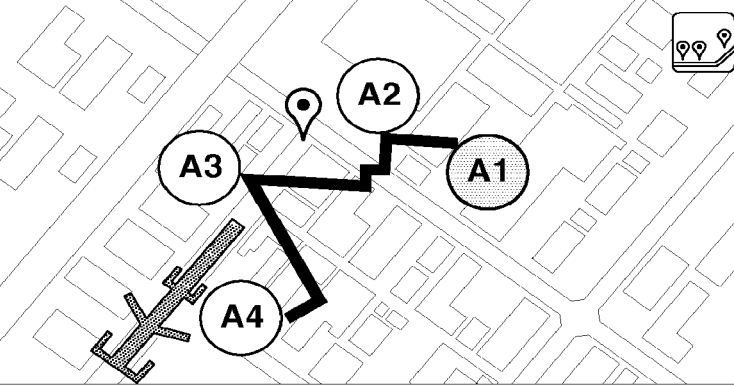
FIG. 19 is a view illustrating a page for posting theme content, according to an exemplary embodiment.

To generate a theme content in operation S1806, the computing device 110 provides a page where theme content may be posted, when a request for posting a theme content is received in operation S1807. FIG. 19 is a view illustrating a page on which theme content is posted, according to an exemplary embodiment.

When a touch-based tap input selecting an item 1901 illustrated in FIG. 19 is received, the computing device 110 cancels theme content posting. Accordingly, the computing device 110 moves from the page illustrated in FIG. 19 to a previous page. The previous page may be the page providing life content such as the one described above with reference to FIG. 8. When a touch-based tap input selecting an item 1902 is received, the computing device 110 moves from the page illustrated in FIG. 19 to a next page for posting a theme content.

When a touch-based tap input selecting an item 1903 of FIG. 19 is received, the computing device 110 may provide a calendar page as a popup window. The computing device 110 may select a date (e.g., Mar. 12, 2013) or multiple dates (for example, Mar. 12, 2013 to Mar. 14, 2013) by using the provided calendar page. In FIG. 19, multiple dates are selected by way of an example.

An item 1904 of FIG. 19 is a check box, and the computing device 110 displays the item 1904 so that the item 1904 is activated. An activation of the item 1904 denotes posting all life content included in life content list 1905 as one piece of theme content. FIG. 19 illustrates that a total of six pieces of life content generated over a three day period may be posted as one piece of theme content.

When a touch-based tap for the item 1904 is received while the item 1904 of FIG. 9 is activated, the computing device 110 may set the item 1904 to an inactivated state, and also set a check box (a total of six check boxes) respectively allocated to six piece of life content included in the life content list 1905 to an inactivated state.

While the check box respectively allocated to all life contents included in the life content list 1905 is inactivated, when a touch-based tap input selecting a check box allocated to a life content is received, the computing device 110 sets the life content corresponding to the check box, for which the touch-based tap input is received, in an activated state. The computing device 110 may post the life content set in the activated state as one piece of theme content.

After the item 1904 of FIG. 19 is set in the inactivated state, when a touch-based tap input selecting the item 1904 is received, the computing device 110 sets all of life contents included in the life content list 1905 and the item 1904 in an activated state.

The computing device 110 may display the life content list 1905 divided for each piece of life content.

When life content is a user activity-based content, information that may be displayed on the life content list 1905 may include a user activity icon, a check-in value (if there is no check-in value, address), date and time information, the number of pictures (if there is no picture, picture number information is omitted), a picture thumbnail image (or picture memo), joining information (e.g., "with ∘∘ and ∘ others") or the like.

When life content is user movement-based content, information that may be displayed on the life content list 1905 may include a movement type icon, a starting point and a destination point, date and time information, a basic thumbnail image of the movement of a user, and joining information, or the like. The basic thumbnail image of the movement of the user may be expressed as a movement type icon.

When life content is user stay-based content (stop-based content), information that may be displayed on the life content list 1905 may include a user stay icon, position information, date and time information, a basic thumbnail image of stay of a user, and joining information or the like. The basic thumbnail image of stay or stop of the user may be expressed as a user stay icon or a user stop icon.

The computing device 110 may display the life content list 1905 including an area 1906 where contents included in a life content (e.g., a picture, contents of a memo, etc.) are displayed and an area 1907 where information related to the life content besides the above-described contents (e.g., date and time information, picture number information, etc,) is displayed.

When a touch-based tap input selecting the item 1902 of FIG. 19 is input, the computing device 110 provides a screen illustrated in FIG. 20, according to an exemplary embodiment. FIG. 20 illustrates a page according to an exemplary embodiment, on which contents of a theme content to be posted may be input. When a touch-based tap input selecting an item 2001 illustrated in FIG. 20 is received, the computing device 110 moves from the page illustrated in FIG. 20 to a previous page (the page illustrated in FIG. 19).

When a touch-based tap input selecting the item 2001 illustrated in FIG. 20 is received, the computing device 110 may display a notification popup window before moving to the previous page. The notification popup window may include a message saying, for example, "if leaving the present page, content currently input on the present page cannot be recovered," or such as "if you leave the page, input content will be erased" but the message included in the notification popup window is not limited thereto and is provided by way of an example only.

Figure 21:
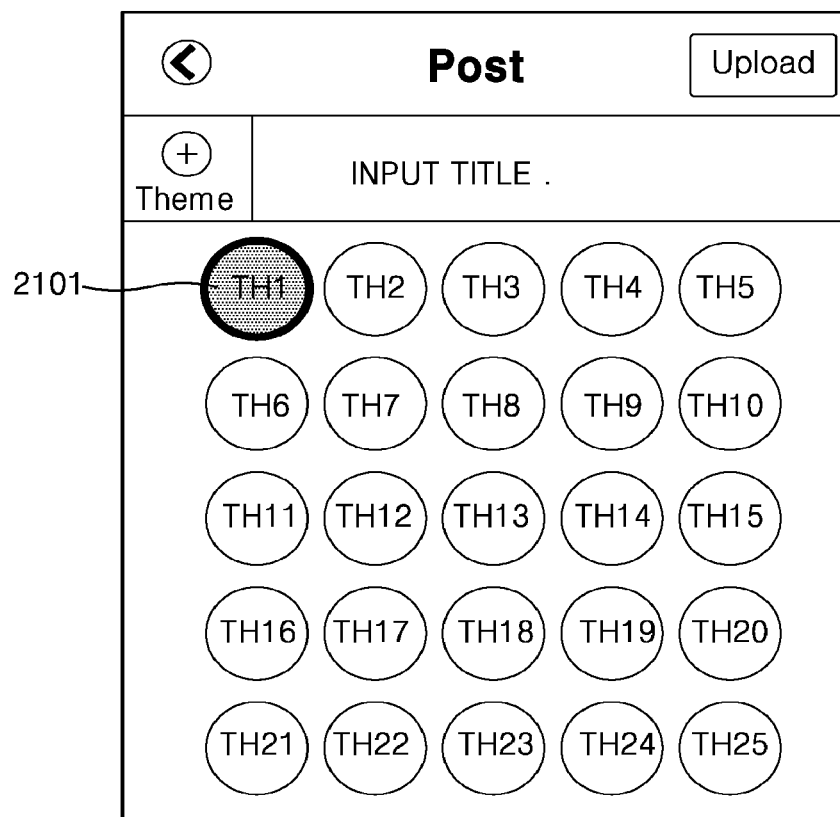
FIG. 21 is a view illustrating a page including selectable theme icons, according to an exemplary embodiment.

When a touch-based tap input selecting an item 2002 illustrated in FIG. 20 is received, the computing device 110 provides selectable theme icons. FIG. 21 is a view illustrating a page including selectable theme icons, according to an exemplary embodiment. The computing device 110 may provide the page including selectable theme icons illustrated in FIG. 21 as a popup window. The selectable theme icons illustrated in FIG. 21 may be displayed as a combination of theme icons and text information which are illustrated by way of an example in FIGS. 28A and 28B and will be described later.

When a touch-based tap input selecting a theme icon 2101 is received as illustrated in FIG. 21, according to an exemplary embodiment, the computing device 110 closes the page including the theme icons illustrated in FIG. 21, and changes the item 2002 illustrated in FIG. 20 to the selected theme icon 2101. If no touch-based tap input selecting the item 2002 illustrated in FIG. 20 is received, the computing device 110 may change the item 2002 to a theme icon set as a default, but an exemplary embodiment is not limited thereto and is provided by way of an example only.

The computing device 110 may automatically select a theme icon by using selectable theme icons and at least one of a result of analyzing a syntax with respect to a title of a theme content, a result of analyzing icons of a life content to be included in a theme content, and a result of analyzing information about a life content to be included in a theme content, and may set the selected theme icons as a default theme icon.

For example, if the title of theme content is "walking around Garosugil," the computing device 110 may obtain keywords of "stroll, date" as a result of analyzing the syntax of the title of the theme content. Based on a result of analyzing information about life content, if the computing device 110 determines that there is no information about "joining", the computing device 110 may provide a theme icon labeled "free time" as a default theme icon from among selectable theme icons by using the obtained keyword, "stroll, date, no joining information."

When a touch-based tap input selecting the item 2003 of FIG. 20 is received, the computing device 110 generates a virtual keyboard window 2006. The computing device 110 may display a virtual keyboard window 2006 under a content input window 2007. The computing device 110 may overlap the virtual keyboard window 2006 with a portion of the content input window 2007. The computing device 110 displays information input via the displayed virtual keyboard window 2006 in the item/field 2003. Information displayed in the item/field 2003 is the title of the theme content.

When a touch-based tap input selecting one of public, viewable only by friends, or viewable only by me included in the item 2004 of FIG. 20 is received, the computing device 110 sets a publication range according to the received touch-based tap input. Public indicates that theme content is viewable to all computer devices connected to the server 120. Viewable only by friends indicates that theme content is viewable to only: a computer device that posted the theme content and computer devices of friends set by the user of the computer device. Viewable only by me indicates that theme content is viewable only by a computer device that posted the theme content. By way of an example, a computer device that posted the theme content is described. However, according to an exemplary embodiment, a user may view his or her contents from any device as long as he or she logs into the life log system. As such, viewable only by me may mean that only the user may view the contents from any device that he or she logs into.

When a touch-based tap input selecting each social network service channel (e.g., Facebook, KakaoTalk, etc.) included in the item 2005 of FIG. 20 is received, the computing device 110 sets the social network service channel, for which the touch-based tap input is received, in an activated state.

The computing device 110 sets to share theme content via the social network service channel set in the activated state. The computing device 110 displays a social network service channel included in the item 2005 in the form of an icon as illustrated in FIG. 20. When a social network service channel is set in an activated state according to a touch-based tap input, the computing device 110 may display a social network service channel set in an inactivated state and the social network service channel set in the activated state differently. For example, the computing device 110 may highlight the social network service channel set in the activated state.

The computing device 110 may display the item 2004 and the item 2005 of FIG. 20 under the content input window 2007 illustrated in FIG. 20. When the items 2004 and 2005 are displayed under the content input window 2007 and the virtual keyboard window 2006 is generated, the computing device 110 may display the items 2004 and 2005 in a lower layer of the virtual keyboard window 2006. Accordingly, the items 2004 and 2005 are hidden by the virtual keyboard window 2006.

When a touch-based tap input selecting the content input window 2007 of FIG. 20 is received, the computing device 110 generates the virtual keyboard window 2006 used to input contents of theme content. The computing device 110 displays information input via the virtual keyboard window 2006 in the content input window 2007.

When a touch-based tap input selecting an item 2008 of FIG. 20 is received, the computing device 110 posts a theme content to the server 120 based on contents input on the page illustrated in FIG. 19 and contents input on the page illustrated in FIG. 20 (operation S1807 of FIG. 18). If a title of theme content is not input via the item 2003, the computing device 110 may not allow posting of the theme content by setting the item 2008 in an inactivated state. Alternatively, when the item 2008 is set in an activate state, a title for theme content has not yet been input via the item 2003, and the item 2008 is selected, the computing device 110 may provide a notification message requesting a user to input a title for the theme content.

Figure 22:
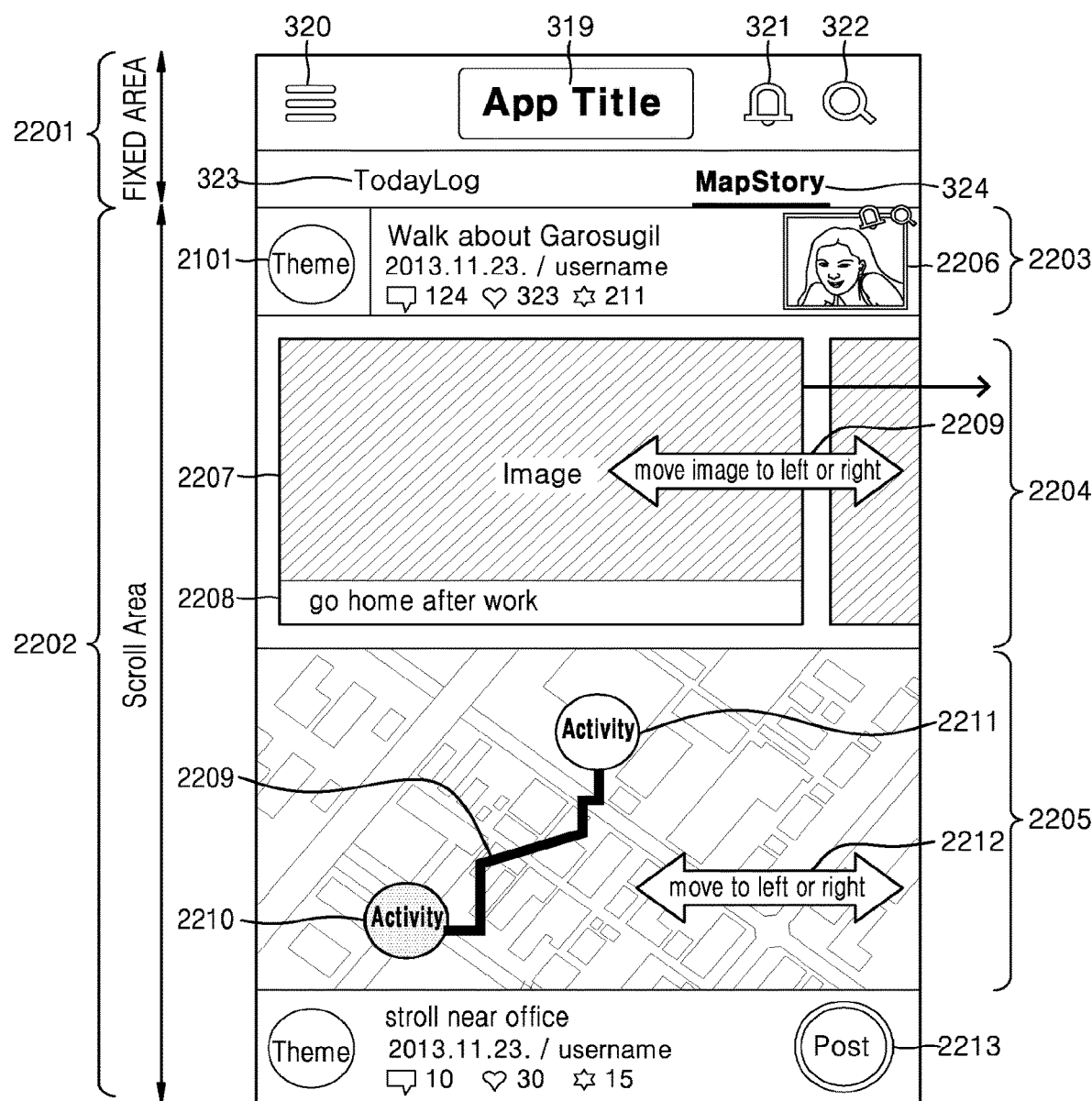
FIG. 22 is a view illustrating a page to which theme content is posted, according to an exemplary embodiment.

When a touch-based tap input selecting the item 2008 of FIG. 20 is received so that theme content is posted to the server 120, the computing device 110 provides a page such as the one illustrated in FIG. 22. FIG. 22 is a view illustrating a page where theme content is posted, according to an exemplary embodiment. The page illustrated in FIG. 22 is a page according to a theme content providing page. The page illustrated in FIG. 22 is provided by the computing device 110 based on information received from the server 120 while the server 120 and the computing device 110 are connected to each other. The server 120 aligns the most recently posted theme content in the upper portion.

Referring to FIG. 22, the page according to a theme content providing mode includes a first display area 2201 and a second display area 2202.

The first display area 2201 is a fixed area, according to an exemplary embodiment. The first display area 2201 may correspond to the fifth display area 305 illustrated in FIG. 3. In the fifth display area 305 illustrated in FIG. 3, the life content providing mode is in an activated state, whereas in the first display area 2201 of FIG. 22, a theme content providing mode is in an activated state.

The second display area 2202 may include a plurality of pieces of theme contents including an information area 2203 included in theme content, a content area 2204 included in theme content, and a map area 2205 synchronized with theme content. A user may view a plurality of pieces of theme contents according to a scroll up or down input on the second display area 2202.

According to an exemplary embodiment, the information area 2203 of FIG. 22 may include a theme icon 2101, a title, a date of input, a username, the number of comments ⌕, the number of Likes (♥), the number of favorites (★), and a user profile image 2206.

When a touch-based tap input selecting the profile image 2206 of the user is received, the computing device 110 moves to a personal posting page. The personal posting page may provide detailed information about all life contents included in the theme icon 2101.

The server 120 provides the computing device 110 with information so that first life content is displayed when posting theme content to the content area 2204. FIG. 22 illustrates that an image 2207 and content of a memo 2208 are displayed together. When a touch-based input 2209 such as a swipe to the left or right is received with respect to the image 2207, the computing device 110 may provide the plurality of pieces of life content included in the posted one theme content by moving from one piece to another piece. When a touch-based tap input selecting the image 2207 is received, the computing device 110 receives detailed information of theme content from the server 120 and provides the same.

When a touch-based tap input selecting the map 2205 is received, the computing device 110 receives a detailed page of theme content corresponding to the selected map 2205 from the server 120 and provides the received detailed page e.g., displays it on the display.

The map 2205 includes a path 2209 synchronized with all life contents included in theme content, a marker 2210 that is activated and synchronized with first life contents 2207 and 2208, and a marker 2211 that is inactivated and synchronized with life content generated after the life contents 2207 and 2208.

Figure 23:
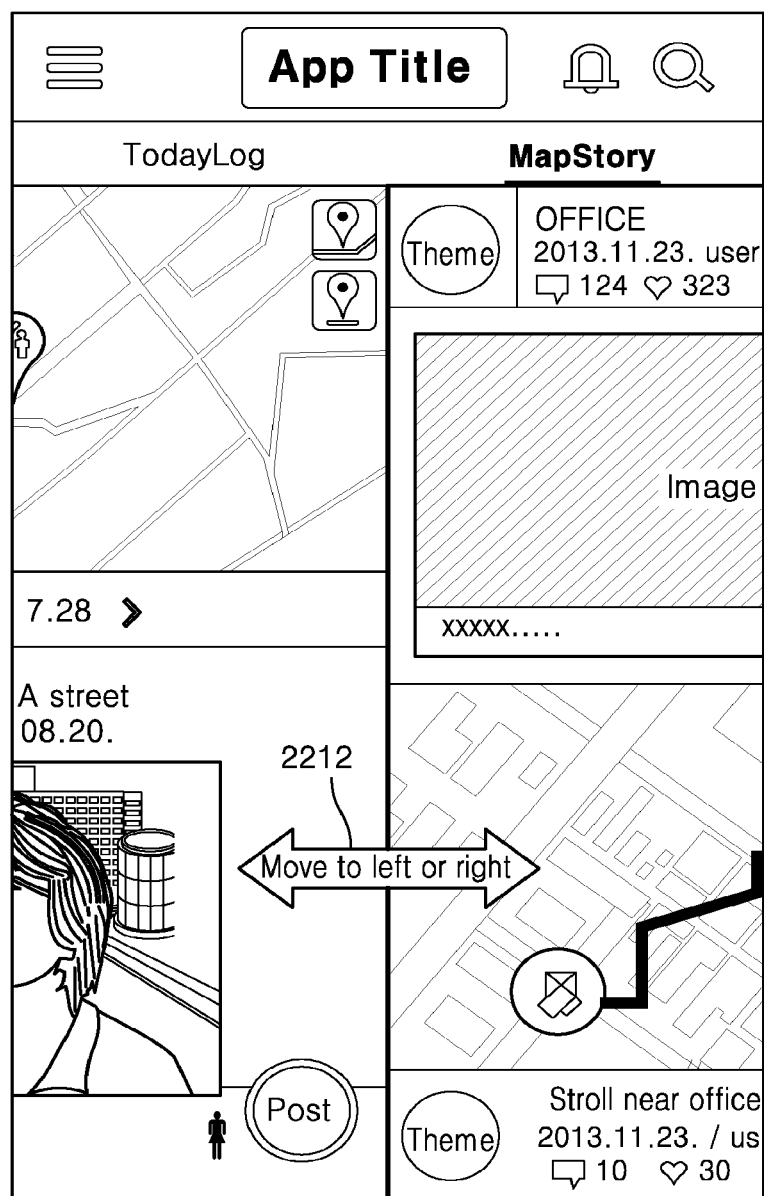
FIG. 23 is a view illustrating switching between a page providing theme content and a page providing life content, according to an exemplary embodiment.

When a touch-based input such as a swipe to the left or right is received on the map 2205 (2212), the computing device 110 may move from the page providing theme content (e.g., the page illustrated in FIG. 22) to the page providing life content (e.g., the page illustrated in FIG. 8) or from the page providing life content to the page providing theme content. FIG. 23 is a view illustrating switching between a page providing theme content and a page providing life content, according to an exemplary embodiment. According to an exemplary embodiment, the computing device 110 switches the screen from a page providing theme content to a page providing life content or from a page providing life content to a page providing theme content.

When a touch-based tap input selecting an item 2213 of FIG. 22 is received, the computing device 110 may post theme content. Content that may be posted is life content generated by using the computing device 110 on a date indicated by a user.

While being scrolled in an upward or downward direction with respect to theme content, the computing device 110 may hide (or fade-out) the item 2213 illustrated in FIG. 22, and then when scrolling is stopped, the computing device 110 displays the item 2213 illustrated in FIG. 22 (show or fade-in of the item 2213). The computing device 110 may also hide items (POST) illustrated in FIGS. 6, 7, 8, 10, 11, and 12 described above while the second display area 302 is being scrolled, and then when scrolling is stopped, the computing device 110 displays the items (POST).

Posting of theme content to the server 120 as described above may be referred to as an application post registration. When theme content is posted to the server 120, the server 120 may simultaneously generate a web post (web theme content). When generating a web post, the server 120 may generate a uniform resource locator (URL), insert the URL into shared theme content, and provide the shared theme content to the computing device 110. When a touch-based tap input selecting the URL included in the shared theme content is received, the computing device 110 may access a website via the URL to access a post corresponding to the URL. Theme content posted to the server 120 and web theme content are in a one-to-one correspondence with each other; if one is edited or deleted, the other is simultaneously edited or deleted.

A layout of a page providing life content and a page providing theme content according to an exemplary embodiment is not limited to the ones illustrated in FIGS. 8 and 22 but are provided by way of an example. For example, icons corresponding to a life content providing mode item (TodayLog) and a theme content providing mode item (MapStory) may be displayed at a position where an application title (App Title) is displayed. The computing device 110 may convert a page being displayed, according to a touch-based tap input selecting the life content providing mode item or the theme content providing mode item.

Figure 24A:
FIGS. 24A and 24B are views illustrating a life content providing item, a theme content providing item, and a theme content search item according to an exemplary embodiment.
Figure 24B:
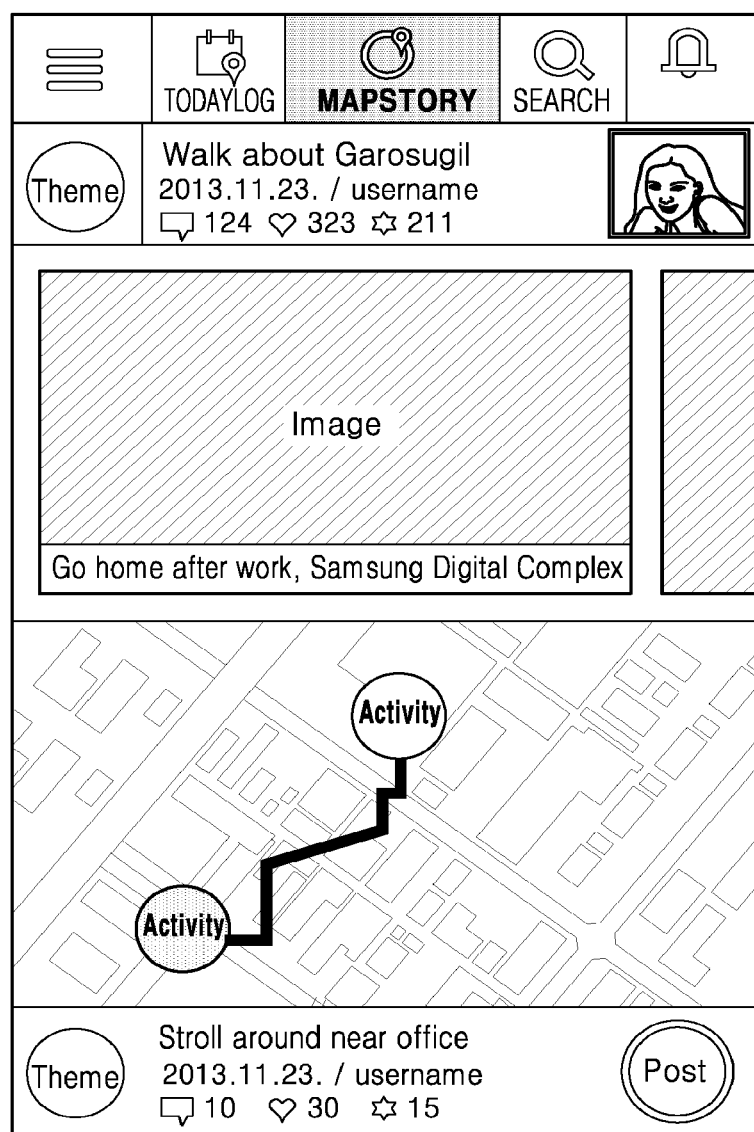

FIGS. 24A and 24B are views illustrating a life content providing mode item, a theme content providing mode item, and a theme content search item, according to an exemplary embodiment, which will be described later and may be initiated as taps, for example. FIG. 24A is a view illustrating a page provided by the computing device 110 as a touch-based tap input is received on the life content providing mode item (TodayLog) e.g., the user selects TodayLog (life content providing mode item). FIG. 24B is view illustrating a page provided by the computing device 110 as a touch-based tap input selecting a theme content providing mode item (MapStory) e.g., the user selects MapStory (the theme content providing mode item). The life content providing mode item, the theme content providing mode item, and a theme content search item, which will be described later, may be provided as a dropdown menu.

Figure 25:
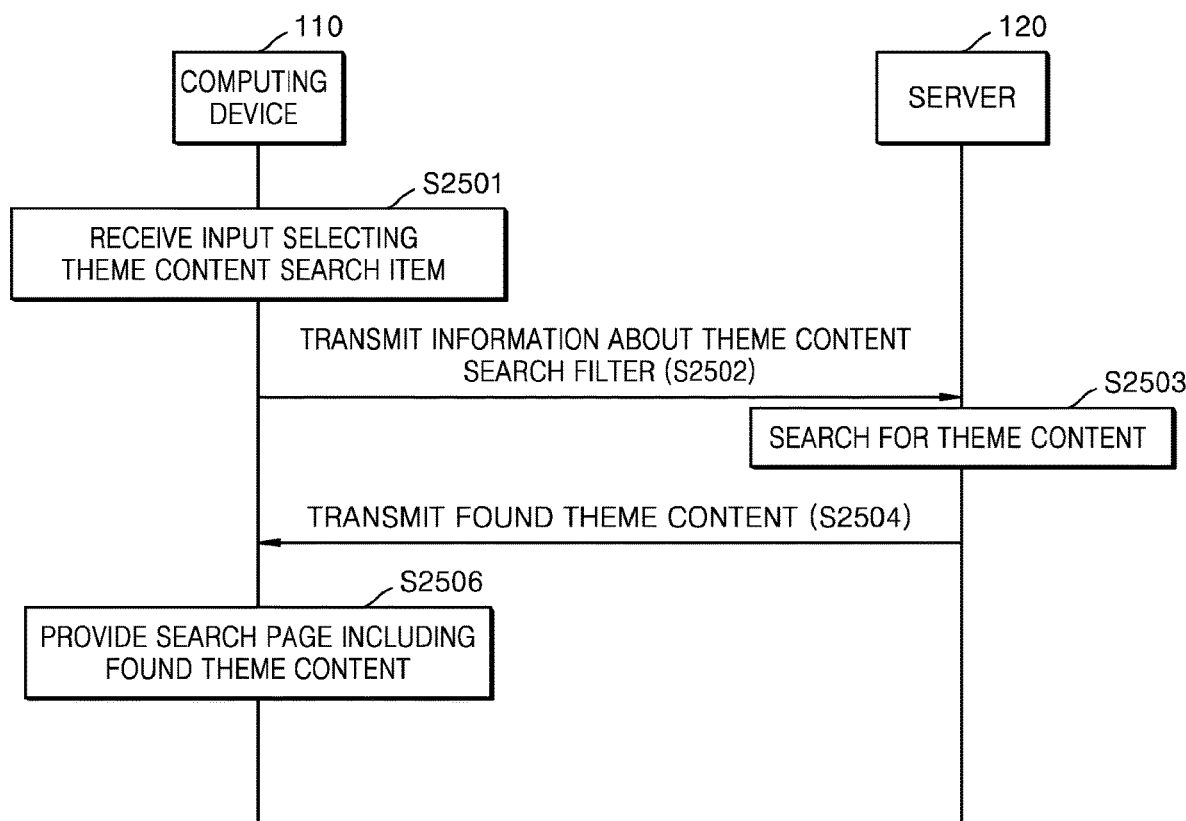
FIG. 25 is a flow diagram of a theme content searching function in a life log service method according to an exemplary embodiment.

FIG. 25 is a flowchart of a theme content searching function in a life log service method according to an exemplary embodiment.

In operation S2501, when an input selecting a theme content search item is received, the computing device 110 transmits information about a search filter set as a default, to the server 120 in operation S2502. When a page provided by the computing device 110 is such as the ones illustrated in FIGS. 24A and 24B, the input selecting the theme content search item may be a touch-based tap input with respect to a 'Search' item. When a page provided by the computing device 110 such as the ones as illustrated in FIG. 3 or FIG. 22, an input selecting a theme content search item may be a touch-based tap input with respect to the item 322 (shown in FIG. 3).

Information about a search filter for theme content may include information about a search distance, a search period, and theme items to be searched for such as the information with respect to theme content described above. This is provided by way of an example and not by way of a limitation. For example, a search distance may be a 5 km radius based on a current position of the computing device 110; a search period may be the number of days included in theme content; and a theme item to be searched for may be Life, but the information is not limited thereto and is provided only by way of an example.

Figure 26:
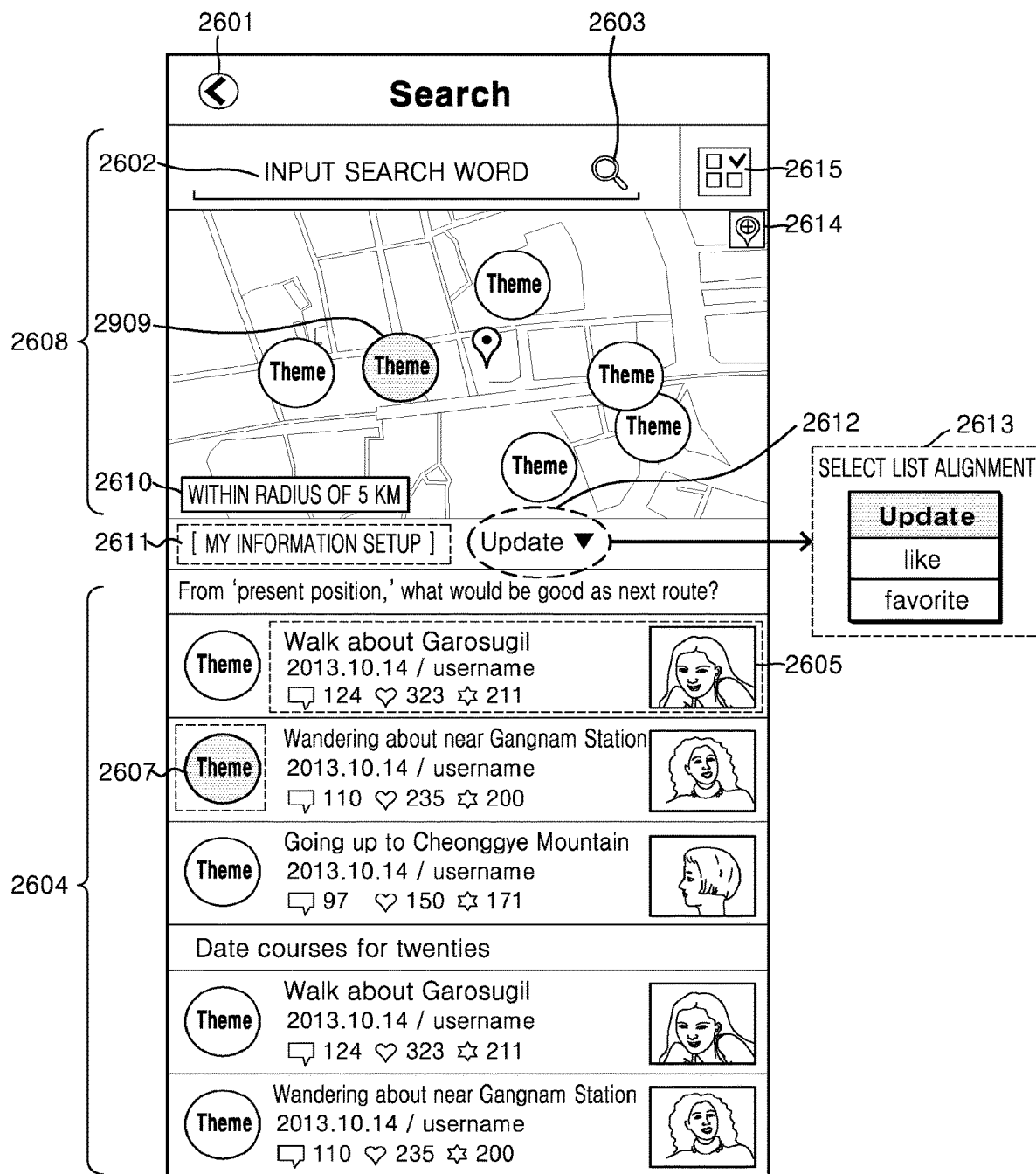
FIG. 26 is a view illustrating a search page provided by using a computing device according to an exemplary embodiment.

In operation S2503, the server 120 searches for theme content among posted theme contents by using the received information about a search filter. In operation S2504, the server 120 transmits found theme content to the computing device 110. In operation S2506, the computing device 110 provides a search page including the found theme content. FIG. 26 is a view illustrating a search page provided by using the computing device 110 according to an exemplary embodiment. A theme content provided via the search page may be referred to as a recommendation path based on a current position of the computing device 110 and user preferences. The user preferences may be determined based on theme icons set in advance, but is provided by way of an example and is not limited thereto.

When a touch-based input selecting an item 2601 illustrated in FIG. 26 is received, the computing device 110 moves from the page illustrated in FIG. 26 to a previous page. When a touch-based tap input selecting an item 2602 is received, the computing device 110 generates a virtual keyboard window. The computing device 110 displays information input based on the generated virtual keyboard window, on the item 2602.

When a touch-based tap input selecting an item 2603 is received, the computing device 110 searches for theme content in a recommendation theme content list 2604 by using a search word displayed in the item field 2602. The recommendation theme content list 2604 may include recommendation theme content based on at least one of theme content for recommending other paths from the current position, gender, age, and user preferences, provided by way of an example but is not limited thereto. Each piece of recommendation theme content may include a theme icon, a title, the date when theme content was generated, the name of a user who posted the theme content, the number of comments, the number of Likes, the number of times the theme content has been favorited, and a profile image, this is provided by way of an example but is not limited thereto.

When a touch-based tap input selecting an item 2605 is received, the computing device 110 moves to a detailed page of a theme content corresponding to the item 2605. When a touch-based tap input selecting an item 2607 is received, the computing device 110 activates a theme icon 2909 synchronized with the item 2607 in a map display area 2608. The theme icon 2909 is a representative icon of a life content included in a theme content of the item 2607. Theme icons displayed on the map display area 2608 are representative icons of respective theme contents included in the recommendation theme content list 2604.

Figure 27:
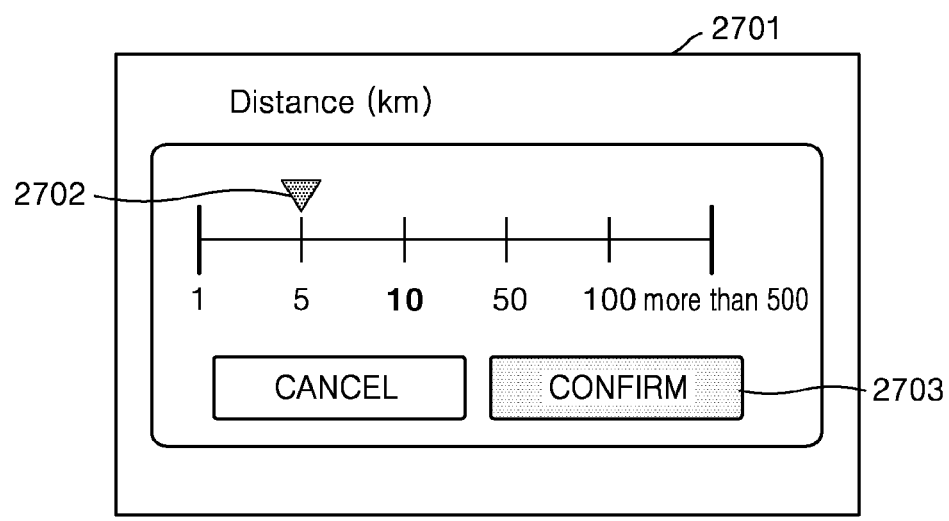
FIG. 27 is a view illustrating a pop up window for setting a distance value, according to an exemplary embodiment.

An item 2610 is used to set a search range, and when a touch-based tap input selecting the item 2610 is received, the computing device 110 provides a popup window 2701 where a distance setting value illustrated in FIG. 27 may be set. When a touch-based movement command with respect to a distance selection indicator 2702 included in the popup window 2701 is received, the computing device 110 sets a distance setting value according to the received movement command, and displays a result of the setting.

When a touch-based tap input selecting a confirm button 2703 is received, the computing device 110 transmits the preset distance setting value to the server 120, and when theme content found based on the preset distance setting value is received from the server 120, the computing device 110 provides the received theme content via the recommendation theme content list 2604. A theme content provided via the recommendation theme content list 2604 includes theme content found by using a newly preset distance setting value.

When a touch-based tap input selecting an item 2611 is received in FIG. 26, the computing device 110 moves to a My Information page. When a touch-based tap input selecting an item 2612 is received, the computing device 110 provides a window 2613 where an alignment condition for the recommendation theme content list 2604 may be selected, for example as a popup window. An Update item included in the provided window 2613 is an item for arranging theme content according to most recently updated theme content. A Like item is an item for arranging or sorting theme content in the order of the theme content being liked such that the theme content with the most number of likes appears first and the theme content with the least number of likes appears last. That is, the content is organized and displayed in the order of most liked to least liked. A Favorite item is an item for arranging or sorting theme content in the order of the theme content being set as favorite such that the theme content with the most number of being set as favorite appears first and the theme content with the least number of favorites appears last. That ism the content is organized and displayed in the order of most favorite to least favorite.

When a touch-based tap input selecting an item 2614 is received, the computing device 110 may change a map displayed in the map display area 2608 so that theme content is searched by appointing other areas instead of the current position of the computing device 110. When a position to be searched for is set based on the changed map, the computing device 110 transmits information about a newly set position to the server 120. The server 120 searches for theme content based on the received new position information and transmits a search result to the computing device 110. Accordingly, the computing device 110 provides theme content based on the newly appointed position via the recommendation theme content list 2604.

The item 2614 may be optional and in an example embodiment, the item 2614 may be omitted. When the item 2614 is set in an inactivated state, the computing device 110 may not search for theme content at a position different from the current position of the computing device 110. A user input of switching between an activate state and an inactivate state of the item 2614 may be a touch-based multi-tap input, provided by way of an example but is not limited thereto.

Figures 28A, 28B:
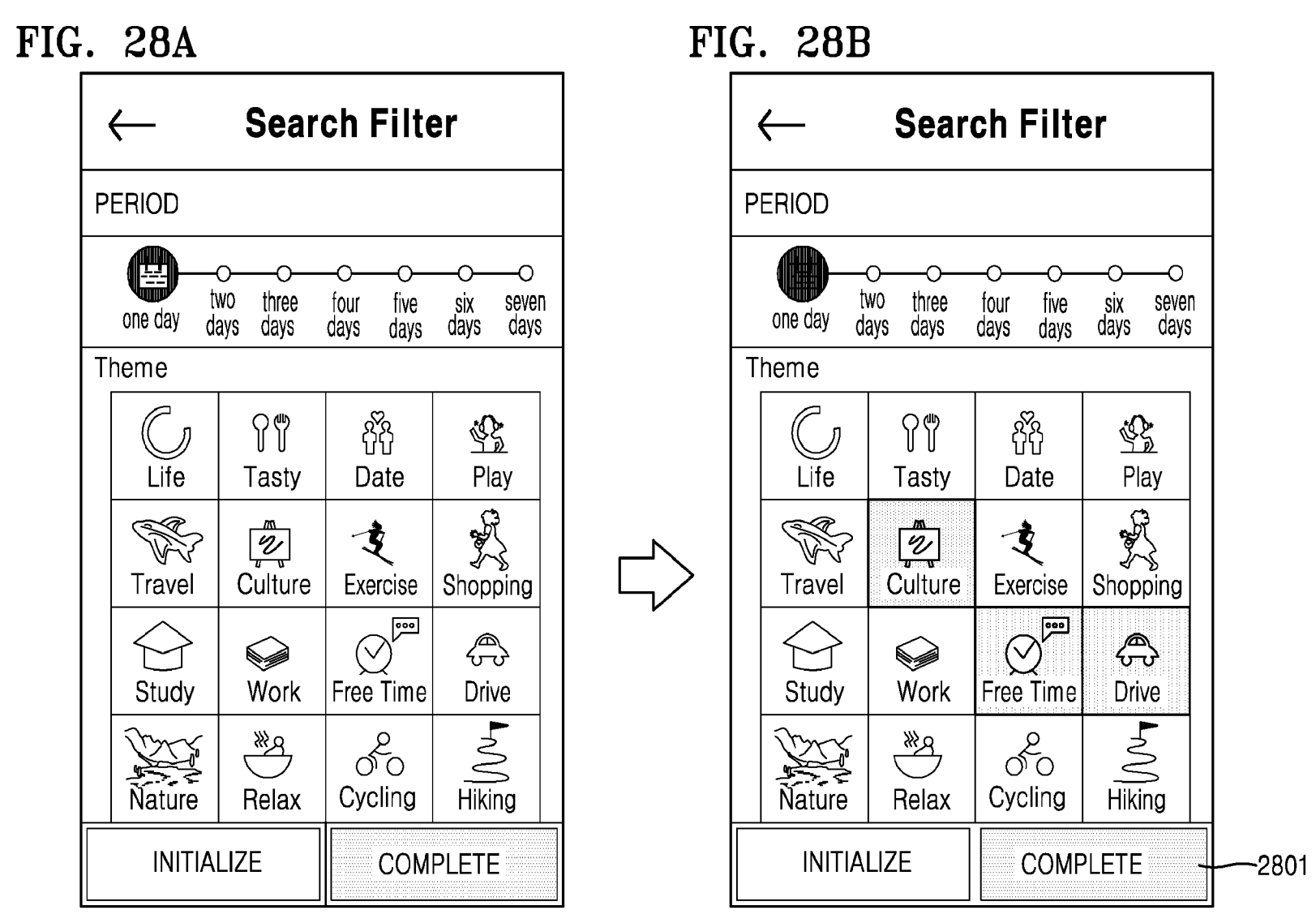

When a touch-based tap input selecting an item 2615 is received, the computing device 110 provides a detailed page of a theme content search filter. FIGS. 28A and 28B are views illustrating a detailed page of a theme content search filter according to an exemplary embodiment. Referring to FIGS. 28A and 28B, a detailed page of a theme content search filter includes information about a settable search period and information about selectable theme items.

FIG. 28A is a view illustrating a page before selecting a theme item, and FIG. 28B is a view illustrating a page after selecting a theme item. The page illustrated in FIG. 28B shows that three theme items (Culture, Free Time, and Drive) are selected. The number of selectable theme items may be limited. When a theme item is selected, and a touch-based tap input selecting a Complete button 2801 is received, the computing device 110 transmits information about a newly set theme content search filter to the server 120, and provides the received search result about the theme content via the recommendation theme content list 2604.

Figure 29:
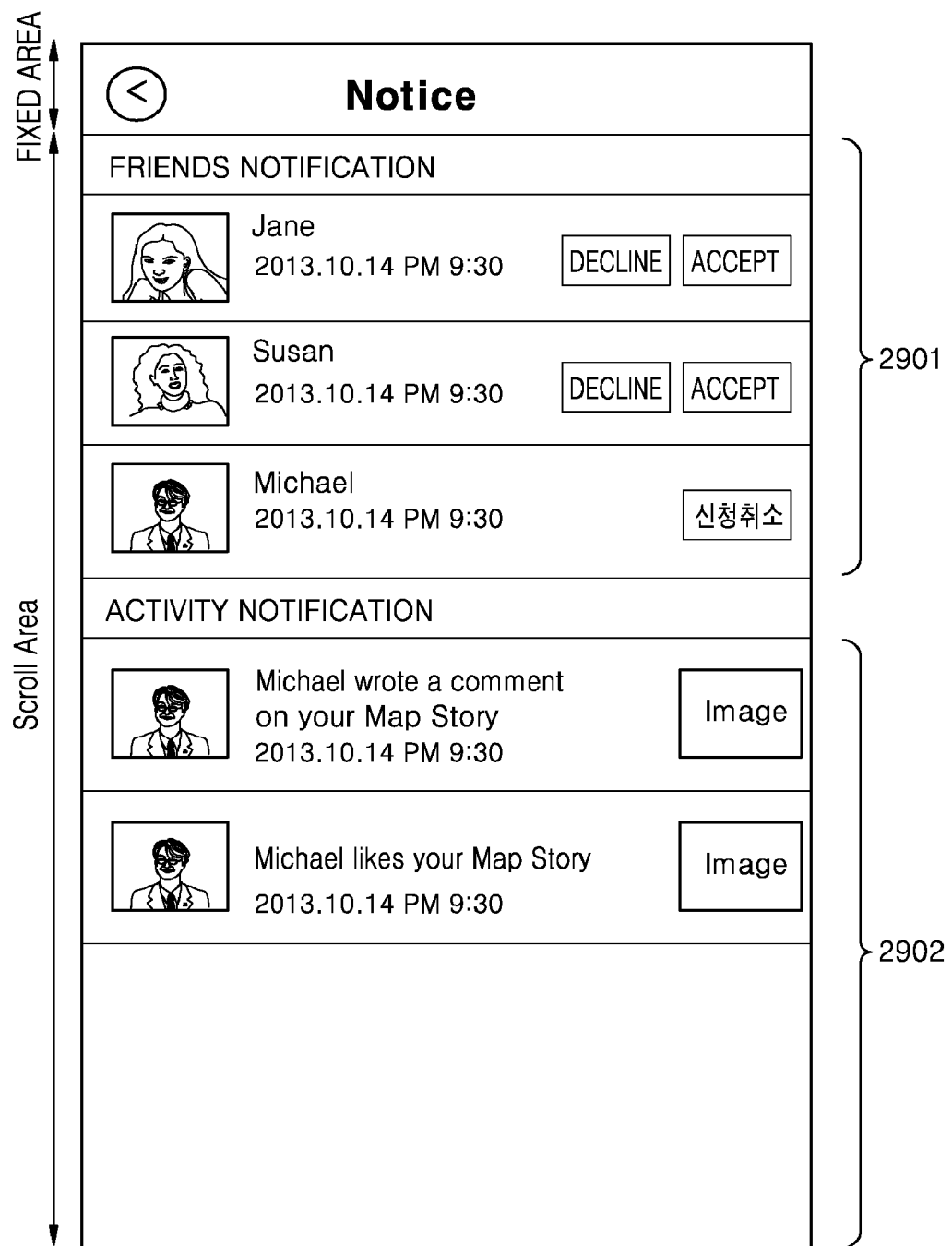
FIG. 29 is a view illustrating a notification page provided by using a computing device according to an exemplary embodiment.

FIG. 29 is a view illustrating a notification page provided by using the computing device 110 according to an exemplary embodiment. In an exemplary embodiment, when a touch-based tap input selecting the item 321 of FIG. 3 is received. Referring to FIG. 29, the notification page may include at least one of a notification list 2901 about accepting or canceling a friend request, etc. and a list 2902 about details of a friend's activity, provided by way of an example and is not limited thereto. For example, the notification page may include a joining request or a canceled notification list.

Figure 30A:
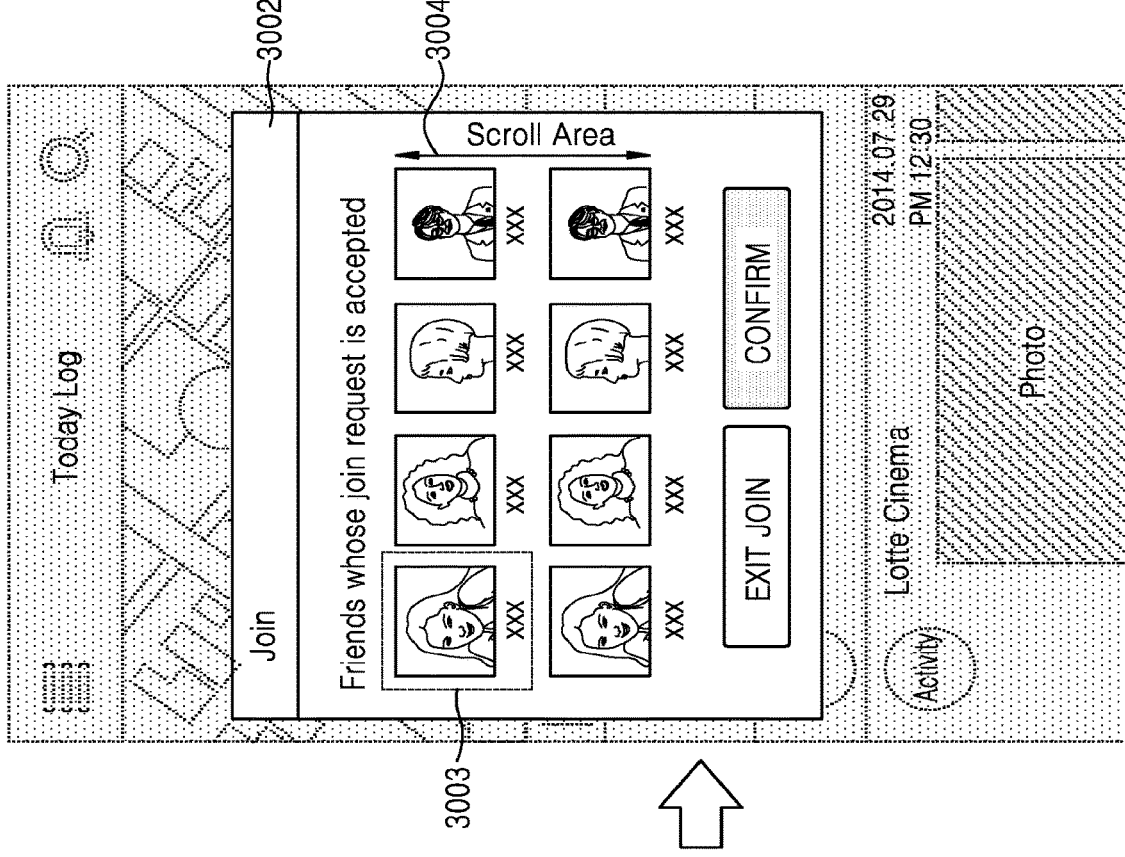
FIGS. 30A and 30B are views illustrating a page providing information about joining, according to an exemplary embodiment.

When a friend is selected as Joining 505 such as shown in FIG. 5A, the computing device 110 provides information 3001 about the number of friends for which Joining 505 is set. FIG. 30A is a view illustrating an example of a page including the information 3001 about the number of friends set by Joining 505. FIG. 30A is a view illustrating a page providing life content. When a touch-based tap input selecting the information 3001 about the number of friends with respect to Joining 505 of FIG. 30A is received, the computing device 110 provides information about friends registered to Joining 505 as a popup window as illustrated in FIG. 30B, according to an exemplary embodiment.

Figure 30B:
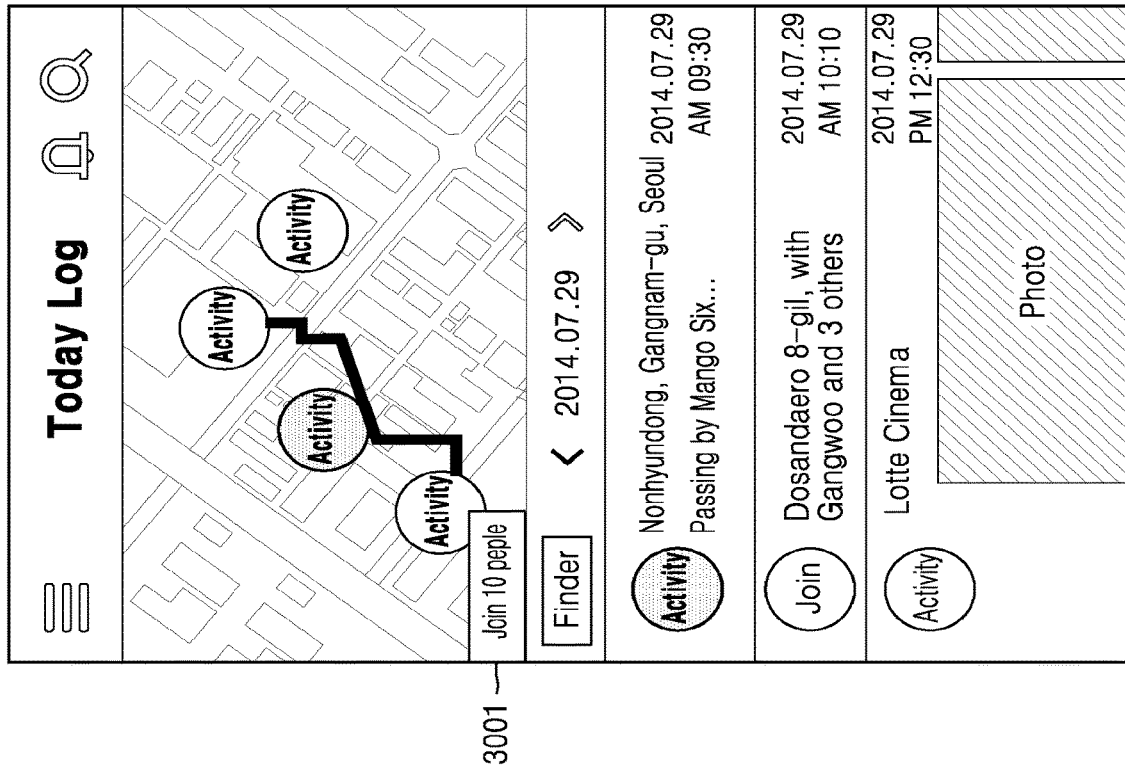

When a touch-based tap input selecting a friend profile area 3003 included in the popup window 3002 illustrated in FIG. 30B is received, the computing device 110 moves to a page providing life content of a selected friend. In order to move to the page providing life content of the selected friend, the computing device 110 is to be in a state in which the computing device 110 is available for communication with a computing device of the selected friend in a wired or wireless manner. If the number of friends registered to Joining 505 is more than the number of friends that may be simultaneously provided on the popup window 3002, the computing device 110 may set the popup window 3002 to be scrollable according to a user input, by way of an example. The number of friends that may be registered to Joining 505 may be limited, according to an exemplary embodiment.

Figure 31:
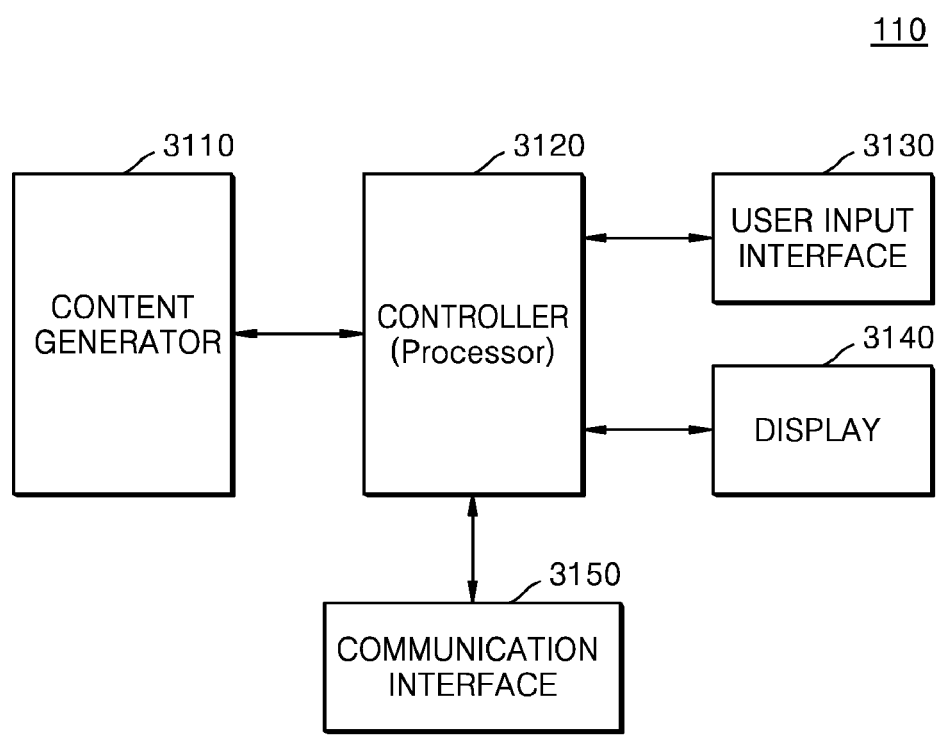
FIGS. 31 and 32 are block diagrams illustrating a computing device according to an exemplary embodiment.

FIG. 31 is a block diagram illustrating a computing device such as the computing device 110 according to exemplary embodiments. Referring to FIG. 31, the computing device 110 may include a content generator 3110, a controller (processor) 3120, a user input interface 3130, a display 3140, and a communication interface 3150. However, not all of the illustrated elements are essential elements. The computing device 110 may be implemented by more elements or less elements than illustrated according to an exemplary embodiment.

Figure 32:
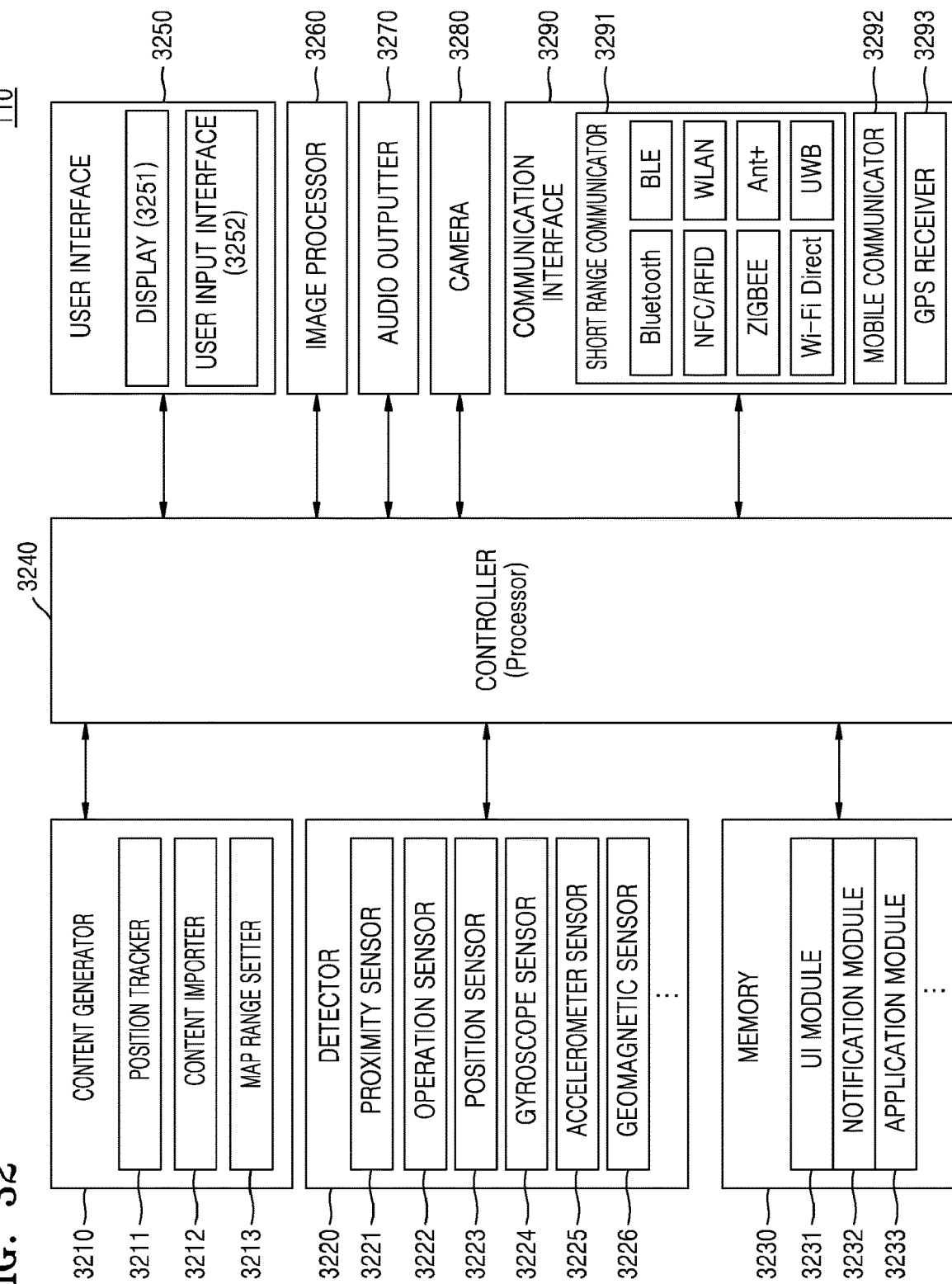

For example, the computing device 110 according to an embodiment may include, as illustrated in FIG. 32, a content generator 3210, a detector 3220, a memory 3230, a controller 3240, a user interface 3250, an image processor 3260, an audio outputter 3270, a camera 3280, and a communication interface 3290, but is not limited thereto. Also, the computing device 110 according to an embodiment may include a processor, and a display 3140. The processor may include the content generator 3110, and the controller 3120.

The content generator 3210 illustrated in FIG. 32 may be referred to as a similar or identical component to the content generator 3101 illustrated in FIG. 31. The user interface 3250 illustrated in FIG. 32 may be referred to as a similar or identical component as a component including the user input interface 3130 and the display 3140 illustrated in FIG. 31. The communication interface 3290 illustrated in FIG. 32 may be referred to as a similar or identical component as the communication interface 3150 illustrated in FIG. 31.

The content generator 3210 generates life content of a user based on position and time. The content generator 3210 transmits the generated life content to the controller 3240. The controller 3240 may transmit the life content generated by using the content generator 3210 to at least one of the display 3251 and the memory 3230. Life content of the user generated by using the content generator 3210 includes at least one of a user activity-based life content and user movement-based life content.

The content generator 3210 includes a position tracker 3211, a content importer 3212, and a map range setter 3213, provided by way of an example but is not limited thereto.

The position tracker 3211 may obtain position information and time information of a user by using a GPS satellite signal received via the communication interface 3290 or by using a peripheral base station of the computing device 110. The position tracker 3211 transmits obtained or detected position information to a position search service providing server (not shown) by using a wireless network communicator of the communication interface 3290. When detailed information related to the obtained or detected position information is received from the position search service providing server via the communication interface 3290, the position tracker 3211 may obtain detailed information related to the obtained or detected position information. The detailed information related to position information may include place name information, provided by way of an example but is not limited thereto.

The position tracker 3211 may include an automatic check-in function. The automatic check-in function may be performed by using a GPS satellite signal, by way of an example but is not limited thereto. For example, the automatic check-in function may be performed by using a beacon signal or Zigbee signal. In order to use a GPS satellite signal, the position tracker 3211 may use a GPS receiver 3293 of the communication interface 3290. In order to use a beacon signal, the position tracker 3211 may use a Bluetooth communication of a short range communicator 3291 included in the communication interface 3290. In order to use a Zignee signal, the position tracker 3211 may use Zigbee communication of a short range communicator 3291 included in the communication interface 3290.

The position tracker 3211 may obtain or calculate travelled distance information of a user by using the obtained or detected position information and time information. The position tracker 3211 may generate content based on a user movement item by using the obtained or detected position information, time information, detailed information about position information, and user travelled distance information. The position tracker 3211 may provide the content importer 3212 with the obtained or detected position information, time information, detailed information about position information, and user travelled distance information.

The content importer 3212 may include at least one of a function of automatically importing a picture or a video when the picture or the video is recorded by using the camera 3280, a function of importing a memo when the memo is generated by using a memo application, and a function of importing a picture via an album application.

The content importer 3212 may monitor an operation of an application executed by the computing device 110, and obtain information about the application (e.g., the number of voice calls, information about a transmitter or a receiver of voice calls, and the number of transmission and reception of text messages).

The content importer 3212 generates life content based on a user activity item by using at least one of information provided by using the position tracker 3211, a content received according to an operation of various applications including the camera 3285, and information related to applications.

The content importer 3212 may include a function of importing information (surrounding environment information or information about a user described above) received from an external device (e.g., the wearable device 130) and information (information about a played program described above) received from the IoT-based device 140.

When distance range information (Km radius with respect to a current position) is set via the popup window 2701 as illustrated in FIG. 27, the map range setter 3213 may provide the controller 3240 with the set distance range information.

The detector 3220 may include a proximity sensor 3221, an operation sensor 3222, a position sensor 3223, a sound sensor e.g., a microphone (not shown), a gyroscope sensor 3224, an accelerometer sensor 3225, and a geomagnetic sensor 3226, by way of an example but is not limited thereto.

For example, the detector 3220 may include an altitude sensor, a chemical sensor (e.g., an odorant sensor), a temperature sensor, a humidity sensor, a barometer, a fine dust sensor, an ultraviolet sensor, an ozone sensor, a carbon dioxide ($CO_2$) sensor, an optical sensor, and a network sensor (e.g., a network based on WiFi, Bluetooth, 3G, LTE (long term evolution), near field communication (NFC)).

The sound sensor (not shown) receives an audio signal input from the outside of the computing device 110 and converts the received audio signal to an electrical audio signal and transmits the same to the controller 3240. The sound sensor may be configured to perform an operation based on various noise removing algorithms to remove noise generated when receiving a sound signal from the outside. The sound sensor may be referred to as an audio inputter.

The detector 3220 may include, for example, a pressure sensor (e.g., a touch sensor, a piezoelectric sensor, or physical buttons), a state sensor (e.g., earphone terminal or a DMB antenna), a standard terminal (e.g., a terminal capable of recognizing whether charging is conducted, a terminal capable of recognizing whether the computing device 110 is connected to a personal computer (PC), or a terminal capable of recognizing whether the computing device 110 is connected to a doc), a time sensor, and a health sensor (e.g., a biosensor, a heart rate sensor, a blood flow meter, a diabetes sensor, a blood pressure sensor, a stress sensor, or an emotion sensor).

A sensing signal output from the detector 3220 is transmitted to the controller 3240.

The memory 3230 may store a program for processing and/or controlling by the controller 3240. A program stored in the memory 3230 may include an operating system (OS) program and various application programs. Various application programs may include, for example, a life log service application (e.g., Routrip application), an album application, a camera application, and a memo application, provided by way of an example but is not limited thereto.

The memory 3230 stores information managed by an application program. For example, the memory 3230 may store information included in life content generated according to an exemplary embodiment. Life contents stored in the memory 3230 may be stored in a cloud server or a backup server of a user or an external device appointed by the user according to a backup request of the user.

The memory 3230 may include at least one type of storage medium selected from a flash memory type, a hard disk type, a multimedia card micro type, a card type memory (e.g., SD or XD memory), a random access memory (RAM), a static random access memory (RAM), a read-only memory (ROM), an electrically erasable programmable read-only memory (EEPROM), a programmable read-only memory (PROM), a magnetic memory, a magnetic disk, and an optical disk.

Programs stored in the memory 3230 may be classified as a plurality of modules according to functions of the programs, in an exemplary embodiment. For example, the programs may be classified as a UI module 3231, a notification module 3232, and an application module 3233, provided by way of an example but are not limited thereto. For example, if the display 3251 is combined with a touch panel layer, the plurality of modules may include a touch screen module.

The UI module 3231 may provide the controller 3240 with graphic user interface (GUI) information used to generate life content described with reference to above exemplary embodiments, GUI information used to generate theme content, and GUI information about the pages or screens described above with reference to above exemplary embodiments. The UI module 3231 may provide the controller 3240 with a UI, a GUI, or the like that are specialized with respect to each application installed in the computing device 110.

The notification module 3232 may generate a signal that notifies a recommendation of a theme item by the computing device 110, but a notification generated by the notification module 3232 is not limited thereto.

The notification module 3232 may output a notification signal in the form of a video signal via the display 3251 or in the form of an audio signal via the audio outputter 3270, provided by way of an example but is not limited thereto.

The application module 3233 may include various applications set in the computing device 110 such as a life log service application. The controller 3240 may operate a life log service application in connection with other applications set in the computing device 110.

For example, when generating life content based on a picture or a video obtained by using the camera 3280, the controller 3240 may operate a life log service application and a camera application by connecting the two applications. For example, when generating life content based on a memo generated by a memo application, the controller 3240 may operate a life log service application and a memo application by connecting the two applications.

The computing device 110 may be configured to use web storage or a cloud server (not shown) that performs a storage function of the memory 3230 on the Internet. In this case, a life content generated according to an exemplary embodiment may be provided by the web storage or the cloud server described above.

The controller 3240 refers to a processor that controls an operation of the computing device 110. The controller 3240 displays a map based on a current position of the computing device 110 on the first display area 301 such as the one illustrated in FIG. 3 by way of an example. The controller 3240 displays life contents of a user in time series every time when the life contents are generated by the content generator 3210 on the second display area 302 such as the one illustrated in FIG. 8 by way of an example, and changes the map displayed on the first display area 301. The controller 3240 changes the map displayed on the first display area 301 to a map in which a path synchronized with a life content displayed on the second display area 302 is automatically focused.

The controller 3240 may perform an operation according to the operational flowchart of the computing device 110 illustrated in FIGS. 2, 9, 13, 18, and 25.

The display 3251 included in the user interface 3250 may be configured to display information processed by the computing device 110. The display 3251 displays the pages or screens described with reference to the above exemplary embodiments.

When a touch pad and a display are configured in a layered structure as a touch screen, the display 3251 may be used as both an input device and an output device. The display 3251 may include at least one of a liquid crystal display, a thin film transistor-liquid crystal display, an organic light-emitting diode, a flexible display, a 3D display, and an electrophoretic display (EPD). According to its implementation form, the computing device 110 may include at least two displays 3251. The at least two displays 3251 may be positioned to face each other by using a hinge.

The user input interface 3252 may receive a touch-based tap input based on the pages or screens described with reference to above exemplary embodiments.

The user input interface 3252 may input data used by the user to control the computing device 110. The user input interface 3252 may include at least one of a key pad, a dome switch, a touch pad (e.g., capacitive overlay, resistive overlay, infrared beam, surface acoustic wave, integral strain gauge, and piezoelectric type touch pads), a jog wheel, and a jog switch, but is not limited thereto.

User input information that may be input via the user input interface 3252 may include at least one of touch-based input information, movement-based input information, vision-based input information, and user voice-based input information, provided by way of an example but is not limited thereto.

For example, touch-based input information may include a tap (or touch), a long tap (long touch), a touch and hold, a touch and drag, a double tap, a drag, a panning, a flick, a drag and drop, and a sweep, but the touch-based input information is provided by way of an example but is not limited thereto.

Movement-based input information may include, for example, input information based on a user gesture based on movement of the computing device 110 (e.g., shaking a device, rotating a device, and lifting a device), provided by way of an example but is not limited thereto.

Vision-based input information may include information that is recognized by analyzing an input image obtained by using a camera (not shown) included in the computing device 110 without a contact between the computing device 110 and a user.

The image processor 3260 processes image data received from the communication interface 3290 or stored in the memory 3230 such that the image data is displayable on the display 3251. For example, the image processor 3260 performs signal processing on the image data such that the pages or screens such as the ones described above are displayed on the display 3251.

The audio outputter 3270 outputs audio data received from the communication interface 3290 or audio data stored in the memory 3230. Also, the audio outputter 3270 may output a sound signal related to a function performed by the computing device 110 (e.g., a notification sound). The audio outputter 3270 may output a notification sound with respect to at least one of notification details such as the ones illustrated in FIG. 29 by way of an example. The audio outputter 3270 may include, for example, a speaker or a buzzer.

The camera 3280 may obtain an image frame such as a still image or a video via an image sensor in a video call mode or a photographing mode. The camera 3280 may obtain a finger gesture image of the user of the computing device 110 and transmit the same to the controller 3240. The controller 3240 may use the finger gesture image of the user described above to determine whether to generate life content or generate theme content, provided by way of an example but is not limited thereto. An image captured by using the image sensor may be processed via the image processor 3260.

An image frame processed by the camera 3280 may be stored in the memory 3230 or transmitted to the outside via the communication interface 3290. The computing device 110 may include at least two cameras according to a configuration of the computing device 110.

The communication interface 3290 may include at least one component used for communication between the computing device 110 and at least one external device (e.g., at least one of the wearable device 130, the server 120, the IoT-based device 140, another computing device of a user, a computing device of other users, and a cloud server).

For example, the communication interface 3290 may include at least one of a short range communicator 3291, a mobile communicator 3292, and a GPS receiver 3293, provided by way of an example but is not limited thereto. For example, the communication interface 3290 may include a broadcast receiver.

Examples of the short range communicator 3291 may include, by way of an example without limitation, a module whereby at least one communication among Bluetooth communication, Bluetooth Low Energy (BLE) communication, near field communication, Wi-Fi LAN (WLAN) communication, Zigbee communication, Ant+ communication, infrared Data Association (IrDA) communication, Wi-Fi Direct (WFD) communication, and Ultra WideBand (UWB) communication may be performed. For example, the short range communicator 3291 may include an IrDA communication module. The short range communicator 3291 may receive a beacon signal described above based on Bluetooth communication. When receiving a beacon signal, the short range communicator 3291 may use BLE communication.

The mobile communicator 3292 transmits and/or receives a wireless signal to and/or from at least one of a base station, an external device, and a server via a mobile communication network. The wireless signal may include a voice call signal, a video call signal, or data in various forms according to transmission and reception of text/multimedia messages.

The GPS receiver 3293 receives a signal transmitted from three or more GPS satellites and provides the received signal to the position tracker 3211. Accordingly, the position tracker 3211 may determine positions of the GPS satellites and the computing device 110. That is, the position tracker 3211 may calculate a distance between the GPS satellite and the computing device 110 by using a trilateration method in which a time difference between a signal transmitted from a GPS satellite and a signal received by using the GPS receiver 3293 is measured. The function of determining a position of the computing device 110 described above may be performed by the GPS receiver 3293 and the GPS receiver 2393 may provide the determined position information to the position tracker 3211.

The broadcast receiver (not shown) receives a broadcast signal and/or information related to broadcasting via a broadcasting channel from the outside. Examples of a broadcasting channel may include, by way of an example and without limitation, a satellite channel, a terrestrial channel, and a radio channel.

The communication interface 3290 may post to the server 120 theme content generated by the computing device 110 according to an exemplary embodiment and receive a theme content searched by the server 120.

Figure 33:
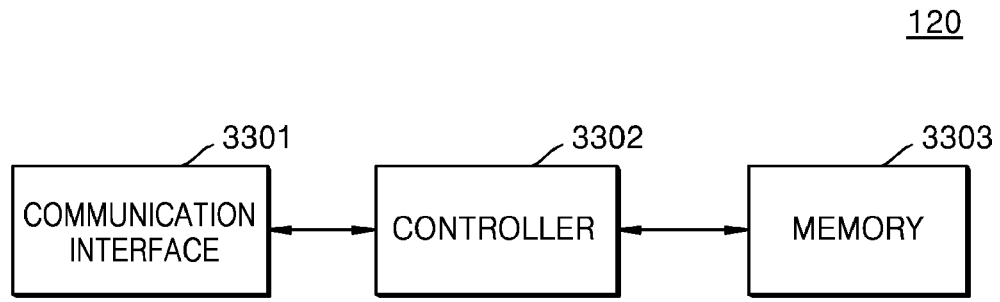
FIG. 33 is a block diagram illustrating a server according to an exemplary embodiment.

FIG. 33 is a block diagram illustrating a server such as the server 120 according to an exemplary embodiment. The server 120 includes a communication interface 3301, a controller 3302, and a memory 3303, but the structure of the server 120 is provided by way of an example and is not limited thereto.

The communication interface 3301 may receive theme content posted by the computing device 110 and at least one other computing device. The controller 3302 stores the theme content received via the communication interface 3301 in the memory 3303.

When information about a search filter about theme content is received via the communication interface 3301, the controller 3302 searches for theme content in the memory 3303 by using the received information about the search filter, and transmits found theme content to the computing device 110 that has transmitted the information about the search filter via the communication interface 3301.

When a request for a page providing theme content is received via the communication interface 3301, the controller 3302 may align theme content such that the most recently posted theme content based on a publication range of theme content stored in the memory 3303 is displayed in an uppermost portion of the computing device 110, and may provide the aligned theme content to the computing device 110 requested the page providing theme content, via the communication interface 3301.

An exemplary life log system can also be embodied as computer readable codes on a computer readable recording medium, according to an exemplary embodiment. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

It should be understood that exemplary embodiments described above should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method of providing information by a device including a display for displaying a first display area and a second display area, the method comprising:
   receiving, by a processor of the device, information indicating a date selected using a calendar provided by the device;
   displaying, on the second display area of the display, information indicating a location history of the device on the selected date, the location history of the device being obtained based on at least one of a user activity according to a user input or movement of the user corresponding to a location item obtained by the device;
   displaying, on the first display area of the display, a map including a path corresponding to the information indicating the location history of the device while displaying the information indicating the location history of the device on the second display area;
   receiving, by the processor, a first input indicating selection of a first location item among the information indicating the location history of the device; and
   in response to receiving the first input indicating the selection of the first location item, displaying, by the processor, a marker on a location on the map corresponding to the selected first location item.

2. The method of claim 1, wherein the location history comprises a place name based on where the device is located, a movement type item based on the type of movement of the device, a picture captured from where the device is located, a date when the device is located, a time when the device is located, and a distance that the device has been moved.

3. The method of claim 1, wherein the path is based on all of location items included in the location history.

4. The method of claim 1, wherein the marker is expressed as at least one of a stay icon or a movement type icon.

5. The method of claim 1, further comprising:
   displaying, by the processor, each of a plurality of markers on a plurality of locations on the map corresponding to the location history;
   after displaying the each of the markers on the plurality of locations on the map, receiving, by the processor, a second input indicating a selection of a second location item among the information indicating the location history; and
   in response to receiving the second input indicating the selection of the second location item, displaying, by the processor, a marker, among the plurality of markers, on a location on the map corresponding to the selected second location item differently from other markers, among the plurality of markers, on locations on the map corresponding to non-selected location items among the location history.

6. The method of claim 1, further comprising:
   displaying, on the second display area, a notification message indicating that there is no location history of the device when there is no information about the location history of the device on the selected date.

7. A device comprising:
   a display for displaying a first display area and a second display area;
   a processor configured to:
   receive information indicating a date selected using a calendar provided by the device;
   control the display to display, on the second display area of the display, information indicating a location history of the device on the selected date, the location history being obtained based on at least one of a user activity according to a user input or movement of the user corresponding to a location item obtained by the device;

control the display to display, on the first display area of the display, a map including a path corresponding to the information indicating the location history of the device while displaying the information indicating the location history of the device on the second display area;

receive a first input indicating selection of a first location item among the information indicating the location history of the device; and in response to receiving the first input indicating the selection of the first location item, control the display to display a marker on a location on the map corresponding to the selected first location item.

8. The device of claim 7, wherein the location history comprises a place name based on where the device is located, a movement type item based on the type of movement of the device, a picture captured from where the device is located, a date when the device is located, a time when the device is located, and a distance that the device has been moved.

9. The device of claim 7, wherein the path is based on all of location items included in the location history.

10. The device of claim 7, wherein the marker is expressed as at least one of a stay icon or a movement type icon.

11. The device of claim 7, wherein the processor is further configured to:

display each of a plurality of markers on a plurality of locations on the map corresponding to the location history;

after displaying the each of the markers on the plurality of locations on the map, receive a second input indicating a selection of a second location item among the information indicating the location history; and in response to receiving the second input indicating the selection of the second location item, control the display to display a marker, among the plurality of markers, on a location on the map corresponding to the selected second location item differently from other markers, among the plurality of markers, on locations on the map corresponding to non-selected location items among the location history.

12. The device of claim 7, wherein the processor is further configured to control the display to display, on the second display area, a notification message indicating that there is no location history of the device when there is no information about the location history of the device on the selected date.

13. A non-transitory computer readable recording medium having embodied thereon a program for executing an information providing method for:

receiving, by a processor of a device, information indicating a date selected using a calendar provided by the device, the device including a display for displaying a first display area and a second display area;

displaying, on the second display area of the display, information indicating a location history of the device on the selected date, the location history of the device being obtained based on at least one of a user activity according to a user input or movement of the user corresponding to a location item obtained by the device;

displaying, on the first display area of the display, a map including a path corresponding to the information indicating the location history of the device while displaying the information indicating the location history of the device on the second display area;

receiving, by the processor, a first input indicating selection of a first location item among the information indicating the location history of the device; and in response to receiving the first input indicating the selection of the first location item, displaying, by the processor, a marker on a location on the map corresponding to the selected first location item.

* * * * *